(12) United States Patent
Galitsky

(10) Patent No.: US 11,775,771 B2
(45) Date of Patent: Oct. 3, 2023

(54) ENABLING RHETORICAL ANALYSIS VIA THE USE OF COMMUNICATIVE DISCOURSE TREES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 359 days.

(21) Appl. No.: 17/071,608

(22) Filed: Oct. 15, 2020

(65) Prior Publication Data

US 2021/0049329 A1   Feb. 18, 2021

Related U.S. Application Data

(63) Continuation of application No. 15/975,685, filed on May 9, 2018, now Pat. No. 10,853,581.

(Continued)

(51) Int. Cl.
*G06F 40/30* (2020.01)
*G06F 40/35* (2020.01)

(Continued)

(52) U.S. Cl.
CPC ............ *G06F 40/35* (2020.01); *G06F 16/322* (2019.01); *G06F 16/3329* (2019.01);

(Continued)

(58) Field of Classification Search
CPC ...... G06F 17/27; G06F 17/20; G06F 17/2705; G06F 17/271; G06F 17/2715;

(Continued)

(56) References Cited

U.S. PATENT DOCUMENTS 5,495,605 A * 2/1996 Cadot ............... G06F 16/24537
5,930,392 A * 7/1999 Ho ........................ G06F 18/211
382/226

(Continued)

FOREIGN PATENT DOCUMENTS

CN    102165518 A    8/2011
CN    105955956 A    9/2016
CN    106502981 A    3/2017

OTHER PUBLICATIONS

Friederici et al., Verb Argument Structure Processing: The role of Verb-Specific and Argument-Specific Information, 2000, Journal of Memory and Language, vol. 43, Issue 3, pp. 476-507 (Year: 2000).*

(Continued)

*Primary Examiner* — Lamont M Spooner
(74) *Attorney, Agent, or Firm* — Kilpatrick Townsend & Stockton LLP

(57) ABSTRACT

Systems, devices, and methods of the present invention calculate a rhetorical relationship between one or more sentences. In an example, a computer-implemented method accesses a sentence comprising a plurality of fragments. At least one fragment includes a verb and a words. Each word includes a role of the words within the fragment. Each fragment is an elementary discourse unit. The method generates a discourse tree that represents rhetorical relationships between the sentence fragments. The discourse tree includes nodes including nonterminal and terminal nodes, each nonterminal node representing a rhetorical relationship between two of the sentence fragments, and each terminal node of the nodes of the discourse tree is associated with one of the sentence fragments. The method matches each fragment that has a verb to a verb signature, thereby creating communicative discourse tree.

20 Claims, 30 Drawing Sheets

Related U.S. Application Data

(60) Provisional application No. 62/504,377, filed on May 10, 2017.

(51) Int. Cl.
| | |
|---|---|
| *G06F 16/31* | (2019.01) |
| *G06F 16/332* | (2019.01) |
| *G06F 40/44* | (2020.01) |
| *G06F 40/51* | (2020.01) |
| *G06F 40/55* | (2020.01) |
| *G06F 40/211* | (2020.01) |
| *G06F 18/22* | (2023.01) |
| *G06N 3/08* | (2023.01) |

(52) U.S. Cl.
CPC ............ *G06F 18/22* (2023.01); *G06F 40/211* (2020.01); *G06F 40/44* (2020.01); *G06F 40/51* (2020.01); *G06F 40/55* (2020.01); *G06N 3/08* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795; G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 6,112,168 | A * | 8/2000 | Corston | G06F 40/253 |
| | | | | 704/9 |
| 6,181,909 | B1 | 1/2001 | Burstein et al. | |
| 6,731,307 | B1 | 5/2004 | Strubbe et al. | |
| 6,961,692 | B1 * | 11/2005 | Polanyi | G06F 40/35 |
| | | | | 704/8 |
| 7,152,031 | B1 * | 12/2006 | Jensen | G06F 16/3344 |
| | | | | 707/999.005 |
| 7,359,860 | B1 | 4/2008 | Miller et al. | |
| 7,519,529 | B1 | 4/2009 | Horvitz | |
| 7,551,552 | B2 | 6/2009 | Dunagan et al. | |
| 7,840,556 | B1 * | 11/2010 | Dayal | G06F 16/2453 |
| | | | | 707/999.003 |
| 8,694,303 | B2 * | 4/2014 | Hopkins | G06F 40/44 |
| | | | | 704/8 |
| 8,756,617 | B1 | 6/2014 | Boodman et al. | |
| 9,037,464 | B1 | 5/2015 | Mikolov et al. | |
| 9,292,490 | B2 * | 3/2016 | Kimelfeld | G06F 40/289 |
| 9,449,080 | B1 | 9/2016 | Zhang | |
| 9,514,098 | B1 * | 12/2016 | Subramanya | G06F 40/284 |
| 9,559,993 | B2 | 1/2017 | Palakovich et al. | |
| 9,582,501 | B1 * | 2/2017 | Salmon | G06F 40/30 |
| 9,817,721 | B1 | 11/2017 | Youngworth | |
| 10,019,716 | B1 | 7/2018 | Ainslie et al. | |
| 10,175,865 | B2 | 1/2019 | Beaver et al. | |
| 10,289,974 | B1 | 5/2019 | Ouimette | |
| 10,545,648 | B2 | 1/2020 | Beaver et al. | |
| 10,599,885 | B2 | 3/2020 | Galitsky | |
| 10,679,011 | B2 | 6/2020 | Galitsky | |
| 10,853,581 | B2 | 12/2020 | Galitsky | |
| 11,023,684 | B1 | 6/2021 | Flor et al. | |
| 11,100,144 | B2 | 8/2021 | Galitsky | |
| 11,347,946 | B2 | 5/2022 | Galitsky | |
| 11,373,632 | B2 | 6/2022 | Galitsky | |
| 11,386,274 | B2 | 7/2022 | Galitsky | |
| 11,410,072 | B2 * | 8/2022 | Burstein | G06N 5/022 |
| 11,455,469 | B2 * | 9/2022 | Alam | G06Q 10/107 |
| 11,586,827 | B2 | 2/2023 | Galitsky | |
| 2001/0007987 | A1 * | 7/2001 | Igata | G06F 16/81 |
| 2001/0053968 | A1 | 12/2001 | Galitsky et al. | |
| 2002/0040292 | A1 * | 4/2002 | Marcu | G06F 40/253 |
| | | | | 704/7 |
| 2002/0046018 | A1 * | 4/2002 | Marcu | G06F 40/44 |
| | | | | 704/9 |
| 2003/0138758 | A1 * | 7/2003 | Burstein | G09B 11/00 |
| | | | | 434/167 |
| 2004/0044519 | A1 * | 3/2004 | Polanyi | G06F 40/35 |
| | | | | 707/E17.058 |
| 2004/0133579 | A1 | 7/2004 | Campbell | |
| 2004/0148170 | A1 | 7/2004 | Acero et al. | |
| 2004/0267770 | A1 * | 12/2004 | Lee | G06F 16/2465 |
| 2005/0049867 | A1 * | 3/2005 | Deane | G10L 15/1822 |
| | | | | 704/240 |
| 2005/0086592 | A1 * | 4/2005 | Polanyi | G06F 16/345 |
| | | | | 707/E17.094 |
| 2007/0073533 | A1 * | 3/2007 | Thione | G06F 40/35 |
| | | | | 704/9 |
| 2007/0136284 | A1 * | 6/2007 | Cobb | G06F 40/131 |
| 2007/0192306 | A1 * | 8/2007 | Papakonstantinou | |
| | | | | G06F 16/951 |
| | | | | 707/999.005 |
| 2007/0239423 | A1 | 10/2007 | Miller | |
| 2007/0294229 | A1 | 12/2007 | Au | |
| 2008/0172409 | A1 | 7/2008 | Botros et al. | |
| 2008/0228467 | A1 * | 9/2008 | Womack | G06F 40/30 |
| | | | | 704/9 |
| 2009/0089252 | A1 | 4/2009 | Galitsky et al. | |
| 2009/0100053 | A1 * | 4/2009 | Boschee | G06F 16/334 |
| 2009/0248399 | A1 * | 10/2009 | Au | G06F 40/237 |
| | | | | 704/9 |
| 2009/0282019 | A1 | 11/2009 | Galitsky et al. | |
| 2010/0169359 | A1 * | 7/2010 | Barrett | G06F 16/313 |
| | | | | 707/769 |
| 2010/0299136 | A1 | 11/2010 | Tong et al. | |
| 2011/0119049 | A1 * | 5/2011 | Ylonen | G06F 40/211 |
| | | | | 704/9 |
| 2011/0153673 | A1 * | 6/2011 | Boschee | G06F 16/334 |
| | | | | 707/E17.098 |
| 2012/0041950 | A1 | 2/2012 | Koll et al. | |
| 2012/0078902 | A1 | 3/2012 | Duboue et al. | |
| 2012/0173500 | A1 * | 7/2012 | Chakrabarti | G01C 21/3679 |
| | | | | 707/706 |
| 2012/0246578 | A1 | 9/2012 | Baldwin et al. | |
| 2013/0046757 | A1 * | 2/2013 | Salvetti | G06F 16/957 |
| | | | | 707/723 |
| 2013/0151347 | A1 | 6/2013 | Baldwin et al. | |
| 2013/0204611 | A1 * | 8/2013 | Tsuchida | G06F 40/211 |
| | | | | 704/9 |
| 2013/0268532 | A1 * | 10/2013 | Doshi | G06F 16/285 |
| | | | | 707/737 |
| 2013/0311485 | A1 * | 11/2013 | Khan | G06F 16/335 |
| | | | | 707/758 |
| 2014/0040288 | A1 | 2/2014 | Galitsky | |
| 2014/0090054 | A1 | 3/2014 | Bolzoni et al. | |
| 2014/0122083 | A1 | 5/2014 | Xiaojiang | |
| 2014/0136188 | A1 * | 5/2014 | Wroczynski | G06F 40/284 |
| | | | | 704/9 |
| 2015/0039295 | A1 * | 2/2015 | Soschen | G06F 40/205 |
| | | | | 704/9 |
| 2015/0046492 | A1 * | 2/2015 | Balachandran | G06F 8/36 |
| | | | | 707/772 |
| 2015/0051900 | A1 | 2/2015 | Kimelfeld et al. | |
| 2015/0134325 | A1 | 5/2015 | Skiba et al. | |
| 2015/0149461 | A1 * | 5/2015 | Aguilar Lemarroy | G06F 16/35 |
| | | | | 707/737 |
| 2015/0161512 | A1 * | 6/2015 | Byron | G06F 16/24578 |
| | | | | 706/12 |
| 2016/0026608 | A1 | 1/2016 | Curin et al. | |
| 2016/0034457 | A1 * | 2/2016 | Bradley | G06F 16/24578 |
| | | | | 707/749 |
| 2016/0055240 | A1 | 2/2016 | Tur et al. | |
| 2016/0071517 | A1 | 3/2016 | Beaver et al. | |
| 2016/0085743 | A1 * | 3/2016 | Haley | G06F 40/40 |
| | | | | 704/9 |
| 2016/0086601 | A1 | 3/2016 | Chotimongkol et al. | |
| 2016/0099892 | A1 | 4/2016 | Palakovich et al. | |

(56) References Cited

U.S. PATENT DOCUMENTS

| | | | |
|---|---|---|---|
| 2016/0232152 A1* | 8/2016 | Mahamood | G06F 40/186 |
| 2016/0245779 A1 | 8/2016 | Khalaj Amineh et al. | |
| 2016/0246779 A1* | 8/2016 | Ho | G06F 40/30 |
| 2016/0247068 A1* | 8/2016 | Lin | G06F 40/40 |
| 2016/0283491 A1 | 9/2016 | Lu et al. | |
| 2016/0292153 A1* | 10/2016 | Agarwalla | G06F 16/93 |
| 2016/0328667 A1 | 11/2016 | Macciola et al. | |
| 2017/0032053 A1* | 2/2017 | LeTourneau | G06F 16/322 |
| 2017/0104829 A1 | 4/2017 | Degroat | |
| 2017/0116982 A1* | 4/2017 | Gelfenbeyn | G10L 15/22 |
| 2017/0177675 A1 | 6/2017 | Beller et al. | |
| 2017/0228368 A1* | 8/2017 | Carter | G06F 40/216 |
| 2017/0277993 A1 | 9/2017 | Beaver et al. | |
| 2017/0286390 A1 | 10/2017 | Yashpe et al. | |
| 2018/0121062 A1 | 5/2018 | Beaver et al. | |
| 2018/0181648 A1* | 6/2018 | Chen | G06F 16/951 |
| 2018/0189385 A1* | 7/2018 | Sun | G06F 16/243 |
| 2018/0260472 A1 | 9/2018 | Kelsey et al. | |
| 2018/0314689 A1* | 11/2018 | Wang | G10L 15/1822 |
| 2018/0365228 A1 | 12/2018 | Galitsky | |
| 2018/0365593 A1 | 12/2018 | Galitsky | |
| 2018/0373701 A1 | 12/2018 | Mcateer et al. | |
| 2019/0033957 A1 | 1/2019 | Shionozaki | |
| 2019/0138190 A1 | 5/2019 | Beaver et al. | |
| 2019/0163756 A1 | 5/2019 | Bull et al. | |
| 2019/0354544 A1 | 11/2019 | Hertz et al. | |
| 2019/0377605 A1 | 12/2019 | Joseph | |
| 2020/0099790 A1 | 3/2020 | Ma et al. | |
| 2020/0117858 A1 | 4/2020 | Freeman et al. | |
| 2020/0279075 A1* | 9/2020 | Avedissian | G06F 40/211 |
| 2020/0301589 A1 | 9/2020 | Buzzard et al. | |
| 2021/0020165 A1 | 1/2021 | Scodary et al. | |
| 2021/0027799 A1 | 1/2021 | Scodary et al. | |
| 2021/0029248 A1 | 1/2021 | Scodary et al. | |

OTHER PUBLICATIONS

Marcu et al., Booktitle={Current and new directions in discourse and dialogue}, title={Building a discourse-tagged corpus in the framework of rhetorical structure theory}, year={2003}, publisher={Springer}, pages={85-112} (Year: 2003).*

Pechsiri et al., Title={Mining causality from texts for question answering system}, 2007, journal={IEICE Transactions on Information and Systems}, 2007, volume={90}, number={10}, pages={1523-1533} (Year: 2007).*

Galitsky et al., Title={Rhetoric map of an answer to compound queries}, 2015, Proceedings of the 53rd Annual Meeting of the Association for Computational Linguistics and the 7th International Joint Conference on Natural Language Processing (vol. 2: Short Papers), pp. 1-6 (Year: 2015).*

U.S. Appl. No. 16/841,200, Notice of Allowance dated Apr. 14, 2022, 13 pages.

U.S. Appl. No. 16/240,232 , Final Office Action, dated Oct. 21, 2021, 13 pages.

Indian Appln. IN202047007447, "First Examination Report", dated Sep. 9, 2021, 6 pages.

U.S. Appl. No. 16/789,849, Non-Final Office Action dated Jul. 1, 2022, 25 pages.

Krishna et al., Automatic Generation and Insertion of Assessment Items in Online Video Courses, Proceedings of the 20th International Conference on Intelligent User Interfaces Companion, Mar. 2015, pp. 1-4.

Kuyten et al., Fully Automated Generation of Question-Answer Pairs for Scripted Virtual Instruction, International Conference on Intelligent Virtual Agents, Sep. 12, 2012, pp. 1-14.

U.S. Appl. No. 16/736,517, Non-Final Office Action dated Dec. 8, 2021, 17 pages.

U.S. Appl. No. 16/736,517, Notice of Allowance dated Feb. 10, 2022, 11 pages.

U.S. Appl. No. 16/789,849, Non-Final Office Action dated Feb. 17, 2022, 23 pages.

European Application No. 18727946.8, Office Action dated Dec. 15, 2021, 7 pages.

Indian Application No. 201947044096, First Examination Report, dated Jan. 13, 2022, 5 pages.

Yao et al., Semantics-Based Question Generation and Implementation, Dialogue & Discourse, vol. 3, No. 2, 2012, pp. 11-42.

U.S. Appl. No. 16/822,563, Notice of Allowance dated Mar. 2, 2022, 16 pages.

U.S. Appl. No. 16/010,123, Notice of Allowance, dated May 19, 2021, 16 pages.

2009 Annual Study: Global Cost of a Data Breach, Ponemon Institute, LLC, PGP, Apr. 2010, 36 pages.

Data Loss Prevention, Trend Micro, Available online at: http://www.trendmicro.co.in/cloud-content/us/pdfs/business/datasheets/ds_data-loss-prevention.pdf, 2010, 2 pages.

Data Loss Prevention & Protection, Symantec, Available online at: http://www.symantec.com/business/theme.jsp?themeid=vontu, Accessed from Internet on Aug. 30, 2018, 6 pages.

Exploring Dialog Management for Bots, Chatbots Magazine, Available online at: https://chatbotsmagazine.com/exploring-dialog management-for-bots-cbb8665a2fd3, Jul. 11, 2016, 7 pages.

Global Security Report 2010, Trustwave, Available online at: https://www.trustwave.com/Resources/Library/Documents/2010-Trustwave-Global-Security-Report/, 2010, 49 pages.

Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, pp. 1-8.

Malaysia Airlines Flight 17, Wikipedia, Available Online at: https://en.wikipedia.org/wiki/Malaysia_Airlines_Flight_17, 2016, pp. 1-38.

Shadow Chairman of Investigative Committee, Crime Russia, Available online at: https://crimerussia.com/corruption/tenevoy-direktor-skr/, Aug. 25, 2016, 5 pages.

Welcome to Apache Lucene, Apache Lucene 7.5.0 and Apache Solr 7.5.0, Available online at www.lucene.apache.org, Sep. 24, 2018, 38 pages.

U.S. Appl. No. 15/975,683, Non-Final Office Action, dated Mar. 19, 2020, 16 pages.

U.S. Appl. No. 15/975,683, Non-Final Office Action, dated Oct. 31, 2019, 27 pages.

U.S. Appl. No. 15/975,683, Notice of Allowance, dated Jun. 12, 2020, 17 pages.

U.S. Appl. No. 15/975,685, Non-Final Office Action, dated Apr. 1, 2020, 23 pages.

U.S. Appl. No. 15/975,685, Non-Final Office Action, dated Nov. 15, 2019, 23 pages.

U.S. Appl. No. 15/975,685, Notice of Allowance, dated Jul. 24, 2020, 17 pages.

U.S. Appl. No. 16/010,091, Non-Final Office Action, dated Nov. 18, 2019, 26 pages.

U.S. Appl. No. 16/010,091, Notice of Allowance, dated Mar. 19, 2020, 13 pages.

U.S. Appl. No. 16/010,141, Final Office Action, dated Jul. 30, 2020, 14 pages.

U.S. Appl. No. 16/010,141, Non-Final Office Action, dated Feb. 24, 2020, 12 pages.

U.S. Appl. No. 16/010,156, Notice of Allowance, dated Feb. 6, 2020, 13 pages.

U.S. Appl. No. 16/010,156, Notice of Allowance, dated Nov. 7, 2019, 13 pages.

U.S. Appl. No. 16/145,702, Final Office Action, dated May 6, 2020, 19 pages.

U.S. Appl. No. 16/145,702, Final Office Action, dated Sep. 10, 2019, 25 pages.

U.S. Appl. No. 16/145,702, First Action Interview Office Action Summary, dated Apr. 29, 2019, 8 pages.

U.S. Appl. No. 16/145,702, First Action Interview Pilot Program Pre-Interview Communication, dated Feb. 7, 2019, 6 pages.

U.S. Appl. No. 16/145,702, Non-Final Office Action, dated Feb. 5, 2020, 30 pages.

U.S. Appl. No. 16/145,777, Non-Final Office Action, dated Apr. 3, 2020, 18 pages.

(56) References Cited

OTHER PUBLICATIONS

U.S. Appl. No. 16/145,777, Notice of Allowance, dated Jul. 15, 2020, 17 pages.
U.S. Appl. No. 16/260,939, Non-Final Office Action, dated May 1, 2020, 10 pages.
U.S. Appl. No. 16/260,939, Notice of Allowance, dated Jun. 12, 2020, 14 pages.
Airenti et al., Conversation and Behavior Games in the Pragmatics of Dialogue, Cognitive Science, vol. 17, No. 2, Apr.-Jun. 1993, pp. 197-256.
Allen et al., Analyzing Intention in Utterances, Artificial Intelligence, vol. 15, No. 3, Dec. 1980, pp. 143-178.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Technical Report 774, Apr. 2002, 56 pages.
Blaylock et al., Managing Communicative Intentions with Collaborative Problem Solving, Current and New Directions in Discourse and Dialogue, Chapter-4, 2003, pp. 63-84.
Boyer et al., MJRTY—A Fast Majority Vote Algorithm, Chapters, Automated Reasoning, 1991, pp. 105-117.
Carlson et al., Discourse Tagging Reference Manual, Available online at https://www.isi.edu/~marcu/discourse/tagging-ref-manual.pdf, Sep. 11, 2001, 87 pages.
Chali et al., Complex Question Answering: Unsupervised Learning Approaches and Experiments, Journal of Artificial Intelligence Research, vol. 35, May 2009, pp. 1-47.
Chen, Understanding Mental States in Natural Language, Proceedings of the 8th International Conference on Computational Semantics, Jan. 2009, pp. 61-72.
Cohen, Enron Email Dataset, Available online at: https://www.cs.cmu.edu/~enron/, Jul. 10, 2016, 1 page.
Cohen et al., Intention is Choice with Commitment, Artificial Intelligence, vol. 42, Nos. 2-3, Mar. 1990, pp. 213-261.
Collins et al., New Ranking Algorithms for Parsing and Tagging: Kernels Over Discrete Structures, and the Voted Perceptron, Proceedings of the 40th Annual Meeting of the Association for Computational Linguistics (ACL), Jul. 2002, pp. 263-270.
Cristea et al., Veins Theory: A Model of Global Discourse Cohesion and Coherence, In C. Boitet & P. Whitelock (Eds.), 17th International Conference on Computational Linguistics, 1998, pp. 281-285.
Croft et al., Search Engines-lnformation Retrieval in Practice, Pearson Education, 2010, 542 pages.
De Boni, Using Logical Relevance for Question Answering, Journal of Applied Logic, vol. 5, No. 1, 2007, pp. 92-103.
De Mori et al., Spoken Language Understanding, Institute of Electrical and Electronics Engineers Signal Processing Magazine, vol. 25, No. 3, May 2008, pp. 50-58.
Dijkstra, Programming Considered as a Human Activity, Proc. IFIP Congress, 1965, 7 pages.
Ebrahim, NLP Tutorial Using Python NLTK (Simple Examples), Dzone, Available online at: https://dzone.com/articles/nlp-tutorial-using-python-nltk-simple-examples, Sep. 24, 2017, pp. 1-10.
Endres-Niggemeyer et al., Summarizing Text for Intelligent Communication, Dagstuhl Seminar Report 79, 1995, 36 pages
Feng et al., A Linear-Time Bottom-Up Discourse Parser with Constraints and Post-Editing, Proceedings of the 52nd Annual Meeting ofthe Association for Computational Linguistics, June 23-25, 2014, pp. 511-521
Feng et al., Classifying Arguments by Scheme, Proceedings of the 49th Annual Meeting of the Association for Computational Linguistics, vol. 1, Jun. 19-24, 2011, pp. 987-996
Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.
Feng, RST-Style Discourse Parsing and Its Applications in Discourse Analysis, University of Toronto, Jun. 2015, 189 pages.
Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.
Ferraiolo et al., Role-Based Access Controls, Proceedings of the 15th NIST-NSA National Computer Security Conference, Oct. 13-16, 1992, pp. 554-563.
Finn, A Question Writing Algorithm, Journal of Reading Behavior, VII, vol. 4, 1975, pp. 341-367.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Galitsky et al., A Novel Approach for Classifying Customer Complaints Through Graphs Similarities in Argumentative Dialogues, Decision Support Systems, vol. 46, No. 3, Feb. 2009, pp. 717-729.
Galitsky et al., Chatbot with a Discourse Structure-Driven Dialogue Management, Proceedings of the Software Demonstrations of the 15th Conference of the European Chapter of the Association for Computational Linguistics Available on Internet at: https://pdfs.semanticscholar.org/439f/cbe14dbc84b694bae2ee42a914d7 43126d12.pdf, Apr. 2017, pp. 87-90.
Galitsky et al., Concept-Based Learning of Human Behavior for Customer Relationship Management, Information Sciences, vol. 181, No. 10, May 15, 2011, pp. 2016-2035.
Galitsky, Discovering Rhetorical Agreement between a Request and Response, Dialogue & Discourse, vol. 8, No. 2, Dec. 1, 2017, pp. 167-205.
Galitsky et al., Finding Maximal Common Sub-Parse Thickets for Multi-Sentence Search, Graph Structures for Knowledge Representation and Reasoning, 2014, 19 pages.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vol. 81-82, Available online at: http://dx.doi.org/10.1016/j.datak.2012.07.003.2012, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference Dialogue 2017. Available online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, Available Online at: http://dx.doi.org/10.1016/j.engappai.2012.09.017, Mar. 2013, pp. 1072-1091.
Galitsky et al., Matching Sets of Parse Trees for Answering Multi-Sentence Questions, Proceedings of Recent Advances in Natural Language Processing, Sep. 2013, pp. 285-293.
Galitsky, Natural Language Question Answering System, Technique of Semantic Headers, Advanced Knowledge International, vol. 2, Apr. 2003, 333 pages.
Galitsky et al., On a Chat Bot Finding Answers with Optimal Rhetoric Representation, RANLP—Recent Advances in Natural Language Processing Meet Deep Learning, Nov. 10, 2017, pp. 253-259.
Galitsky et al., Parse Thicket Representations for Answering Multi-Sentence Search, International Conference on Conceptual Structures, vol. 7735, 2013, pp. 153-172.
Galitsky et al., Rhetoric Map of an Answer to Compound Queries, Proceedings of the 53rd Annual Meeting of the 20 Association for

(56) References Cited

OTHER PUBLICATIONS

Computational Linguistics and the 7th International Joint Conference of Natural Language Processing, vol. 2, Jul. 26-31, 2015, pp. 681-686.
Galitsky et al., Style and Genre Classification by Means of Deep Textual Parsing, Computational Linguistics and Intellectual Technologies: Proceedings of the International Conference Dialogue 2016, Jun. 2016, pp. 1-45.
Galitsky et al., Text Classification Based on Deep Textual Parsing, Available Online at: http://ceur-ws.org/Vol-1886/paper_8.pdf, 2011, 9 pages.
Galitsky et al., Text Classification into Abstract Classes Based on Discourse Structure, Proceedings of Recent Advances in Natural Language Processing, Sep. 2015, pp. 200-207.
Galitsky et al., Text Integrity Assessment: Sentiment Profile vs Rhetoric Structure, CICLing, Springer International Publishing, Apr. 2015, pp. 126-139.
Galitsky, Using Extended Tree Kernels to Recognize Metalanguage in Text, Studies in Computational Intelligence, Feb. 2017, 26 pages.
Grefenstette et al., Multi-Step Regression Learning for Compositional Distributional Semantics, Proceedings of the 10th International Conference on Computational Semantics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, pp. 234-268.
Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.
Hara et al., Exploring Difficulties in Parsing Imperatives and Questions, Proceedings of the 5th International Joint Conference on Natural Language Processing, Nov. 8-13, 2011, pp. 749-757.
Hart et al., Text Classification for Data Loss Prevention, Proceedings of the 11th International Conference on Privacy Enhancing Technologies, Hewlett-Packard Development Company, L.P., Jul. 27-29, 2011, 21 pages.
Haussler, Convolution Kernels on Discrete Structures UCSC-CRL-99-10, University of California, Santa Barbara Technical Report, Jul. 8, 1999, 38 pages.
Hernault et al., A Sequential Model for Discourse Segmentation, International Conference on Intelligent Text Processing and Computational Linguistics, CICLing 2010: Computational Linguistics and Intelligent Text Processing, Mar. 21-27, 2010, pp. 315-326.
Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.
Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.
Jansen et al., Discourse Complements Lexical Semantics for Non-Factoid Answer Reranking, Proceedings of the 52nd Annual Meeting of the Association for Computational Linguistics, vol. 1, Jun. 23-25, 2014, pp. 977-986.
John et al., Estimating Continuous Distributions in Bayesian Classifiers, Proceedings of the Eleventh Conference on Uncertainty in Artificial Intelligence, 1995, pp. 338-345.
Johnson et al., The FrameNet Tagset for Frame-Semantic and Syntactic Coding of Predicate-Argument Structure, Proceedings of the First Meeting of the North American Chapter of the Association for Computational Linguistics, Apr. 2000, pp. 56-62.
Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.
Joty et al., CODRA: A Novel Discriminative Framework for Rhetorical Analysis, Computational Linguistics, vol. 41, No. 3, Mar. 18, 2015, pp. 385-435.
Joty et al., Combining Intra- and Multi-Sentential Rhetorical Parsing for Document-Level Discourse Analysis, 51st Annual Meeting of the Association for Computational Linguistics, vol. 1, Aug. 4-9, 2013, pp. 486-496.
Joty et al., Discriminative Reranking of Discourse Parses Using Tree Kernels, Proceedings of the 2014 Conference on Empirical Methods in Natural Language Processing, Oct. 25-29, 2014, pp. 2049-2060.
Jurafsky et al., Speech and Language Processing: An Introduction to Natural Language Processing, Computational Linguistics, and Speech Recognition, Pearson, Prentice Hall, 2000, pp. 719-761.
Kate et al., Learning to Transform Natural to Formal Languages, Conference: Proceedings, The Twentieth National Conference on Artificial Intelligence and the Seventeenth Innovative Applications of Artificial Intelligence Conference, Jul. 2005, pp. 1062-1068.
Kipper et al., A Large-Scale Classification of English Verbs, Language Resources and Evaluation, vol. 42, No. 1, Mar. 2008, pp. 21-40.
Kipper et al., VerbNet Overview, Extensions, Mappings and Applications, Proceedings of Human Language Technologies, Annual Conference of the North American Chapter of the Association for Computational Linguistics, Companion, vol. Tutorial Abstracts, Jun. 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Kohavi, A Study of Cross-Validation and Bootstrap for Accuracy Estimation and Model Selection, IJCAI'95: Proceedings of the 14th international joint conference on Artificial intelligence, vol. 2, Aug. 1995, pp. 1137-1143.
Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.
Kontos et al., Question Answering and Rhetoric Analysis of Biomedical Texts in the Aroma System, National and Kapodistrian University of Athens, Unpublished Manuscript, 2006, 6 pages.
Levinson, Presumptive Meanings: The Theory of Generalized Conversational Implicature, Cambridge, MA: The Massachusetts Institute of Technology Press, 2000, 10 pages.
Li et al., Recursive Deep Models for Discourse Parsing, Conference: Proceedings of the 2014 Conference on Empirical Methods in Natural Language Processing (EMNLP), Jan. 2014, 10 pages.
Lin et al., Recognizing Implicit Discourse Relations in the Penn Discourse Treebank, Conference: Proceedings of the 2009 Conference on Empirical Methods in Natural Language Processing, EMNLP, Aug. 6-7, 2009, pp. 343-351.
Litman et al., A Plan Recognition Model for Subdialogues in Conversations, Cognitive Science, vol. 11, No. 2, Apr. 1987, pp. 163-200.
Makhalova et al., Pattern Structures for News Clustering, Proceedings of the 4th International Conference on What can FCA do for Artificial Intelligence, vol. 1430, Jul. 2015, pp. 35-42.
Mann et al., Discourse Structures forText Generation, Proceedings of the 10th International Conference on Computational Linguistics and 22nd annual meeting on Association for Computational Linguistics, Jul. 2-6, 1984, pp. 367-375.
Mann et al., Rhetorical Structure Theory and Text Analysis, Discourse Description: Diverse Linguistic Analyses of a Fund-Raising Text, Apr. 8, 1992, pp. 39-78.
Mann et al., Rhetorical Structure Theory: Toward a Functional Theory of Text Organization, Text-Interdisciplinary Journal for the Study of Discourse, vol. 8, No. 3, Jan. 1988, pp. 243-281.
Marcu et al., An Unsupervised Approach to Recognizing Discourse Relations, Proceedings of the 40th Annual Meeting of the Association for Computational Linguistics (ACL), 2002, 8 pages.

(56) References Cited

OTHER PUBLICATIONS

Mercier et al., Why Do Humans Reason? Arguments for an Argumentative Theory, Behavioral and Brain Sciences, vol. 34, No. 2, Apr. 2011, pp. 57-111.
Mikolov et al., Distributed Representations of Words and Phrases and Their Compositionality, Advances in Neural Information Processing Systems, vol. 26, Oct. 2013, 9 pages.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Mar. 2011, pp. 1-22.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International Association for the Advancement of Artificial Intelligence Conference on Weblogs and Social Media, Jan. 2013, pp. 409-418.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
International Application No. PCT/US2018/031890, International Preliminary Report on Patentability, dated Nov. 21, 2019, 9 pages.
International Application No. PCT/US2018/053392, International Preliminary Report on Patentability, dated Apr. 9, 2020, 7 pages.
International Application No. PCT/US2018/053392, International Search Report and Written Opinion, dated Dec. 17, 2018, 11 pages.
International Application No. PCT/US2019/015696, International Search Report and Written Opinion, dated Apr. 23, 2019, 12 pages.
International Application No. PCT/US2019/031580, International Search Report and Written Opinion, dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 2013, pp. 1-31.
Pendyala et al., Towards a Truthful World Wide Web from a Humanitarian Perspective, Institute of Electrical and Electronics Engineers 2015 Global Humanitarian Technology Conference, Oct. 8-11, 2015, 7 pages.
Ponti, Machine Learning Techniques Applied to Dependency Parsing, University of Pavia, Available Online at, https://vision.unipv.iUAI/AIRG/MachineLearningTechniquesAppliedToDependencyParsingRevised.pdf (Last Accessed Jan. 1, 2019), Oct. 2015, pp. 1-45.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: One or More Dimensions?, ISSCO Working Paper No. 62, University of Geneva, Nov. 2005, 46 pages.
Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.
Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, Dec. 2000, 10 pages.
Ra Yana et al., Collective Opinion Spam Detection: Bridging Review Networks and Metadata, Proceedings of the 21st Association for Computing Machinery Special Interest Group on Knowledge Discovery and Data Mining International Conference on Knowledge Discovery and Data Mining, Aug. 11-14, 2015, 10 pages.
Recasens et al., The Life and Death of Discourse Entities: Identifying Singleton Mentions, Proceedings of NAACL-HLT, Jun. 9-14, 2013, pp. 627-633.
Reed et al., Language Resources for Studying Argument, Proceedings of the 6th Conference on Language Resources and Evaluation, LREC2008, ELRA, May 2010, pp. 2613-2618.
Reichman, Getting Computers to Talk Like You and Me, Discourse Context, Focus and Semantics (An ATN Model), Massachusetts Institute of Technology Press, Jul. 1985, pp. 35-49.
Salton et al., On the Specification of Term Values in Automatic Indexing, Journal of Documentation, vol. 29, No. 4, Apr. 1973, pp. 351-372.
Salton et al., Term Weighting Approaches in Automatic Text Retrieval, Information Processing & Management, vol. 24, No. 5, Nov. 1987, 22 pages.
Santhosh et al., Discourse Based Advancement on Question Answering System, International Journal on Soft Computing, Artificial Intelligence and Applications (IJSCAI), vol. 1, No. 2, Oct. 2012, 12 pages.
Scholman et al., A Step-Wise Approach to Discourse Annotation: Towards a Reliable Categorization of Coherence 64 Relations, Categories of Coherence Relations in Discourse Annotation, Dialogue & Discourse, vol. 7, No. 2, Feb. 2016, 28 pages.
Searle, Speech Acts: An Essay in the Philosophy of Language, Cambridge University Press, Jan. 1969, pp. 22-53.
Sjoera, The Linguistics Behind Chat Bots, iCapps, Available online at: http://www.icapps.com/the-linguistics-behind-chatbots/, Feb. 22, 2017, 9 pages.
Socher et al., Learning Continuous Phrase Representations and Syntactic Parsing with Recursive Neural Networks, Proceedings of the NIPS Deep Learning and Unsupervised Feature Learning Workshop, Jan. 2010, 9 pages.
Sperber et al., Relevance: Communication and Cognition, Blackwell, Oxford and Harvard University Press, Cambridge, MA, 1986, 331 pages.
Sun et al., Exploiting Product Related Review Features for Fake Review Detection, Mathematical Problems in Engineering, vol. 2016, Article ID 4935792, Jul. 4, 2016, 7 pages.
Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.
Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.
Tai et al., Improved Semantic Representations from Tree-Structured Long Short-Term Memory Networks, Available Online at: https://arxiv.org/pdf/1503.00075.pdf, May 30, 2015, 11 pages.
Traum et al., Conversation Acts in Task-Oriented Spoken Dialogue, University of Rochester Computer Science, Computational Intelligence, vol. 8, No. 3, Aug. 1992, 31 pages.
Traum et al., Discourse Obligations in Dialogue Processing, Proceedings of the 32nd Annual Meeting on Association for Computational Linguistics, Jun. 27-30, 1994, pp. 1-8.
Traum, Rhetorical Relations, Action and Intentionality in Conversation, Proceedings ACL SIG Workshop on Intentionality and Structure in Discourse Relations, Jun. 1993, pp. 132-135.
Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.
Tsui, English Conversation. Describing English Language, Oxford University Press, 1994, 37 pages.
Uliyar, A Primer: Oracle Intelligent Bots, Powered by Artificial Intelligence, White Paper, Sep. 2017, 28 pages.
Van Der Wees et al., Five Shades of Noise: Analyzing Machine Translation Errors in User-Generated Text, Proceedings of the AGL, Workshop on Noisy User-generated Text, Jul. 2015, pp. 28-37.
Vapnik, The Nature of Statistical Learning Theory, Springer Science, 1995, 201 pages.

(56) References Cited

OTHER PUBLICATIONS

Walker et al., Quantitative and Qualitative Evaluation of Darpa Communicator Spoken Dialogue Systems, Proceedings of the 39th Annual Meeting of the Association for Computational Linguistics, Jul. 6-11, 2001, pp. 515-522.

Wang et al., Kernel Based Discourse Relation Recognition with Temporal Ordering Information, Proceedings of the 48th Annual Meeting of the Association for Computational Linguistics, Jul. 11-16, 2010, pp. 710-719.

Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.

Wu et al., Enhancing Text Representation for Classification Tasks with Semantic Graph Structures, International Journal of Innovative Computing, Information and Control, vol. 7, No. 5 (B), May 2011, pp. 2689-2698.

Wuchner et al., Data Loss Prevention Based on Data-Driven Usage Control, Proceedings of the Institute of Electrical and Electronics Engineers 23rd International Symposium on Software Reliability Engineering, Nov. 27-30, 2012, pp. 151-160.

Yao et al., Online Deception Detection Refueled by Real World Data Collection, Proceedings of Recent Advances in Natural Language Processing, Jul. 28, 2017, 10 pages.

Yessenalina et al., Compositional Matrix-Space Models for Sentiment Analysis, Proceedings of the 2011 Conference on Empirical Methods in Natural Language Processing, Jul. 27-31, 2011, pp. 172-182.

Zanzotto et al., Estimating Linear Models for Compositional Distributional Semantics, Proceedings of the 23rd International Conference on Computational Linguistics (COLING 2010), Aug. 23-27, 2010, pp. 1263-1271.

Zeilenga, Lightweight Directory Access Protocol (LDAP) Read Entry Controls, Standards Track, Network Working Group, IETF, RFC 4527, Jun. 2006, 8 pages.

Zhao et al., Facilitating Discourse Analysis with Interactive Visualization, Institute of Electrical and Electronics Engineers Transactions on Visualization and Computer Graphics, vol. 18, No. 12, Dec. 2012, 10 pages.

International Preliminary Report on Patentability issued in PCT/US2019/031580 dated Nov. 19, 2020, 8 pages.

U.S. Appl. No. 16/010,123, Non-Final Office Action, dated Feb. 8, 2021, 30 pages.

U.S. Appl. No. 16/240,232, Non-Final Office Action, dated Apr. 9, 2021, 13 pages.

Mathkour, "A Novel Rhetorical Structure Approach for Classifying Arabic Security Documents", International Journal of Computer Theory and Engineering, vol. 1, No. 3, Aug. 2009, pp. 195-200.

U.S. Appl. No. 16/789,849, Notice of Allowance dated Oct. 26, 2022, 11 pages.

U.S. Appl. No. 16/998,915, Non-Final Office Action dated Jan. 31, 2023, 27 pages.

U.S. Appl. No. 17/003,593, Non-Final Office Action dated Feb. 2, 2023, 18 pages.

U.S. Appl. No. 17/017,225, Non-Final Office Action dated Feb. 2, 2023, 31 pages.

Bhatia et al., Better Document-level Sentiment Analysis from RST Discourse Parsing, Proceedings of the 2015 Conference on Empirical Methods in Natural Language Processing, Sep. 2015, pp. 2212-2218.

Abro et al., Natural Language Understanding for Argumentative Dialogue Systems in the Opinion Building Domain, Available Online at: arXiv:2103.02691 v2 [cs.CL], Feb. 19, 2022, 21 pages.

Choi et al., QuAC: Question Answering in Context, Empirical Methods in Natural Language Processing, Aug. 28, 2018, pp. 2174-2184.

Chinese Application No. 201880030891.1, Office Action dated Feb. 16, 2023, 12 pages (9 pages of Original Document and 3 pages of English Translation).

Dinan et al., Wizard of Wikipedia: Knowledge-Powered Conversational Agents, Available Online at arXiv:1811.01241v2 [cs.CL], Feb. 21, 2019, 18 pages.

Galitsky et al., From Generalization of Syntactic Parse Trees to Conceptual Graphs, Proceedings of the 18th International Conference on Conceptual structures: From Information to Intelligence, Jul. 26, 2010, pp. 185-190.

Galitsky, Learning Discourse-Level Structures for Question Answering, In Developing Enterprise Chatbots Learning Linguistic Structures, Apr. 2019, pp. 177-220.

Galitsky et al., Mining the Blogosphere for Contributor's Sentiments, American Association for Artificial Intelligence, Jan. 2006, 3 pages.

Galitsky, Recommendation by Joining a Human Conversation, Artificial Intelligence for Customer Relationship Management: Solving Customer Problems, Dec. 24, 2020, pp. 63-92.

Guo et al., A Deep Relevance Matching Model for Ad-Hoc Retrieval, In Proceedings of the 25th ACM International on Conference on Information and Knowledge Management, Oct. 24-28, 2016, 11 pages.

Ji et al., An Information Retrieval Approach to Short Text Conversation, Available Online at: arXiv:1408.6988v1 [cs.IR], Aug. 29, 2014, 21 pages.

Larsson et al., Information State and Dialogue Management in the TRINDI Dialogue Move Engine Toolkit, Natural Language Engineering, vol. 6, No. 3-4, Sep. 2000, pp. 323-340.

Lavie et al., METEOR: An Automatic Metric for MT Evaluation with High Levels of Correlation with Human Judgments, Proceedings of the Second Workshop on Statistical Machine Translation, Jun. 2007, 4 pages.

Li et al., A Diversity-Promoting Objective Function for Neural Conversation Models, Available Online at: arXiv:1510.03055v3 [cs.CL], Jun. 10, 2016, 11 pages.

Li et al., Dialogue History Matters! Personalized Response Selection in Multi-Turn Retrieval-Based Chatbots, Available Online at: https://arxiv.org/abs/2103.09534, Mar. 17, 2021, 25 pages.

Lowe et al., The Ubuntu Dialogue Corpus: A Large Dataset for Research in Unstructured Multi-Turn Dialogue Systems, In Proceedings of the 16th Annual Meeting of the Special Interest Group on Discourse and Dialogue, Feb. 4, 2016, 10 pages.

Paranjape et al., Human-Like Informative Conversations: Better Acknowledgements Using Conditional Mutual Information, Available Online at: arXiv:2104.07831 v1 [cs.CL], Apr. 16, 2021, 14 pages.

Qu et al., Weakly-Supervised Open-Retrieval Conversational Question Answering, Available Online at arXiv:2103.02537v1 [cs.IR], Mar. 3, 2021, 15 pages.

Sordoni et al., A Neural Network Approach to Context-Sensitive Generation of Conversational Responses, Available Online at: arXiv:1506.06714v1 [cs.CL], Jun. 22, 2015, 11 pages.

Tao et al., Multi-Representation Fusion Network for Multi-Turn Response Selection in Retrieval-Based Chatbots, In Proceedings of the Twelfth ACM International Conference on Web Search and Data Mining, Feb. 11-15, 2019, pp. 267-275.

Van Eemeren, Argumentation Theory and Argumentative Practices: A Vital but Complex Relationship, Informal Logic, vol. 37, No. 4, Dec. 2017, pp. 322-350.

Vaswani et al., Attention is All You Need, 31st Conference on Neural Information Processing Systems, Available Online at: https://arxiv.org/pdf/1706.03762.pdf, Dec. 6, 2017, pp. 1-15.

Wang et al., A Dataset for Research on Short-Text Conversation, Proceedings of the 2013 Conference on Empirical Methods in Natural Language Processing, Oct. 18-21, 2013, pp. 935-945.

Wu et al., Sequential Matching Network: A New Architecture for Multi-Turn Response Selection in Retrieval-Based Chatbots, In Proceedings of the 55th Annual Meeting of the Association for Computational Linguistics (vol. 1: Long Papers), vol. 1, May 15, 2017, 10 pages.

Zhou et al., Multi-Turn Response Selection for Chatbots with Deep Attention Matching Network, Proceedings of the 56th Annual Meeting of the Association for Computational Linguistics (vol. 1: Long Papers), Jul. 2018, pp. 1118-1127.

(56) References Cited

OTHER PUBLICATIONS

Zhou et al., Multi-View Response Selection for Human-Computer Conversation, Proceedings of the 2016 Conference on Empirical Methods in Natural Language Processing, Nov. 2016, pp. 372-381.

U.S. Appl. No. 16/998,915, "Notice of Allowance", dated Mar. 30, 2023, 14 pages.

U.S. Appl. No. 17/003,593, "Notice of Allowance", dated Apr. 17, 2023, 12 pages.

U.S. Appl. No. 17/017,225, "Notice of Allowance", dated May 30, 2023, 17 pages.

* cited by examiner

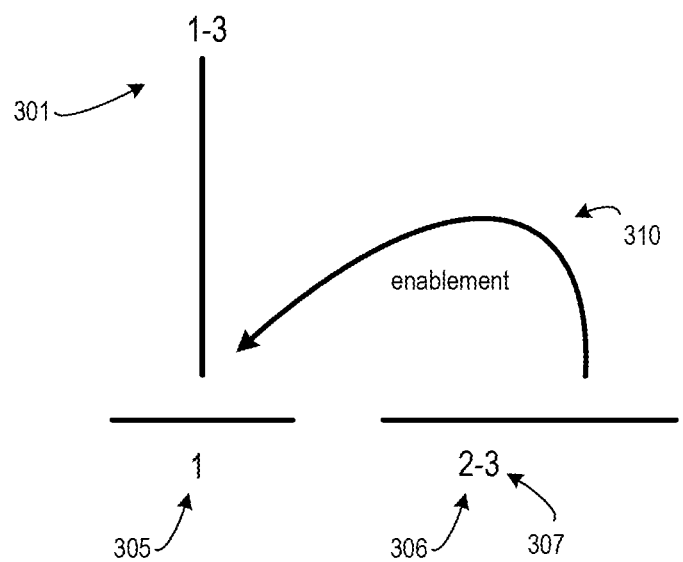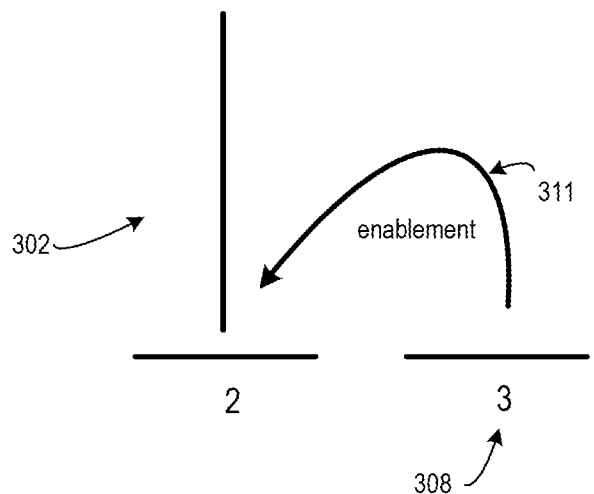
FIG. 3

2400

1-1) We express in predicate with arguments as sequence of NL expressions
```
Verify:Verb + border -of- area + border -have- pixel + pixel above 128
```

1-2) And now code it as predicates
```
epistemic_action(verify) & border(area) & border(pixel) & above(pixel, 128)
```

1-3) Convert constants into variables with proper generality control
```
epistemic_action(verify) & border(Area) & border(Pixel) & above(Pixel, 128)
```

1-5) Quantification
epistemic_action(verify) & border(Area) & not ( border(Pixel) & not
above(Pixel, 128)) & area(Area)

Loop => Pixel.next()

template for it.
2-2) Finding code template for specified epistemic action
```
Bool b0n=true;
while (!(ObjectToTest.next()==null)) {
    if !(Conditions) {
        b0n=false;
        break; }
} Return b0n;
```

Finally, we have
2-3) Resultant code fragment
```
while (!(Pixel.next()==null)) {
    if !(border.belong(Pixel) && Pixel.above(128)) {
        b0n=false;
        break; }
    }
Return b0n;
```

FIG. 25

Discourse acts of a dialogue (from Schiffrin 2005)

Discourse acts of a dialogue (from Schiffrin 2005)

ENABLING RHETORICAL ANALYSIS VIA THE USE OF COMMUNICATIVE DISCOURSE TREES

CROSS-REFERENCES TO RELATED APPLICATIONS

This application is a continuation of U.S. Ser. No. 15/975,685, filed May 9, 2018, which claims the benefit of U.S. Provisional Application No. 62/504,377, filed May 10, 2017, which is incorporated by reference in its entirety.

TECHNICAL FIELD

This disclosure is generally concerned with linguistics. More specifically, this disclosure relates to using communicative discourse trees to perform discourse analysis.

STATEMENT AS TO RIGHTS TO INVENTIONS MADE UNDER FEDERALLY SPONSORED RESEARCH AND DEVELOPMENT

Not Applicable

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

But such solutions are unable to leverage rich discourse related information to answer questions, perform dialog management, provide recommendations or implement "chatbot" systems, because existing solutions are unable to match an answer with a question due to insufficient rhetorical analysis. More specifically, statistical based solutions are unable to separate the task of determining a topic from a sentence and addressing rhetorical agreement between a sentence and an answer. Statistical-based solutions either do not consider rhetorical structure of a question and a response at all, or attempt to address topic and rhetorical agreement simultaneously and fail to properly address rhetorical agreement. Without sufficient rhetorical analysis, questions, which can have arbitrary rhetorical structure, cannot be matched with appropriate answers, which may also have arbitrary rhetorical structure.

Hence, new solutions are needed that can accurately represent rhetorical agreement between a question and an answer.

BRIEF SUMMARY

Generally, systems, devices, and methods of the present invention are related to calculating a rhetorical relationship between one or more sentences. In an example, a computer-implemented method accesses a sentence including fragments. At least one fragment includes a verb and a word. Each word can play a role within the words within the fragment. Each fragment is an elementary discourse unit. The method generates a discourse tree that represents rhetorical relationships between the sentence fragments. The discourse tree includes nodes including nonterminal and terminal nodes, each nonterminal node representing a rhetorical relationship between two of the sentence fragments, and each terminal node of the nodes of the discourse tree is associated with one of the sentence fragments. The method matches each fragment that has a verb to a verb signature, thereby creating communicative discourse tree.

The matching includes accessing multiple verb signatures. Each verb signature includes the verb of the fragment and a sequence of thematic roles. The method determines, for each verb signature of the verb signatures, a number of thematic roles of the respective signature that match a role of a word in the fragment. The method selects a particular verb signature from the verb signatures based on the particular verb signature including a highest number of matches. The method associates the particular verb signature with the fragment.

BRIEF DESCRIPTION OF THE DRAWINGS

FIG. 3 depicts a further example of a discourse tree in accordance with an aspect.

FIG. 24 illustrates annotated sentences in accordance with an aspect.

FIG. 25 illustrates annotated sentences in accordance with an aspect.

DETAILED DESCRIPTION

Figure 1:
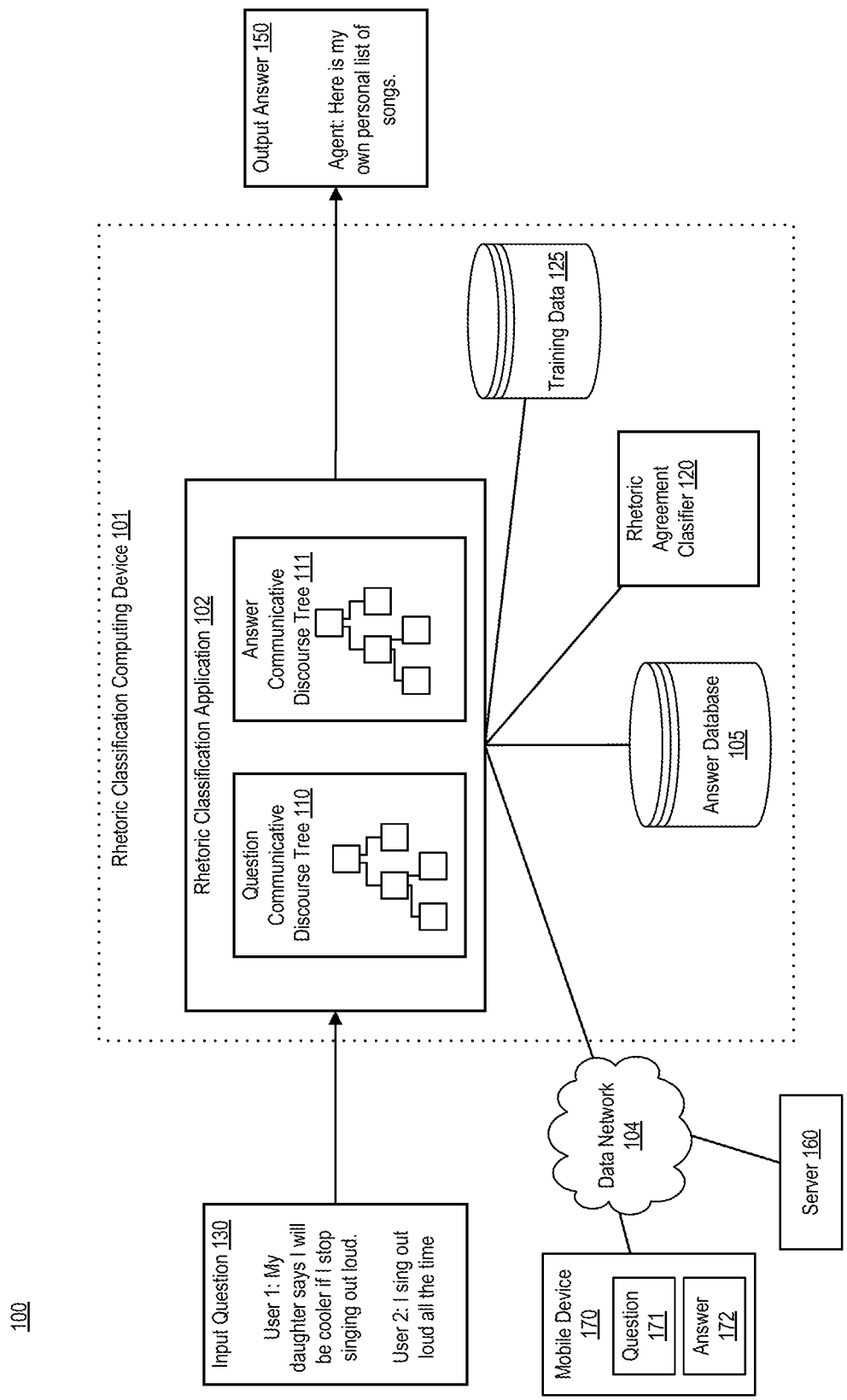
FIG. 1 shows an exemplary rhetoric classification environment, in accordance with an aspect.

Aspects disclosed herein provide technical improvements to the area of computer-implemented linguistics. More specifically, aspects described herein represent rhetorical relationships between one or more sentences in communicative discourse trees.

"Communicative discourse trees" or "CDTs" include discourse trees that are supplemented with communicative actions. A communicative action is a cooperative action undertaken by individuals based on mutual deliberation and argumentation.

Using communicative discourse trees, further aspects disclosed herein implement improved automated agents, or chatbots, that can answer questions received from users. Using communicative discourse trees, aspects overcome the limitations of previous systems, which are often unable to separate the task of determining a topic from a sentence and addressing rhetorical agreement between a sentence and an answer.

In an example, a rhetoric classification application executing on a computing device receives a question from a user. The rhetoric classification application generates a communicative discourse tree for the question. A communicative discourse tree is a discourse tree, or a tree that a discourse tree that includes communicative actions. The rhetoric classification application accesses a database of potential answers to the question. Using a predictive model, the rhetoric agreement application determines a level of complementarity between the question and each potential answer. Responsive to determining that the level of complementarity is above a threshold, the rhetoric agreement classifier provides the answer to the user, for example, via a display device.

Technical advantages of some aspects include improved autonomous agents such as chatbots and improved search engine performance over traditional statistical-based approaches. Traditional statistical keyword-based approaches either (i) fail to address the topic of a question, or (ii) fail to address the rhetorical agreement between the question and the answer. As such, existing autonomous agent solutions are capable of only scripted, or limited response to user questions. Such solutions are unable to determine whether an answer is fully responsive to a question.

For example, aspects described herein use, communicative discourse trees. Communicative discourse trees combine rhetoric information with communicative actions. By incorporating labels that identify communicative actions, learning of communicative discourse trees can occur over a richer features set than simply rhetoric relations and syntax of elementary discourse units (EDUs). With such a feature set, additional techniques such as classification can be used to determine a level of rhetoric agreement between questions and answers or request-response pairs, thereby enabling improved automated agents. In so doing, computing systems enable autonomous agents that are capable of intelligently answering questions and other messages.

CERTAIN DEFINITIONS

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary rhetoric classification environment, in accordance with an aspect. FIG. 1 depicts rhetoric classification computing device 101, input question 130, output question 150, data network 104, server 160, and mobile device 170. Rhetoric classification computing device 101 includes one or more of rhetoric classification application 102, answer database 105, rhetoric agreement classifier 120, and training data 125. Rhetoric classification application 102 includes one or more of question communicative discourse tree 110, answer communicative discourse tree 110.

Mobile device 170 can be any mobile device such as a mobile phone, smart phone, tablet, laptop, smart watch, and the like. Mobile device 170 communicates via data network 104 to server 160 or rhetoric classification computing device 101. In this manner, mobile device 170 can provide question 171, e.g., from a user, to server 160 or rhetoric classification computing device 101. In an example rhetoric classification computing device 101 determines a suitable answer 172 and provides answer 172, over data network 104, to mobile device 170.

Data network 104 can be any public or private network, wired or wireless network, Wide Area Network, Local Area Network, or the Internet.

In an example, rhetoric classification application 102 answers a question received via chat. More specifically, rhetoric classification application 102 receives input question 130, which can be a single question or a stream of questions such as a chat. Rhetoric classification application 102 creates question communicative discourse tree 110 and selects one or more candidate answers. The answers can be obtained from an existing database such as the answer database 105 or from server 160, communicating over data network 104. Server 160 can be a public or private internet server, such as a public database of user questions and answers.

From the candidate answer, rhetoric classification application 102 determines the most suitable answer. As further explained herein, different methods can be used. In an aspect, rhetoric classification application 102 can create a candidate answer communicative discourse tree for each candidate answer and compare question communicative discourse tree 110 with each candidate discourse tree. Rhetoric classification application 102 identifies a best match between question communicative discourse tree and the candidate answer communicative discourse trees. The rhetoric classification application 102 then accesses or queries a database for the text from the best communicative discourse tree. Rhetoric classification application 102 then sends text associated with the second communicative discourse tree to a mobile device.

In another aspect, rhetoric classification application 102 creates an answer communicative discourse tree 111 for each candidate answer. Rhetoric classification application 102 then, for each candidate answer, creates a question-answer pair that includes the question 130 and the candidate answer. Rhetoric classification application 102 provides the question-answer pairs to a predictive model such as rhetoric agreement classifier 120. Using a trained rhetoric agreement classifier 120, rhetoric classification application 102 determines whether the question-answer pair is above a threshold level of matching, e.g., indicating whether the answer addresses the question. If not, the rhetoric classification application 102 continues to analyze additional pairs that include the question and a different answer until a suitable answer is found. By using communicative discourse trees, the rhetorical agreement and communicative actions between the question and answer can be accurately modeled.

Rhetoric classification application 102 provides the answer as output answer 150. For example, as depicted in FIG. 1, an agent, implemented by rhetoric classification application 102, has provided the text "here is my own personal list of songs" in response to a chat history that involved two users discussing singing out loud.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |

| Relation Name | Nucleus | Satellite |
| --- | --- | --- |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
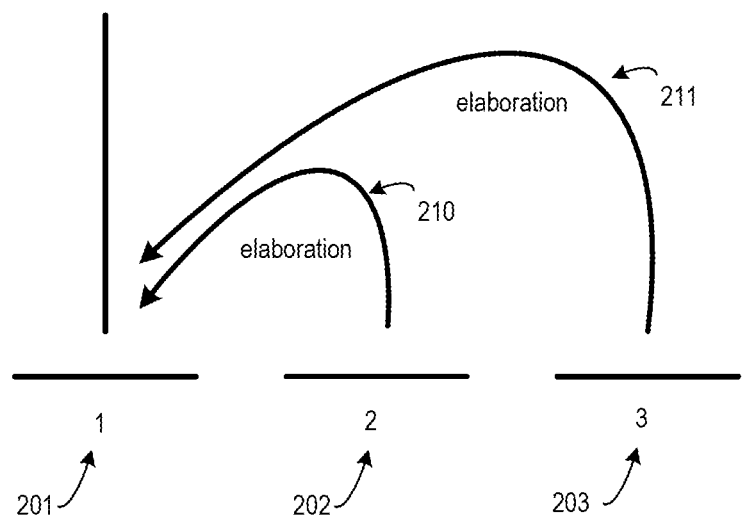
FIG. 2 depicts an example of a discourse tree in accordance with an aspect.

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
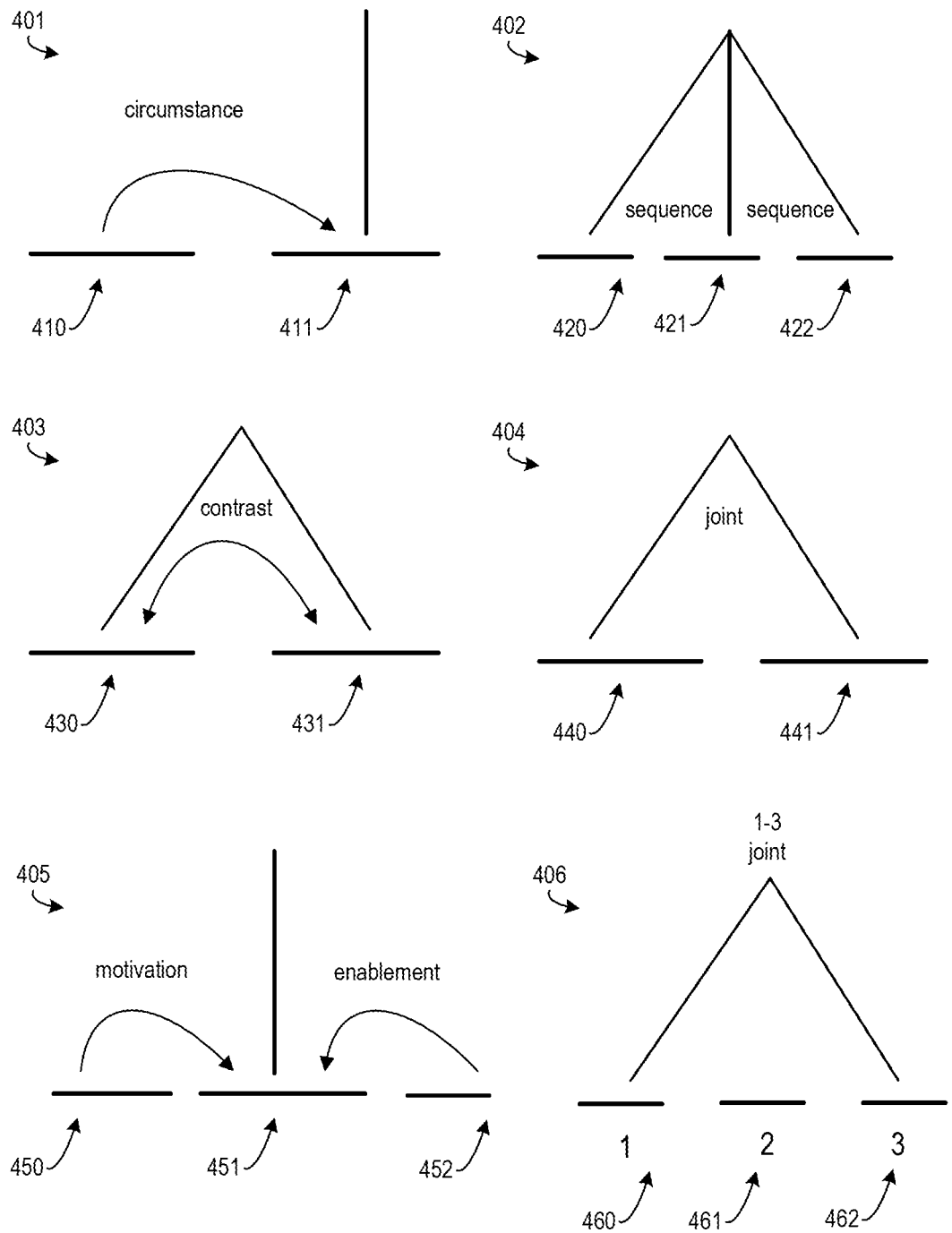
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
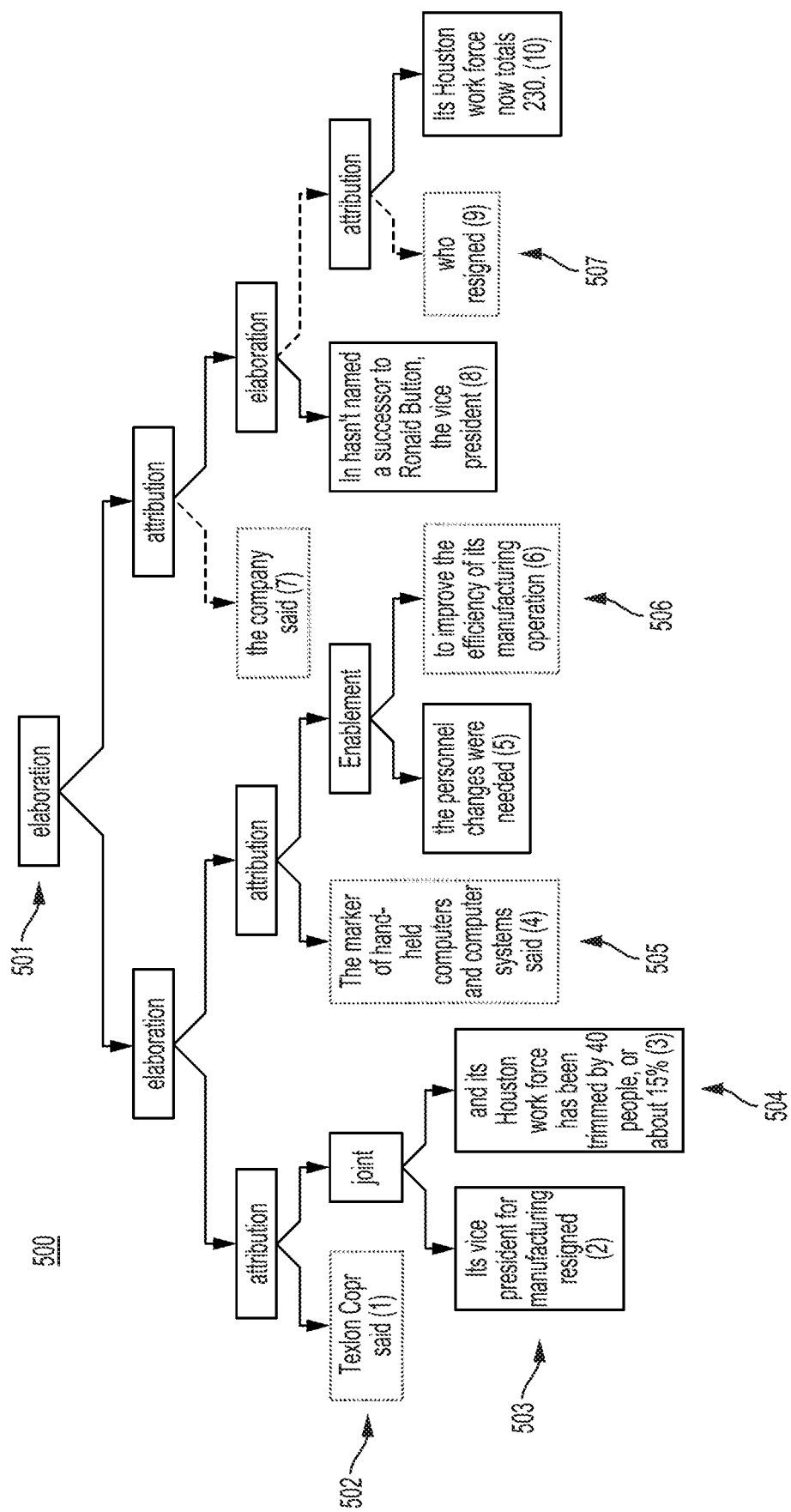
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
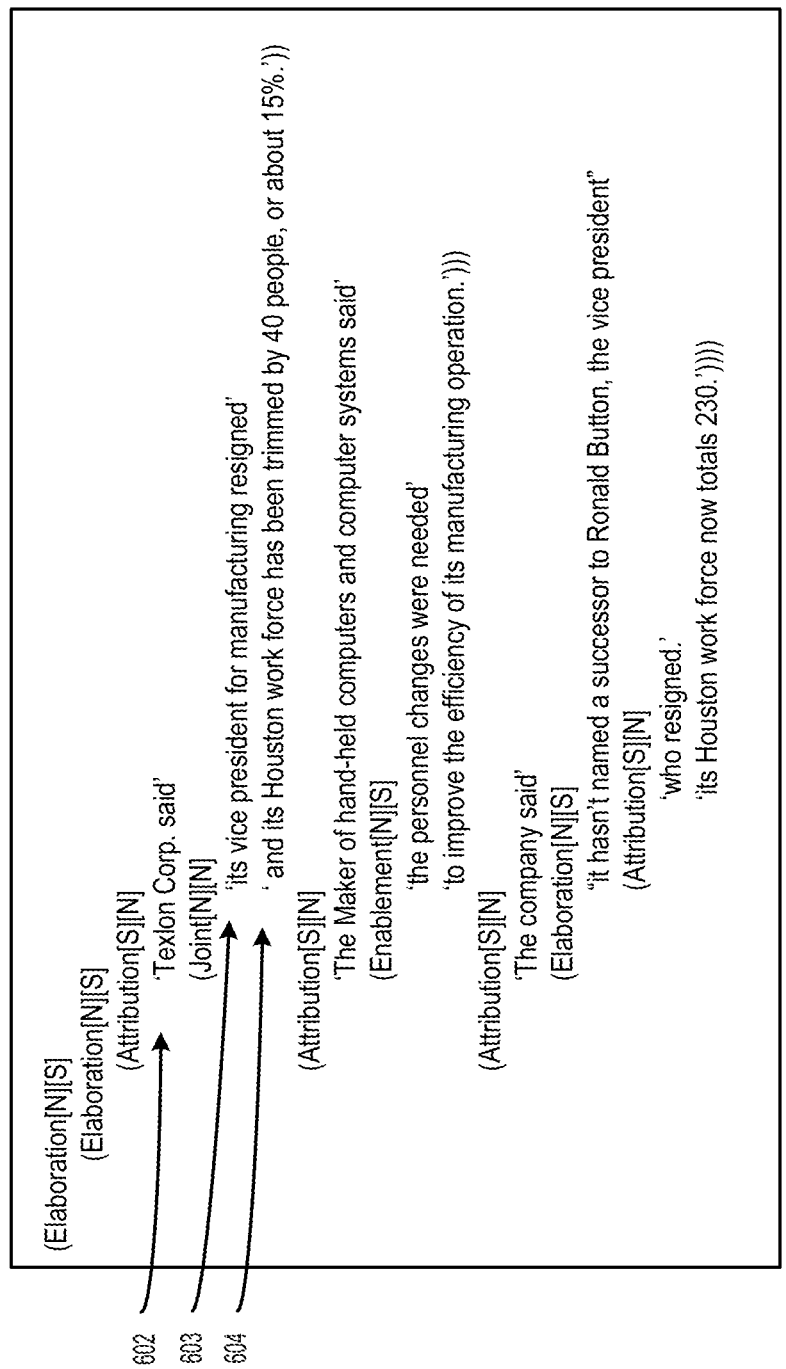
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2×((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
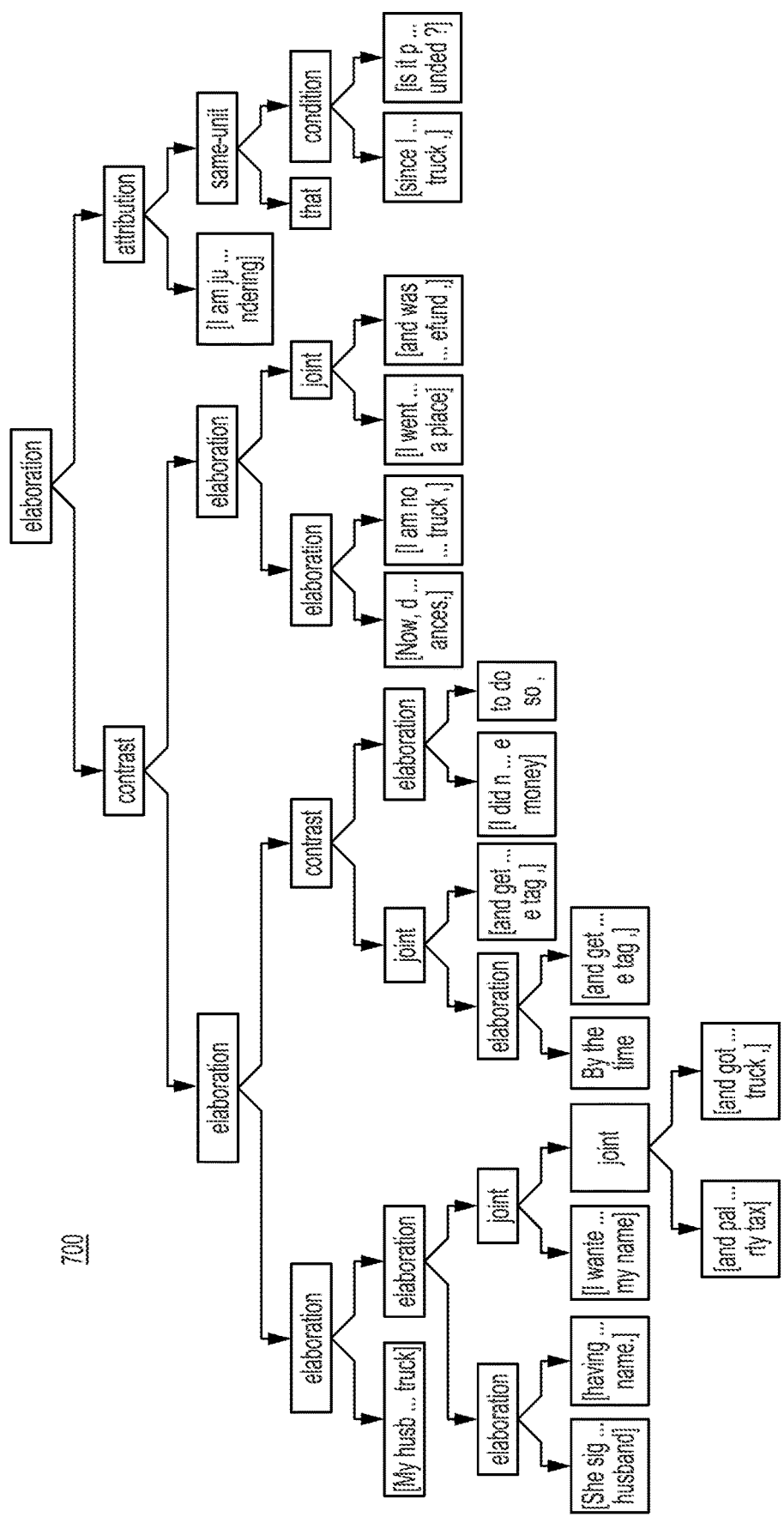
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
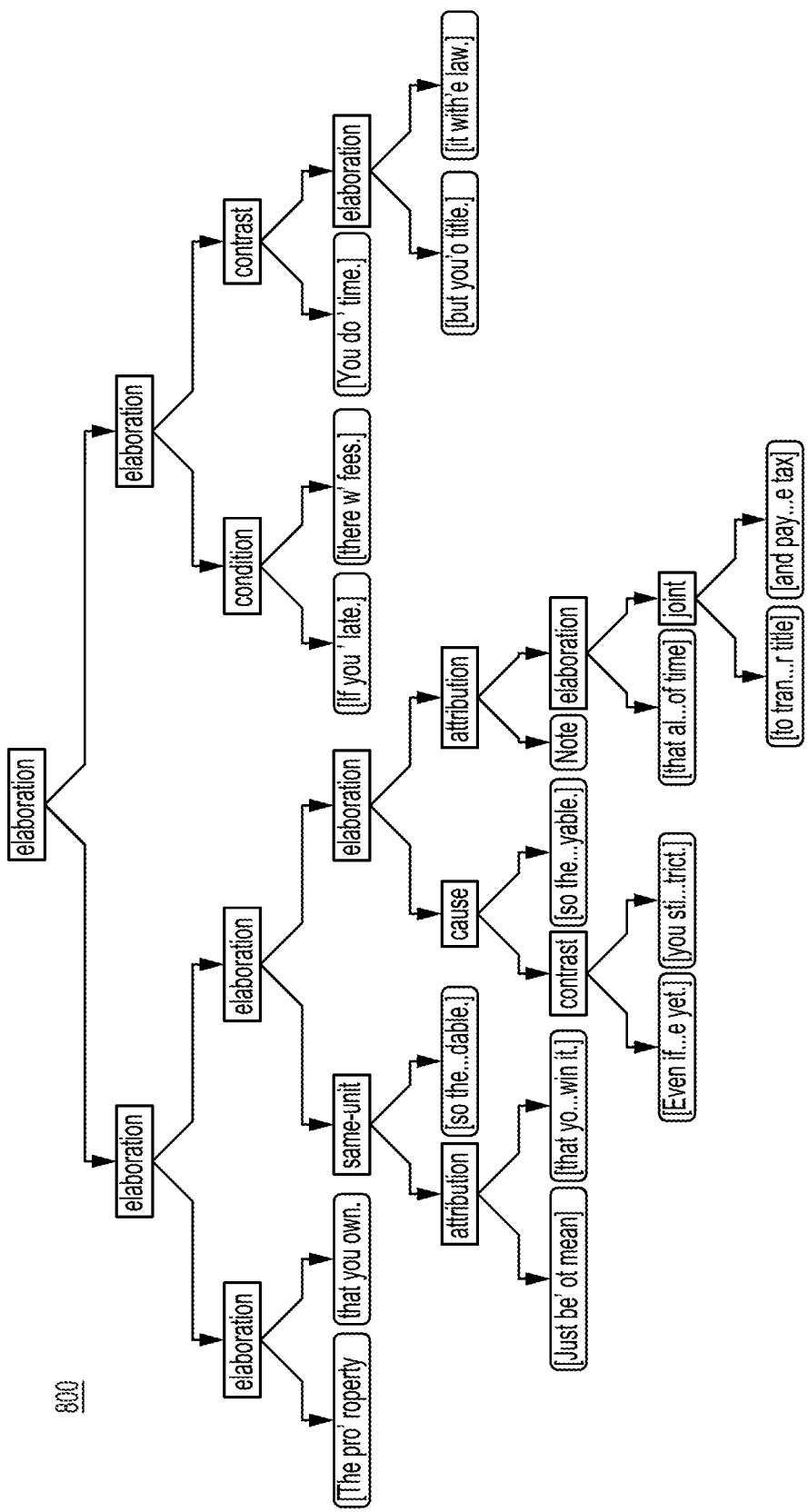
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
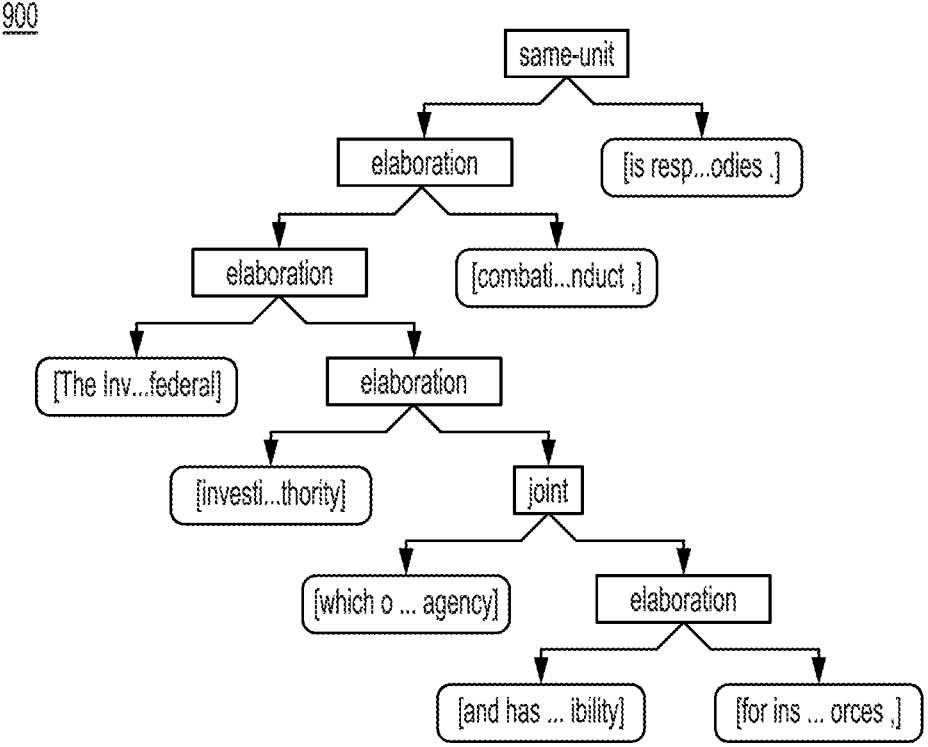
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
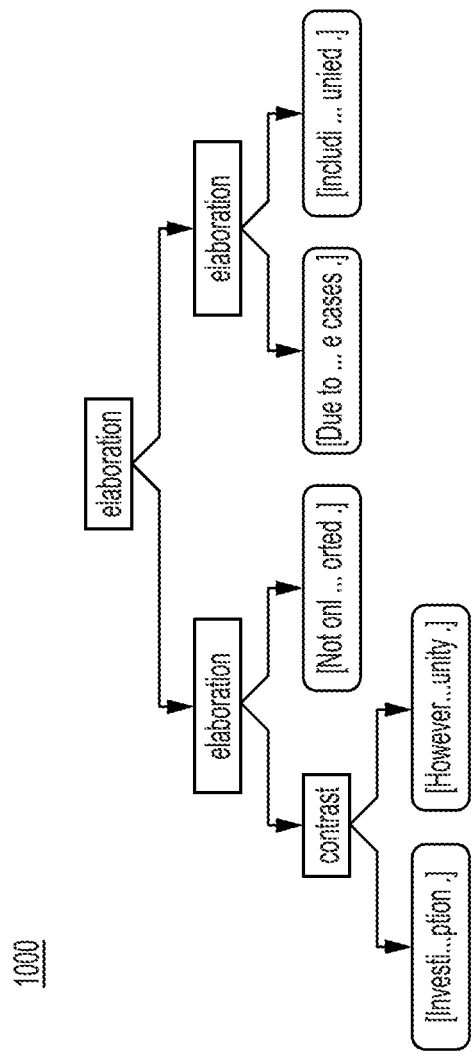
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Rhetoric classification application 102 can determine whether a given answer or response, such as an answer obtained from answer database 105 or a public database, is responsive to a given question, or request. More specifically, rhetoric classification application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Rhetoric classification application 102 can determine similarity between question-answer pairs using different methods. For example, rhetoric classification application 102 can determine level of similarity between an individual question and an individual answer. Alternatively, rhetoric classification application 102 can determine a measure of similarity between a first pair including a question and an answer, and a second pair including a question and answer.

For example, rhetoric classification application 102 uses rhetoric agreement classifier 120 trained to predict matching or non-matching answers. Rhetoric classification application 102 can process two pairs at a time, for example <q1, a1> and <q2, a2>. Rhetoric classification application 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, rhetoric classification application 102 uses training data 125 to train rhetoric agreement classifier 120. In this manner, rhetoric agreement classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, rhetoric classification application 102 provides a training pair to rhetoric agreement classifier 120 and receives, from the model, a level of complementarity. Rhetoric classification application 102 calculates a loss function by determining a difference between the determined level of complementarity and an expected level of complementarity for the particular training pair. Based on the loss function, rhetoric classification application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Rhetoric classification application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov SO. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
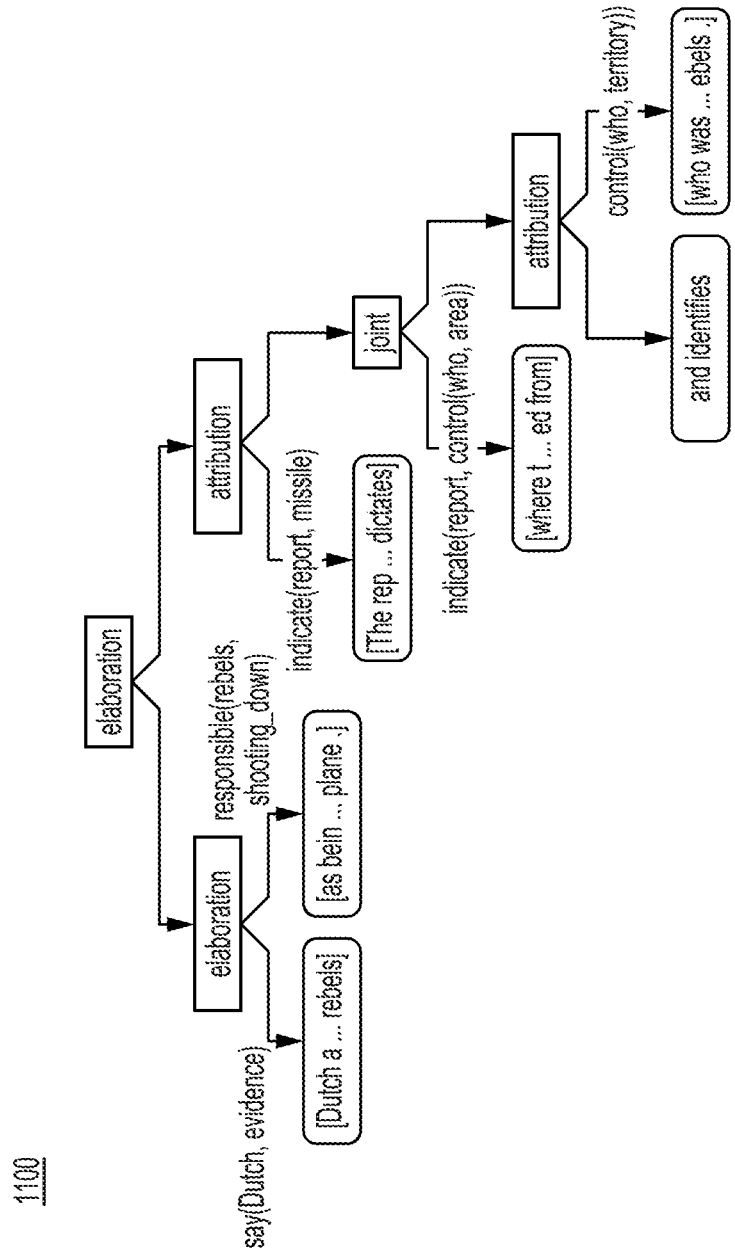
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
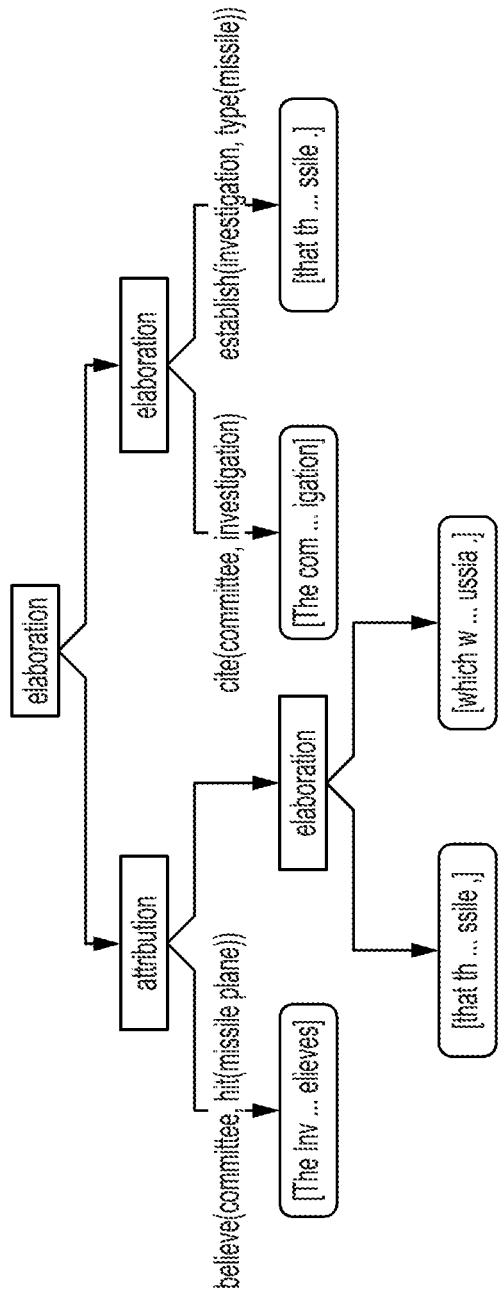
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
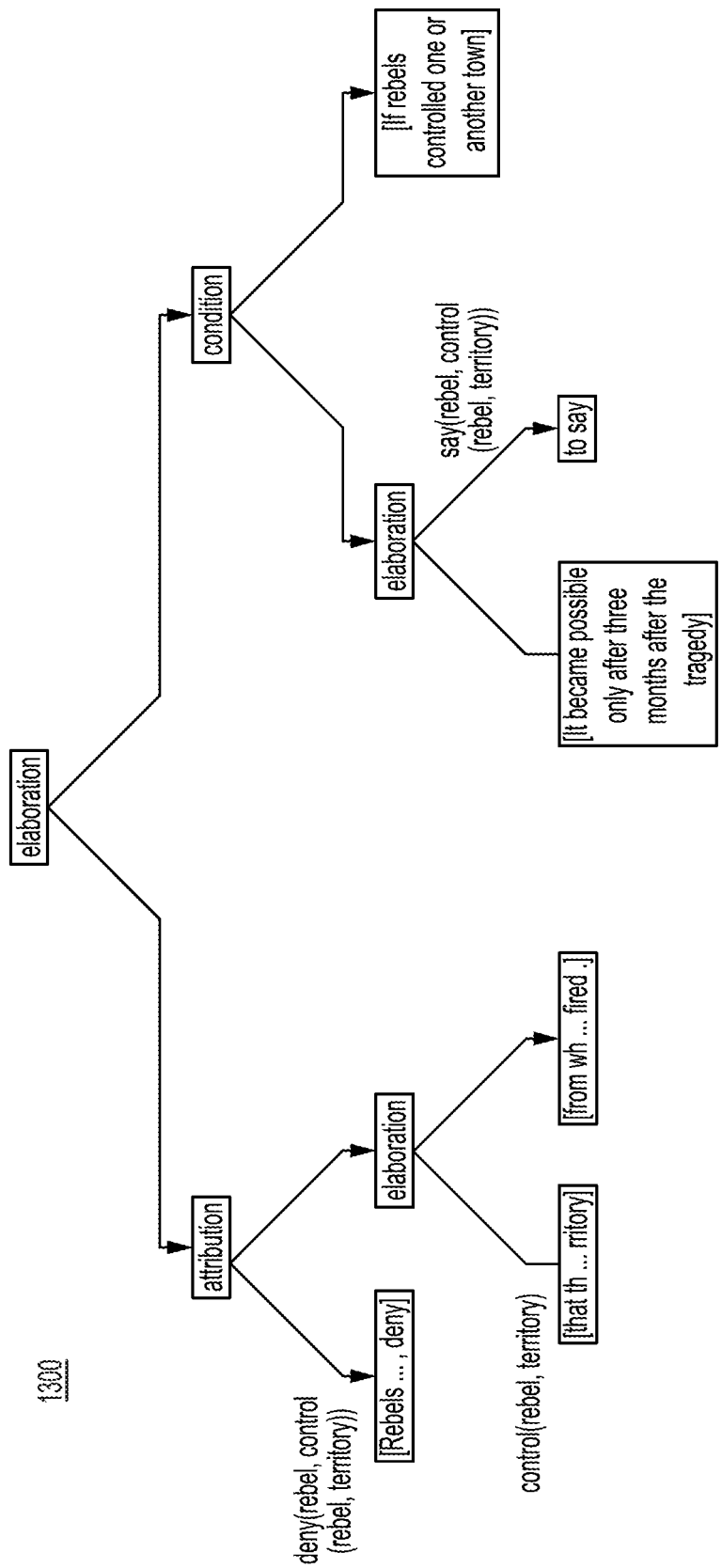
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children."
  Syntax: Stimulus V Experiencer. Clause: amuse (Stimulus, E, Emotion, Experiencer), cause (Stimulus, E), emotional state(result(E), Emotion, Experiencer).

NP V ADV-Middle. Example: "Small children amuse quickly." Syntax: Experiencer V ADV. Clause: amuse (Experiencer, Prop):-, property(Experiencer, Prop), adv (Prop).

NP V NP-PRO-ARB. Example "The teacher amused." Syntax Stimulus V. amuse(Stimulus, E, Emotion, Experiencer): cause(Stimulus, E), emotional state(result(E), Emotion, Experiencer).

NP. cause V NP. Example "The teacher's dolls amused the children." syntax Stimulus <+genitive>('s) V Experiencer. amuse(Stimulus, E, Emotion, Experiencer): cause (Stimulus, E), emotional state(during(E), Emotion, Experiencer).

NP V NP ADJ. Example "This performance bored me totally." syntax Stimulus V Experiencer Result. amuse (Stimulus, E, Emotion, Experiencer). cause(Stimulus, E), emotional state(result(E), Emotion, Experiencer), Pred (result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer).
Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can expressed as common sub-graphs of parse thickets. The higher the number of common graph nodes, the higher the similarity.

Figure 14:
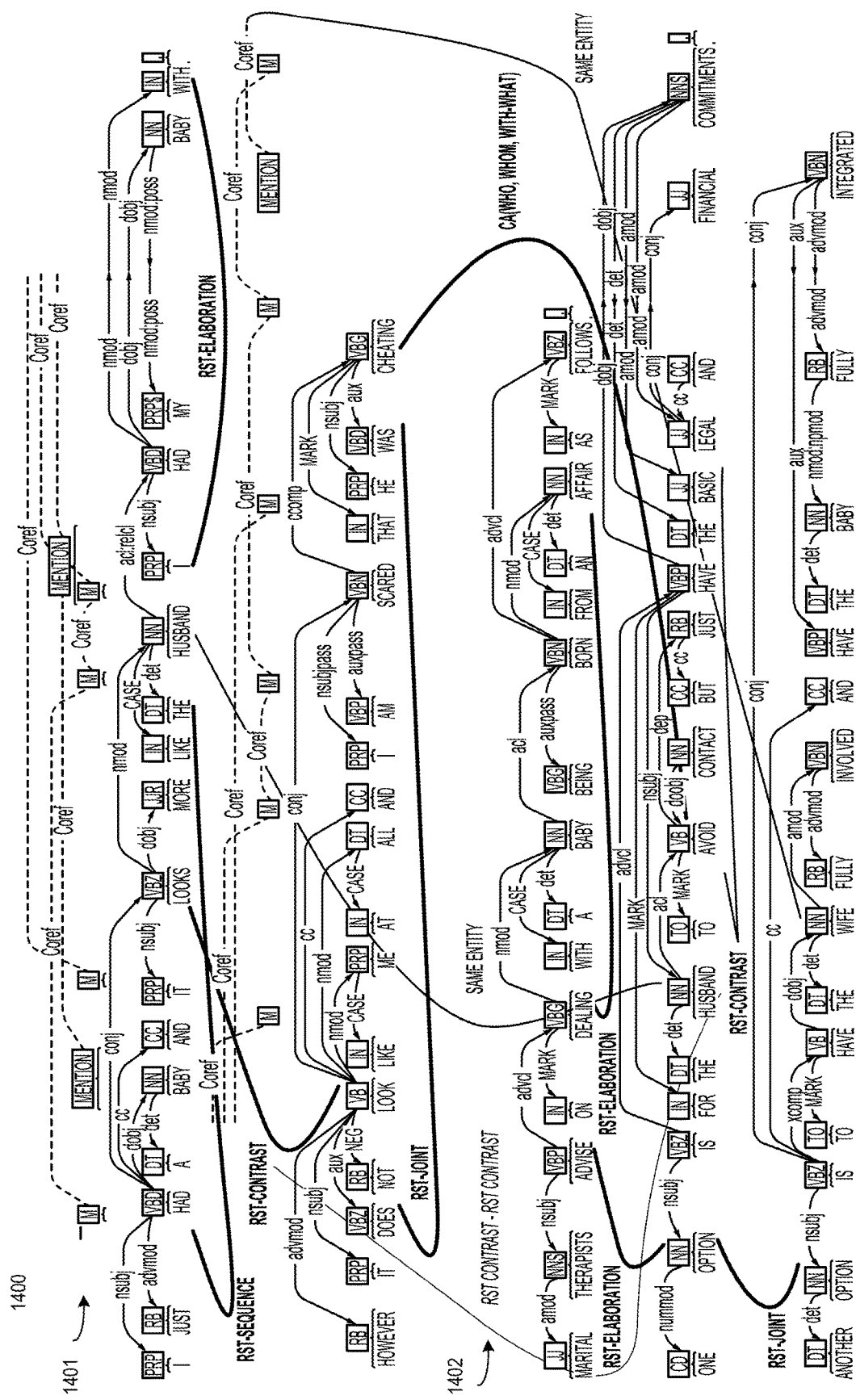
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={action$_1$, action$_2$ . . . action$_n$} is a finite set of vertices corresponding to communicative actions, and A is a finite set of labeled arcs (ordered pairs of vertices), classified as follows:

Each arc action$_i$, action$_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j$=$s_i$ or different subjects. Each arc action$_i$, action$_j \in A_{cause}$ corresponds to an attack relationship between action$_i$ and action$_j$ indicating that the cause of action$_i$ in conflict with the subject or cause of action$_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for A$_{sequence}$ arcs, at most one incoming and only one outgoing arc are admissible, and (3) for A$_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{\ }rst2(N2,S2,W2,R2)=(rst1\hat{\ }rst2)$$
$$(N1\hat{\ }N2,S1\hat{\ }S2,W1\hat{\ }W2,R1\hat{\ }R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst—background^ rst—enablement=(S increases the ability of R to comprehend an element in N)^(R comprehending S increases the ability of R to perform the action in N)=increase-VB the-DT ability-NN of-IN R-NN to-IN.

Because the relations rst–background^rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
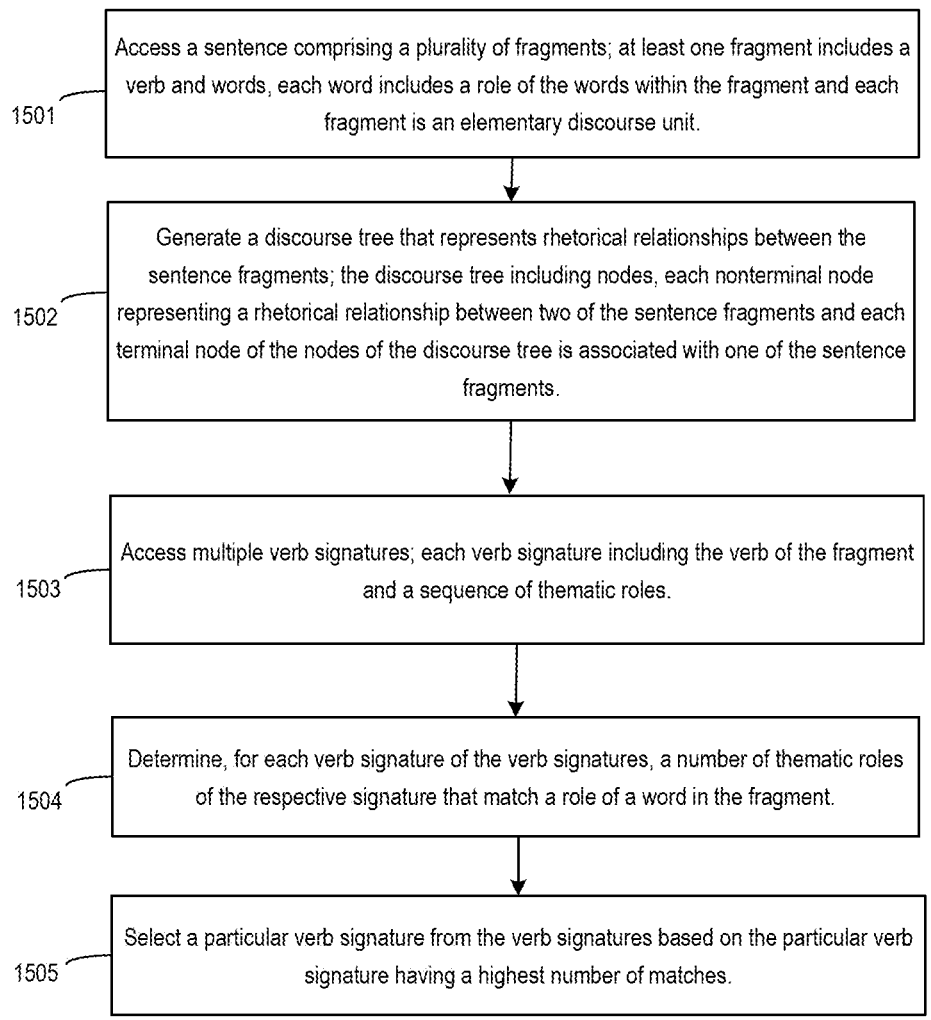
FIG. 15 illustrates an exemplary process for building a communicative discourse tree in accordance with an aspect.

FIG. 15 illustrates an exemplary process for building a communicative discourse tree in accordance with an aspect. Rhetoric classification application 102 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, rhetoric classification application 102 accesses a sentence such as "Rebels, the self-proclaimed Donetsk People's Republic, deny that they controlled the territory from which the missile was allegedly fired" as described with respect to FIG. 13.

Continuing the example, rhetoric classification application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny"

for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, rhetoric classification application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, rhetoric classification application 102 accesses a list of verbs, e.g., from VerbNet. Each verb matches or is related to the verb of the fragment. For example, the for the first fragment, the verb is "deny." Accordingly, rhetoric classification application 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," rhetoric classification application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Rhetoric classification application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic. [0189] At block 1504, process 1500 involves determining, for each verb signature of the verb signatures, a number of thematic roles of the respective signature that match a role of a word in the fragment. For the first fragment, rhetorical classification application 102 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Representing a Request-Response

Request-response pairs can be analyzed alone or as pairs. In an example, request-response pairs can be chained together. In a chain, rhetoric agreement is expected to hold not only between consecutive members but also triples and four-tuples. A discourse tree can be constructed for a text expressing a sequence of request-response pairs. For example, in the domain of customer complaints, request and response are present in the same text, from the viewpoint of a complainant. Customer complaint text can to be split into request and response text portions and then form the positive and negative dataset of pairs. In an example, all text for the proponent and all text for the opponent is combined. The first sentence of each paragraph below will form the Request part (which will include three sentences) and second sentence of each paragraph will form the Response part (which will also include three sentences in this example).

Figure 16:
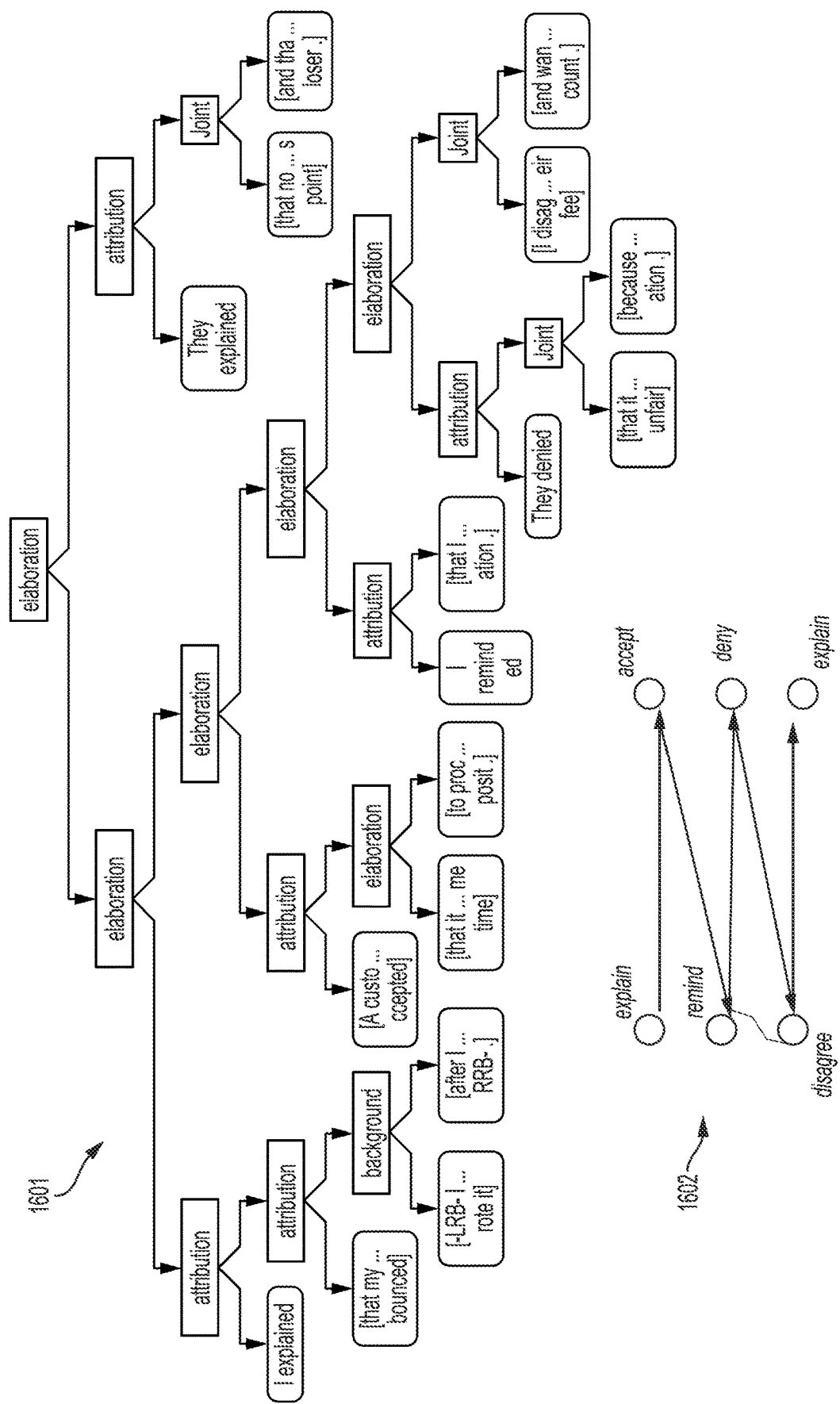
FIG. 16 illustrates a discourse tree and scenario graph in accordance with an aspect.

FIG. 16 illustrates a discourse tree and scenario graph in accordance with an aspect. FIG. 16 depicts discourse tree 1601 and scenario graph 1602. Discourse tree 1601 corresponds to the following three sentences:

(1) I explained that my check bounced (I wrote it after I made a deposit). A customer service representative accepted that it usually takes some time to process the deposit.

(2) I reminded that I was unfairly charged an overdraft fee a month ago in a similar situation. They denied that it was unfair because the overdraft fee was disclosed in my account information.

(3) I disagreed with their fee and wanted this fee deposited back to my account. They explained that nothing can be done at this point and that I need to look into the account rules closer.

As can be seen by the discourse tree in FIG. 16, determining whether the text represents an interaction or a description can be hard to judge. Hence, by analyzing the arcs of communicative actions of a parse thicket, implicit similarities between texts can be found. For example, in general terms:

(1) one communicative actions from with its subject from a first tree against another communicative action with its subject from a second tree (communicative action arc is not used).

(2) a pair of communicative actions with their subjects from a first tree against another pair of communicative actions from a second tree (communicative action arcs are used).

For example, in the previous example, the generalization of cheating (husband, wife, another lady)^avoid (husband, contact (husband, another lady)) provides us communicative_action(husband, *) which introduces a constraint on A in the form that if a given agent (=husband) is mentioned as a subject of CA in Q, he(she) should also be a subject of (possibly, another) CA in A.

To handle meaning of words expressing the subjects of CAs, a word can be applied to a vector model such as the "word2vector" model. More specifically, to compute generalization between the subjects of communicative actions, the following rule can be used: if subject1=subject2, subject1^subject2=<subject1, POS(subject1), 1>. Here subject remains and score is 1. Otherwise, if the subjects have the same part-of-speech (POS), then subject1^subject2=<*, POS(subject1), word2vecDistance(subject1^subject2)>. '*' denotes that lemma is a placeholder, and the score is a word2vec distance between these words. If POS is different, generalization is an empty tuple and may not be further generalized.

Classification Settings for Request-Response Pairs

In a conventional search, as a baseline, the match between request response pairs can be measured in terms of keyword statistics such as short for term frequency-inverse document frequency (TF*IDF). To improve search relevance, this score is augmented by item popularity, item location or taxonomy-based score (Galitsky 2015). Search can also be formulated as a passage re-ranking problem in machine learning framework. The feature space includes request-response pairs as elements, and a separation hyper-plane splits this feature space into correct and incorrect pairs. Hence a search problem can be formulated in a local way, as similarity between Req and Resp, or in a global, learning way, via similarity between request-response pairs.

Other methods are possible for determining a match between request and response. In a first example, rhetoric classification application 102 extracts features for Req and Resp and compares the features as a count, introducing a scoring function such that a score would indicate a class (low score for incorrect pairs, high score for correct ones)

In a second example, rhetoric classification application 102 compares representations for Req and Resp against each other, and assigns a score for the comparison result. Analogously, the score will indicate a class.

In a third example, rhetoric classification application 102 builds a representation for a pair Req and Resp, <Req, Resp> as elements of training set. Rhetoric classification application 102 then performs learning in the feature space of all such elements <Req, Resp>.

Figure 17:
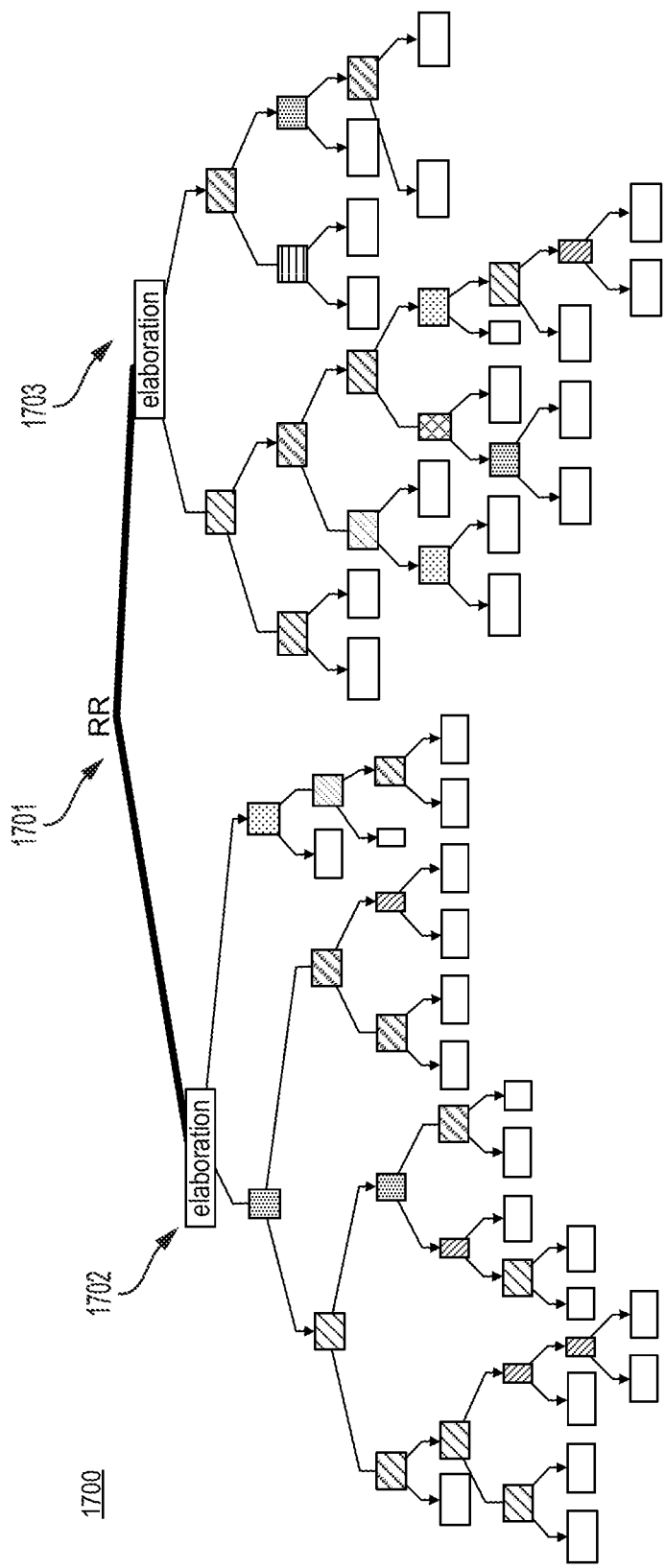
FIG. 17 illustrates forming a request-response pair in accordance with an aspect.

FIG. 17 illustrates forming a request-response pair in accordance with an aspect. FIG. 17 depicts request-response pair 1701, request tree (or object) 1702, and response tree 1703. To form a <Req, Resp> object, the rhetoric classification application 102 combines the discourse tree for the request and the discourse tree for the response into a single tree with the root RR. The rhetoric classification application 102 then classifies the objects into correct (with high agreement) and incorrect (with low agreement) categories.

Nearest Neighbor Graph-Based Classification

Once a CDT is built, in order to identify an argument in text, rhetoric classification application 102 compute the similarity compared to CDTs for the positive class and verify that it is lower to the set of CDTs for its negative class. Similarity between CDT is defined by means of maximal common sub-CDTs.

In an example, an ordered set G of CDTs(V,E) with vertex- and edge-labels from the sets $(\Lambda_\zeta, \preceq)$ and $(\Lambda_E, \preceq)$ is constructed. A labeled CDT F from G is a pair of pairs of the form ((V,1),(E,b)), where V is a set of vertices, E is a set of edges, $1: V \to \Lambda_\zeta$ is a function assigning labels to vertices, and b: $E \to \Lambda_E$ is a function assigning labels to edges. Isomorphic trees with identical labeling are not distinguished.

The order is defined as follows: For two CDTs $\Gamma_1:=((V_1, l_1),(E_1,b_1))$ and $\Gamma_2:=((V_2,l_2),(E_2,b_2))$ from G, then that $\Gamma_1$ dominates $\Gamma_2$ or $\Gamma_2 \leq \Gamma_1$ (or $\Gamma_2$ is a sub-CDT of $\Gamma_1$) if there exists a one-to-one mapping $\varphi: V_2 \to V_1$ such that it (1) respects edges: $(v,w) \in E_2 \Rightarrow (\varphi(v), \varphi(w)) \in E_1$, and (2) fits under labels: $l_2(v) \preceq l_1(\varphi(v))$, $(v,w) \in E_2 \Rightarrow b_2(v,w) \preceq b_1(\varphi(v), \varphi(w))$.

This definition takes into account the calculation of similarity ("weakening") of labels of matched vertices when passing from the "larger" CDT $G_1$ to "smaller" CDT $G_2$.

Now, similarity CDT Z of a pair of CDTs X and Y, denoted by X^Y=Z, is the set of all inclusion-maximal common sub-CDTs of X and Y, each of them satisfying the following additional conditions (1) to be matched, two vertices from CDTs X and Y must denote the same RST relation; and (2) each common sub-CDT from Z contains at least one communicative action with the same VerbNet signature as in X and Y.

This definition is easily extended to finding generalizations of several graphs. The subsumption order $\mu$ on pairs of graph sets X and Y is naturally defined as $X\mu Y:=X*Y=X$.

Figure 18:
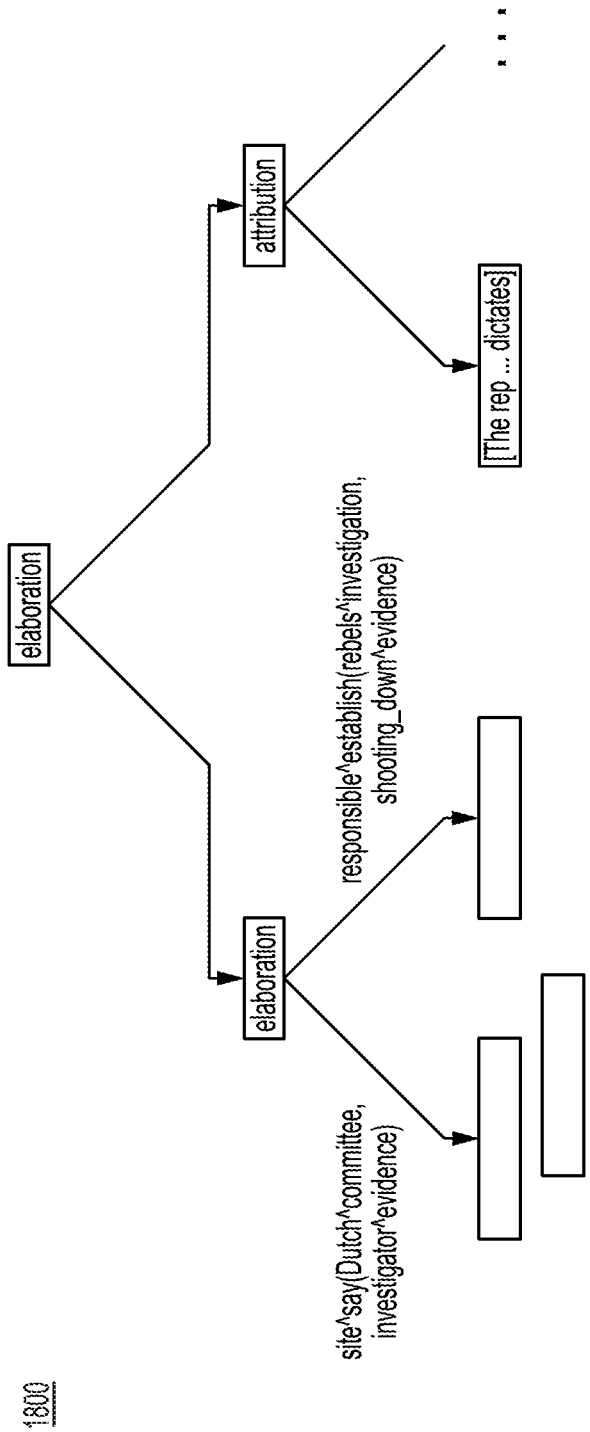
FIG. 18 illustrates a maximal common sub-communicative discourse tree in accordance with an aspect.

FIG. 18 illustrates a maximal common sub-communicative discourse tree in accordance with an aspect. Notice that the tree is inverted and the labels of arcs are generalized: Communicative action site( ) is generalized with communicative action say( ). The first (agent) argument of the former CA committee is generalized with the first argument of the latter CA Dutch. The same operation is applied to the second arguments for this pair of CAs: investigator^evidence.

CDT U belongs to a positive class such that (1) U is similar to (has a nonempty common sub-CDT) with a positive example $R^+$ and (2) for any negative example $R^-$, if U is similar to $R^-$ (i.e., $U*R^- \neq \emptyset$) then $U*R^- \mu U*R^+$.

This condition introduces the measure of similarity and says that to be assigned to a class, the similarity between the unknown CDT U and the closest CDT from the positive class should be higher than the similarity between U and each negative example. Condition 2 implies that there is a positive example $R^+$ such that for no $R^-$ one has $U*R^+ \mu R^-$, i.e., there is no counterexample to this generalization of positive examples.

Thicket Kernel Learning for CDT

Tree Kernel learning for strings, parse trees and parse thickets is a well-established research area these days. The parse tree kernel counts the number of common sub-trees as the discourse similarity measure between two instances. Tree kernel has been defined for DT by Joty, Shafiq and A. Moschitti. Discriminative Reranking of Discourse Parses Using Tree Kernels. Proceedings of EMNLP. (2014). See also Wang, W., Su, J., & Tan, C. L. (2010). Kernel Based Discourse Relation Recognition with Temporal Ordering Information. In Proceedings of the 48th Annual Meeting of the Association for Computational Linguistics. (using the special form of tree kernels for discourse relation recognition). A thicket kernel is defined for a CDT by augmenting a DT kernel by the information on communicative actions.

A CDT can be represented by a vector V of integer counts of each sub-tree type (without taking into account its ancestors):

V (T)=(# of subtrees of type 1, . . . , # of subtrees of type I, . . . , # of subtrees of type n). This results in a very high dimensionality since the number of different sub-trees is exponential in its size. Thus, it is computational infeasible to directly use the feature vector $\emptyset(T)$. To solve the computational issue, a tree kernel function is introduced to calculate the dot product between the above high dimensional vectors efficiently. Given two tree segments CDT1 and CDT2, the tree kernel function is defined:

$K(CDT1,CDT2)=<V(CDT1),V(CDT2)>=\Sigma i\ V(CDT1)$
$[i],V(CDT2)[i]=\Sigma n1\Sigma n2\Sigma i\ Ii(n1)*Ii(n2)$ where $n1 \in N1$, $n2 \in N2$ where N1 and N2 are the sets of all nodes in CDT1 and CDT2, respectively;

Ii (n) is the indicator function.

Ii (n)={1 iff a subtree of type i occurs with root at node; 0 otherwise}. K (CDT1, CDT2) is an instance of convolution kernels over tree structures (Collins and Duffy, 2002) and can be computed by recursive definitions:

$\Delta$ (n1, n2)=$\Sigma I\ Ii(n1)*Ii(n2)$

A (n1, n2)=0 if n1 and n2 are assigned the same POS tag or their children are different subtrees. Otherwise, if both n1 and n2 are POS tags (are pre-terminal nodes) then $\Delta$ (n1, n2)=1×$\lambda$; Otherwise, $\Delta$ (n1, n2)=$\lambda \Pi_{j=1}^{nc(n1)}(1+\Delta$ (ch(n1, j), ch(n2, j)))

where ch(n,j) is the jth child of node n, nc($n_1$) is the number of the children of $n_1$, and $\lambda$ (0<$\lambda$<1) is the decay factor in order to make the kernel value less variable with respect to the sub-tree sizes. In addition, the recursive rule (3) holds because given two nodes with the same children, one can construct common sub-trees using these children and common sub-trees of further offspring. The parse tree kernel counts the number of common sub-trees as the syntactic similarity measure between two instances.

Figure 19:
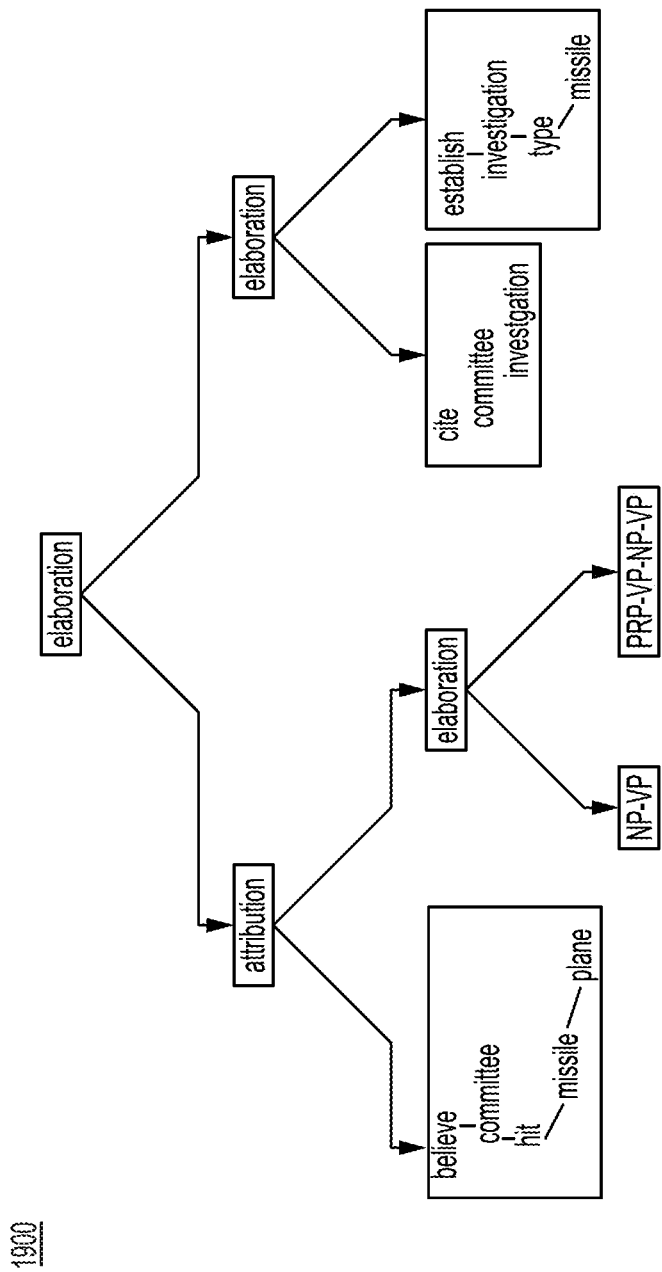
FIG. 19 illustrates a tree in a kernel learning format for a communicative discourse tree in accordance with an aspect.

FIG. 19 illustrates a tree in a kernel learning format for a communicative discourse tree in accordance with an aspect.

The terms for Communicative Actions as labels are converted into trees which are added to respective nodes for RST relations. For texts for EDUs as labels for terminal nodes only the phrase structure is retained. The terminal nodes are labeled with the sequence of phrase types instead of parse tree fragments.

If there is a rhetoric relation arc from a node X to a terminal EDU node Y with label A(B, C(D)), then the subtree A-B→(C-D) is appended to X.

Implementation of the Rhetoric Agreement Classifier

Figure 20:
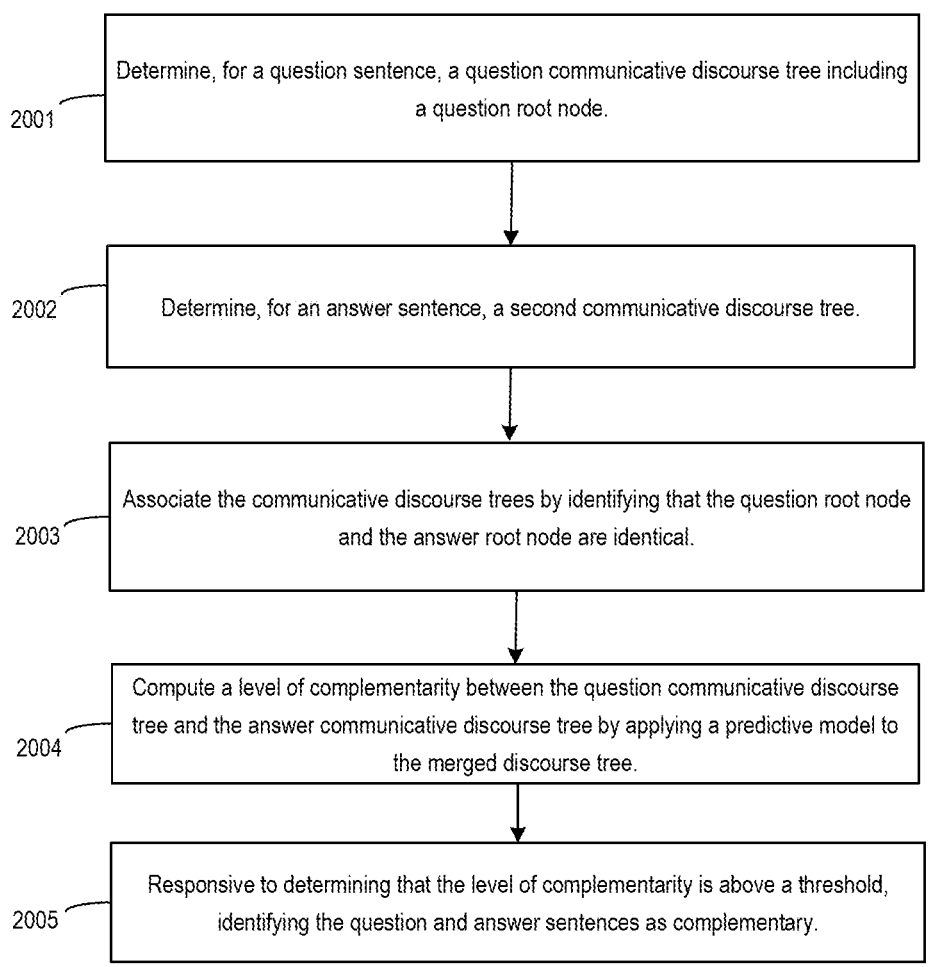
FIG. 20 illustrates an exemplary process used to implement a rhetoric agreement classifier in accordance with an aspect.

Rhetoric agreement classifier 120 can determine the complementarity between two sentences, such as a question and an answer, by using communicative discourse trees. FIG. 20 illustrates an exemplary process used to implement a rhetoric agreement classifier in accordance with an aspect. FIG. 20 depicts process 2000, which can be implemented by rhetoric classification application 102. As discussed, rhetoric agreement classifier 120 is trained with training data 125.

Rhetoric agreement classifier 120 determines a communicative discourse tree for both question and answer. For example, rhetoric agreement classifier 120 constructs question communicative discourse tree 110 from a question such as question 171 or question 130, and answer communicative discourse tree 111 from a candidate answer.

At block 2001, process 2000 involves determining, for a question sentence, a question communicative discourse tree including a question root node. A question sentence can be an explicit question, a request, or a comment. Rhetoric classification application 102 creates question communicative discourse tree 110 from question 130. Using the example discussed in relation to FIGS. 13 and 15, an example question sentence is "are rebels responsible for the downing of the flight." Rhetoric classification application 102 can use process 1500 described with respect to FIG. 15. The example question has a root node of "elaborate."

At block 2002, process 2000 involves determining, for an answer sentence, a second communicative discourse tree, wherein the answer communicative discourse tree includes an answer root node. Continuing the above example, rhetoric classification application 102 creates an communicative discourse tree 111, as depicted in FIG. 13, which also has a root node "elaborate."

At block 2003, process 2000 involves associating the communicative discourse trees by identifying that the question root node and the answer root node are identical. Rhetoric classification application 102 determines that the question communicative discourse tree 110 and answer communicative discourse tree 111 have an identical root node. The resulting associated communicative discourse tree is depicted in FIG. 17 and can be labeled as a "request-response pair."

At block 2004, process 2000 involves computing a level of complementarity between the question communicative discourse tree and the answer communicative discourse tree by applying a predictive model to the merged discourse tree.

The rhetoric agreement classifier uses machine learning techniques. In an aspect, the rhetoric classification application 102 trains and uses rhetoric agreement classifier 120. For example, rhetoric classification application 102 defines positive and negative classes of request-response pairs. The positive class includes rhetorically correct request-response pairs and the negative class includes relevant but rhetorically foreign request-response pairs.

For each request-response pair, the rhetoric classification application 102 builds a CDT by parsing each sentence and obtaining verb signatures for the sentence fragments.

Rhetoric classification application 102 provides the associated communicative discourse tree pair to rhetoric agreement classifier 120. Rhetoric agreement classifier 120 outputs a level of complementarity.

At block 2005, process 2000 involves responsive to determining that the level of complementarity is above a threshold, identifying the question and answer sentences as complementary. Rhetoric classification application 102 can use a threshold level of complementarity to determine whether the question-answer pair is sufficiently complementary. For example, if a classification score is greater than a threshold, then rhetoric classification application 102 can output the answer as answer 172 or answer 150. Alternatively, rhetoric classification application 102 can discard the answer and access answer database 105 or a public database for another candidate answer and repeat process 2000 as necessary.

In an aspect, the rhetoric classification application 102 obtains co-references. In a further aspect, the rhetoric classification application 102 obtains entity and sub-entity, or hyponym links. A hyponym is a word of more specific meaning than a general or superordinate term applicable to the word. For example, "spoon" is a hyponym of "cutlery."

In another aspect, rhetoric classification application 102 applies thicket kernel learning to the representations. Thicket kernel learning can take place in place of classification-based learning described above, e.g., at block 2004. The rhetoric classification application 102 builds a parse thicket pair for the parse tree of the request-response pair. The rhetoric classification application 102 applies discourse parsing to obtain a discourse tree pair for the request-response pair. The rhetoric classification application 102 aligns elementary discourse units of the discourse tree request-response and the parse tree request-response. The rhetoric classification application 102 merges the elementary discourse units of the discourse tree request-response and the parse tree request-response.

In an aspect, rhetoric classification application 102 improves the text similarity assessment by word2vector model.

In a further aspect, rhetoric classification application 102 sends a sentence that corresponds to the question communicative discourse tree 110 or a sentence that corresponds to the answer communicative discourse tree to a device such as mobile device 170. Outputs from rhetoric classification application 102 can be used as inputs to search queries, database lookups, or other systems. In this manner, rhetoric classification application 102 can integrate with a search engine system.

Figure 21:
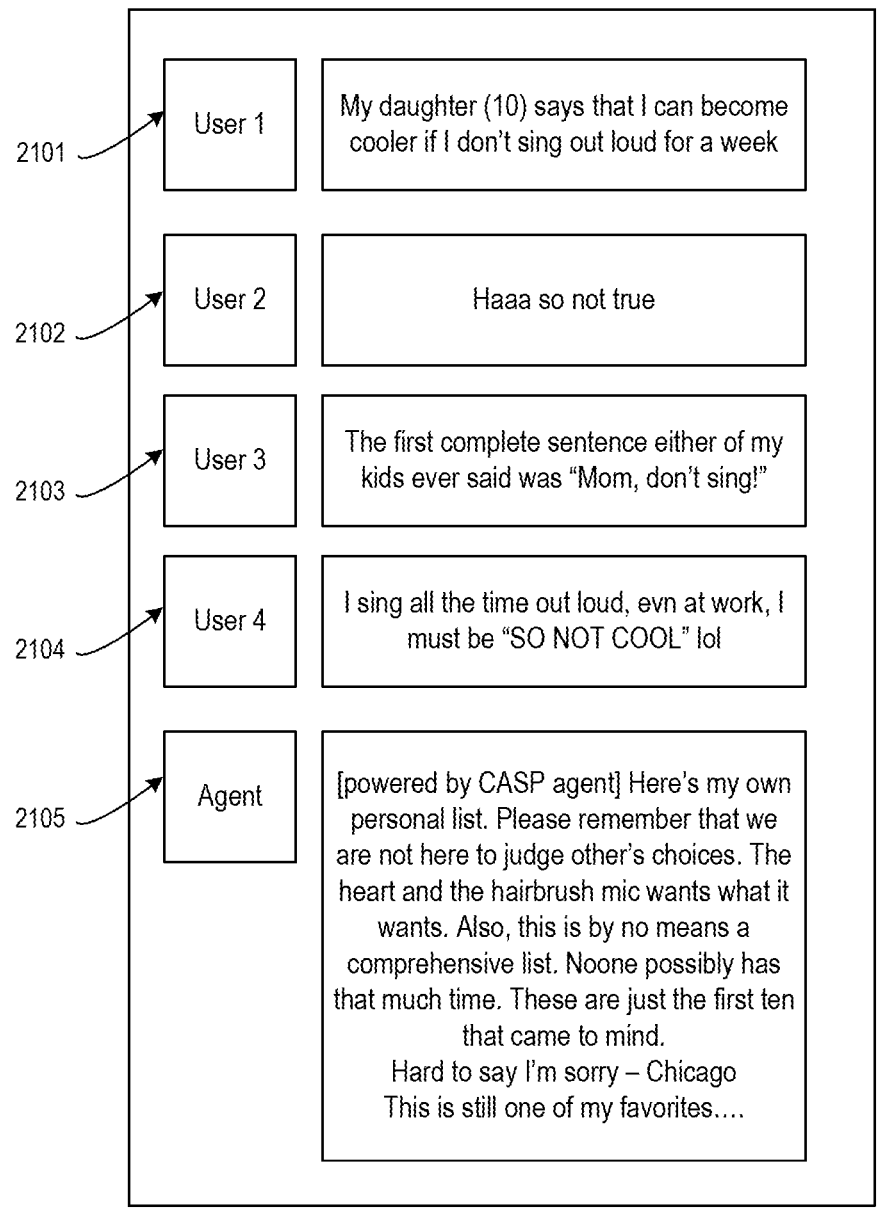
FIG. 21 illustrates a chat bot commenting on a posting in accordance with an aspect.

FIG. 21 illustrates a chat bot commenting on a posting in accordance with an aspect. FIG. 21 depicts chat 2100, user messages 2101-2104, and agent response 2105. Agent response 2105 can be implemented by the rhetoric classification application 102. As shown, agent response 2105 has identified a suitable answer to the thread of messages 2101-2104.

Figure 22:
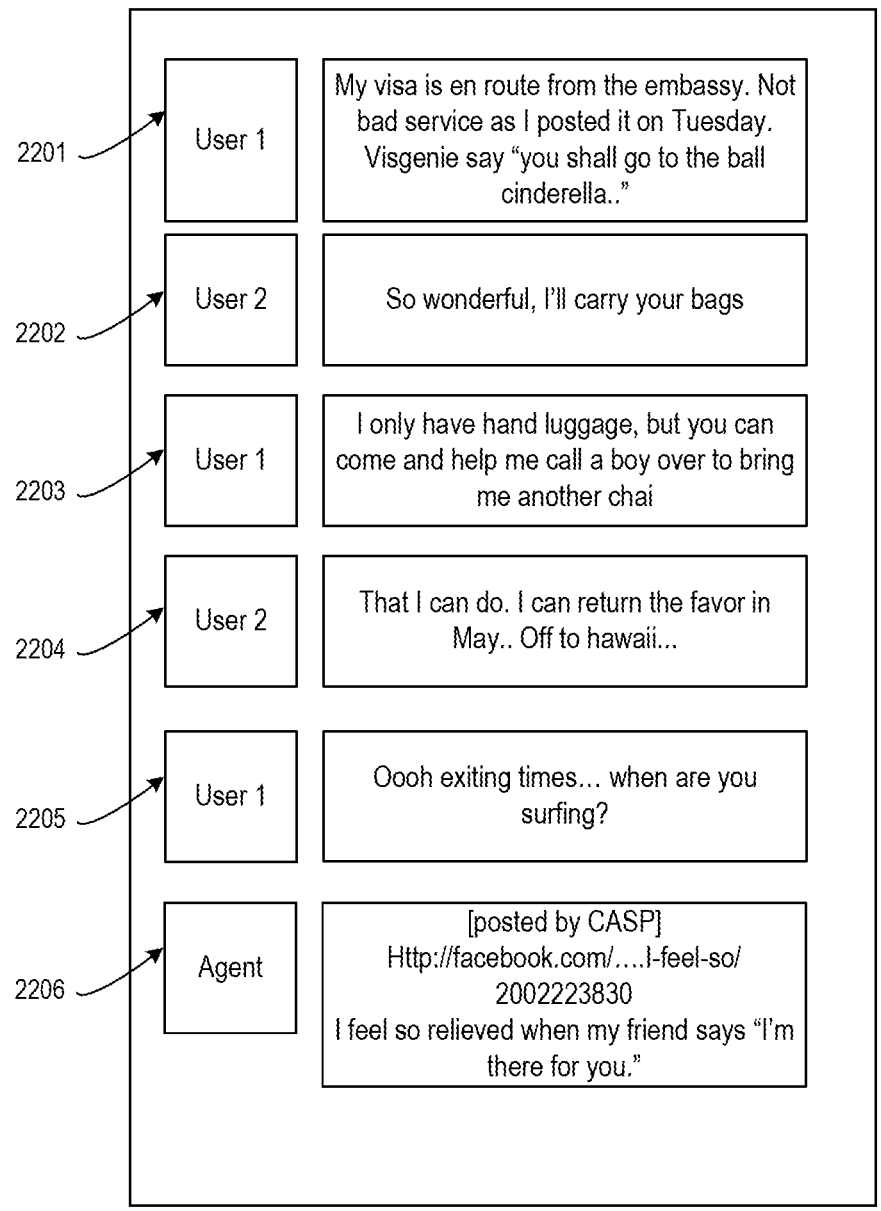
FIG. 22 illustrates a chat bot commenting on a posting in accordance with an aspect.

FIG. 22 illustrates a chat bot commenting on a posting in accordance with an aspect. FIG. 22 depicts chat 2200, user messages 2201-2205, and agent response 2206. FIG. 22 depicts three messages from user 1, specifically 2201, 2203, and 2205, and two messages from user 2, specifically 2202 and 2204. Agent response 2206 can be implemented by the rhetoric classification application 102. As shown, agent response 2106 has identified a suitable answer to the thread of messages 2201-2204.

The features depicted in FIGS. 21 and 22 can be implemented by rhetoric classification computing device 101, or by a device that provides question 130 to rhetoric classification computing device 101 and receives answer 150 from rhetoric classification computing device 101.

Additional Rules for RR Agreement and RR Irrationality

The following are the examples of structural rules which introduce constraint to enforce RR agreement:

1. Both Req and Resp have the same sentiment polarity (If a request is positive the response should be positive as well, and other way around.
2. Both Req and Resp have a logical argument.

Under rational reasoning, Request and Response will fully agree: a rational agent will provide an answer which will be both relevant and match the question rhetoric. However, in the real world not all responses are fully rational. The body of research on Cognitive biases explores human tendencies to think in certain ways that can lead to systematic deviations from a standard of rationality or good judgment.

The correspondence bias is the tendency for people to over-emphasize personality-based explanations for behaviors observed in others, responding to questions. See Baumeister, R. F. & Bushman, B. J. Social psychology and human nature: International Edition. (2010). At the same time, those responding queries under-emphasize the role and power of situational influences on the same behavior.

Confirmation bias, the inclination to search for or interpret information in a way that confirms the preconceptions of those answering questions. They may discredit information that does not support their views. The confirmation bias is related to the concept of cognitive dissonance. Whereby, individuals may reduce inconsistency by searching for information which re-confirms their views.

Anchoring leads to relying too heavily, or "anchor", on one trait or piece of information when making decisions.

Availability heuristic makes us overestimate the likelihood of events with greater "availability" in memory, which can be influenced by how recent the memories are or how unusual or emotionally charged they may be.

According to Bandwagon effect, people answer questions believing in things because many other people do (or believe) the same.

Belief bias is an effect where someone's evaluation of the logical strength of an argument is biased by the believability of the conclusion.

Bias blind spot is the tendency to see oneself as less biased than other people, or to be able to identify more cognitive biases in others than in oneself.

Evaluation

A first domain of test data is derived from question-answer pairs from Yahoo! Answers. set of question-answer pairs with broad topics. Out of the set of 4.4 million user questions, 20000 are selected that each include more than two sentences. Answers for most questions are fairly detailed so no filtering was applied to answers. There are multiple answers per questions and the best one is marked. We consider the pair Question-Best Answer as an element of the positive training set and Question-Other-Answer as the one of the negative training set. To derive the negative set, we either randomly select an answer to a different but somewhat related question, or formed a query from the question and obtained an answer from web search results.

Our second dataset includes the social media. We extracted Request-Response pairs mainly from postings on Facebook. We also used a smaller portion of LinkedIn.com and vk.com conversations related to employment. In the social domains the standards of writing are fairly low. The cohesiveness of text is very limited and the logical structure and relevance frequently absent. The authors formed the training sets from their own accounts and also public Facebook accounts available via API over a number of years (at the time of writing Facebook API for getting messages is unavailable). In addition, we used 860 email threads from Enron dataset. Also, we collected the data of manual responses to postings of an agent which automatically generates posts on behalf of human users-hosts. See Galitsky B., Dmitri Ilvovsky, Nina Lebedeva and Daniel Usikov. Improving Trust in Automation of Social Promotion. AAAI Spring Symposium on The Intersection of Robust Intelligence and Trust in Autonomous Systems Stanford Calif. 2014. ("Galitsky 2014"). We formed 4000 pairs from the various social network sources.

The third domain is customer complaints. In a typical complaint a dissatisfied customer describes his problems with products and service as well as the process for how he attempted to communicate these problems with the company and how they responded. Complaints are frequently written in a biased way, exaggerating product faults and presenting the actions of opponents as unfair and inappropriate. At the same time, the complainants try to write complaints in a convincing, coherent and logically consistent way (Galitsky 2014); therefore complaints serve as a domain with high agreement between requests and response. For the purpose of assessing agreement between user complaint and company response (according to how this user describes it) we collected 670 complaints from planetfeedback.com over 10 years.

The fourth domain is interview by journalist. Usually, the way interviews are written by professional journalists is such that the match between questions and answers is very high. We collected 1200 contributions of professional and citizen journalists from such sources as datran.com, allvoices.com, huffingtonpost.com and others.

To facilitate data collection, we designed a crawler which searched a specific set of sites, downloaded web pages, extracted candidate text and verified that it adhered to a question-or-request vs response format. Then the respective pair of text is formed. The search is implemented via Bing Azure Search Engine API in the Web and News domains.

Recognizing Valid and Invalid Answers

Answer classification accuracies are shown in Table 1. Each row represents a particular method; each class of methods in shown in grayed areas.

TABLE 1

Evaluation results

| | Source/Evaluation Setting | | | | | | | | | | | |
|---|---|---|---|---|---|---|---|---|---|---|---|---|
| | Yahoo! Answers | | | Conversation on Social Networks | | | Customer complaints | | | Interviews by Journalists | | |
| | P | R | F1 | P | R | F1 | P | R | F1 | P | R | F1 |
| Types and counts for rhetoric reltations of Req and Resp | 55.2 | 52.9 | 54.03 | 51.5 | 52.4 | 51.95 | 54.2 | 53.9 | 54.05 | 53 | 55.5 | 54.23 |
| Entity-based alignment of DT of Req-Resp | 63.1 | 57.8 | 6.33 | 51.6 | 58.3 | 54.7 | 48.6 | 57.0 | 52.45 | 59.2 | 57.9 | 53.21 |
| Maximal common sub-DT fo Req and Resp | 67.3 | 64.1 | 65.66 | 70.2 | 61.2 | 65.4 | 54.6 | 60.0 | 57.16 | 80.2 | 69.8 | 74.61 |
| Maximal common sub-CDT for Req and Resp | 68.1 | 67.2 | 67.65 | 68.0 | 63.8 | 65.83 | 58.4 | 62.8 | 60.48 | 77.6 | 67.6 | 72.26 |
| SVM TK for Parse Trees of individual sentences | 66.1 | 63.8 | 64.93 | 69.3 | 64.4 | 66.8 | 46.7 | 61.9 | 53.27 | 78.7 | 66.8 | 72.24 |
| SVM TK for RST and CA (full parse trees) | 75.8 | 74.2 | 74.99 | 72.7 | 77.7 | 75.11 | 63.5 | 74.9 | 68.74 | 75.7 | 84.5 | 79.83 |
| SVM TK for RR-DT | 76.5 | 77 | 76.75 | 74.4 | 71.8 | 73.07 | 64.2 | 69.4 | 66.69 | 82.5 | 69.4 | 75.4 |
| SVM TK for RR-CDT | 80.3 | 78.3 | 79.29 | 78.6 | 82.1 | 80.34 | 59.5 | 79.9 | 68.22 | 82.7 | 80.9 | 81.78 |
| SVM TK for RR-CDT + sentiment + argumentation features | 78.3 | 76.9 | 77.59 | 67.5 | 69.3 | 68.38 | 55.8 | 65.9 | 60.44 | 76.5 | 74.0 | 75.21 |

One can see that the highest accuracy is achieved in journalism and community answers domain and the lowest in customer complaints and social networks. We can conclude that the higher is the achieved accuracy having the method fixed, the higher is the level of agreement between Req and Resp and correspondingly the higher the responder's competence.

Deterministic family of approaches (middle two rows, local RR similarity-based classification) performs about 9% below SVM TK which indicates that similarity between Req and Resp is substantially less important than certain structures of RR pairs indicative of an RR agreement. It means that agreement between Req and Resp cannot be assessed on the individual basis: if we demand DT(Req) be very similar to DT(Resp) we will get a decent precision but extremely low recall. Proceeding from DT to CDT helps by 1-2% only, since communicative actions play a major role in neither composing a request nor forming a response.

For statistical family of approaches (bottom 5 rows, tree kernels), the richest source of discourse data (SVM TK for RR-DT) gives the highest classification accuracy, almost the same as the RR similarity-based classification. Although SVM TK for RST and CA (full parse trees) included more linguistic data, some part of it (most likely, syntactic) is redundant and gives lower results for the limited training set. Using additional features under TK such as sentiment and argumentation does not help either: most likely, these features are derived from RR-CDT features and do not contribute to classification accuracy on their own.

Employing TK family of approaches based on CDT gives us the accuracy comparable to the one achieved in classifying DT as correct and incorrect, the rhetoric parsing tasks where the state-of-the-art systems meet a strong competition over last few years and derived over 80% accuracy.

Direct analysis approaches in the deterministic family perform rather weakly, which means that a higher number and a more complicated structure of features is required: just counting and taking into account types of rhetoric relations is insufficient to judge on how RR agree with each other. If two RR pairs have the same types and counts of rhetoric relations and even communicative actions they can still belong to opposite RR agreement classes in the majority of cases.

Nearest-pair neighbor learning for CDT achieves lower accuracy than SVM TK for CDT, but the former gives interesting examples of sub-trees which are typical for argumentation, and the ones which are shared among the factoid data. The number of the former groups of CDT sub-trees is naturally significantly higher. Unfortunately SVM TK approach does not help to explain how exactly the RR agreement problem is solved: it only gives final scoring and class labels. It is possible but infrequent to express a logical argument in a response without communicative actions (this observation is backed up by our data).

Measuring RR Agreement in Evaluation Domains

From the standpoint of evaluation of recognition accuracy, we obtained the best method in the previous subsection. Now, having this method fixed, we will measure RR agreements in our evaluation domains. We will also show how the general, total agreement delivered by the best method is correlated with individual agreement criteria such as sentiment, logical argumentation, topics and keyword relevance. Once we use our best approach (SVM TK for RR-CDT) for labeling training set, the size of it can grow dramatically and we can explore interesting properties of RR agreement in various domains. We will discover the contribution of a number of intuitive features of RR agreement on a larger dataset than the previous evaluation.

In this Subsection we intend to demonstrate that the RR pair validity recognition framework can serve as a measure of agreement between an arbitrary request and response. Also, this recognition framework can assess how strongly various features are correlated with RR pair validity.

From the evaluation of recognition accuracy, we obtained the best method to recognize of the RR pair is valid or not. Now, having this recognition method fixed, we will measure RR agreements in our evaluation domains, and will also estimate how a general, total agreement delivered by the best method is correlated with individual agreement criteria such as sentiment, logical argumentation, topics and keyword relevance. Once we use our best approach (SVM TK for RR-CDT) for labeling training set, the size of it can grow dramatically and we can explore interesting properties of RR agreement in various domains. We will discover on a larger dataset than the previous evaluation, the contribution of a number of intuitive features of RR agreement. We will measure this agreement on a feature-by-feature basis, on a positive training dataset of above evaluation only, as a recognition precision (%, Table 2). Notice that recall and the negative dataset is not necessary for the assessment of agreement.

TABLE 2

Measure of agreement between request and response in four domains, %

| | Yahoo! Answers | Conversation on Social Networks | Customer Complaints | Interview by Journalists |
|---|---|---|---|---|
| Overall level of agreement between requests and response, as determined by SVM TK for RR-CDT | 87.2 | 73.4 | 67.4 | 100 |
| Agreement by sentiment | 61.2 | 57.3 | 60.7 | 70.1 |
| Agreement by logical argumentation | 62.5 | 60.8 | 58.4 | 66.0 |
| Agreement by topic as computed by bag-of-words | 67.4 | 67.9 | 64.3 | 82.1 |
| Agreement by topic as computed by generalization of parse trees | 80.2 | 69.4 | 66.2 | 87.3 |
| Agreement by TK similarity | 79.4 | 70.3 | 64.7 | 91.6 |

For example, we estimate as 64.3% the precision of the observation that the RR pairs determined by Agreement by topic as computed by bag-of-words approach are valid RR ones in the domain of Customer Complaints, according to SVM TK for RR-CDT classification.

Agreement by sentiment shows the contribution of proper sentiment match in RR pair. The sentiment rule includes, in particular, that if the polarity of RR is the same, response should confirm what request is saying. Conversely, if polarity is opposite, response should attack what request is claiming. Agreement by logical argumentation requires proper communication discourse where a response disagrees with the claim in request.

This data shed a light on the nature of linguistic agreement between what a proponent is saying and how an opponent is responding. For a valid dialogue discourse, not all agreement features need to be present. However, if most of these features disagree, a given answer should be considered invalid, inappropriate and another answer should be selected. Table 2 tells us which features should be used in what degree in dialogue support in various domains. The proposed technique can therefore serve as an automated means of writing quality and customer support quality assessment.

Chat Bot Applications

A Conversational Agent for Social Promotion (CASP), is an agent that is presented as a simulated human character which acts on behalf of its human host to facilitate and manage her communication for him or her. Galitsky B., Dmitri Ilvovsky, Nina Lebedeva and Daniel Usikov. Improving Trust in Automation of Social Promotion. AAAI Spring Symposium on The Intersection of Robust Intelligence and Trust in Autonomous Systems Stanford Calif. 2014. The CASP relieves its human host from the routine, less important activities on social networks such as sharing news and commenting on messages, blogs, forums, images and videos of others. Conversational Agent for Social Promotion evolves with possible loss of trust. The overall performance of CASP with the focus on RR pair agreement, filtering replies mined from the web is evaluated.

On average, people have 200-300 friends or contacts on social network systems such Facebook and LinkedIn. To maintain active relationships with this high number of friends, a few hours per week is required to read what they post and comment on it. In reality, people only maintain relationship with 10-20 most close friends, family and colleagues, and the rest of friends are being communicated with very rarely. These not so close friends feel that the social network relationship has been abandoned. However, maintaining active relationships with all members of social network is beneficial for many aspects of life, from work-related to personal. Users of social network are expected to show to their friends that they are interested in them, care about them, and therefore react to events in their lives, responding to messages posted by them. Hence users of social network need to devote a significant amount of time to maintain relationships on social networks, but frequently do not possess the time to do it. For close friends and family, users would still socialize manually. For the rest of the network, they would use CASP for social promotion being proposed.

CASP tracks user chats, user postings on blogs and forums, comments on shopping sites, and suggest web documents and their snippets, relevant to a purchase decisions. To do that, it needs to take portions of text, produce a search engine query, run it against a search engine API such as Bing, and filter out the search results which are determined to be irrelevant to a seed message. The last step is critical for a sensible functionality of CASP, and poor relevance in rhetoric space would lead to lost trust in it. Hence an accurate assessment of RR agreement is critical to a successful use of CASP.

CASP is presented as a simulated character that acts on behalf of its human host to facilitate and manage her communication for her (FIGS. 21-22). The agent is designed to relieve its human host from the routine, less important activities on social networks such as sharing news and commenting on messages, blogs, forums, images and videos of others. Unlike the majority of application domains for simulated human characters, its social partners do not necessarily know that they exchange news, opinions, and updates with an automated agent. We experimented with CASP's rhetoric agreement and reasoning about mental states of its peers in a number of Facebook accounts. We evaluate its performance and accuracy of reasoning about mental states involving the human users communicating with it. For a conversational system, users need to feel that it properly reacts to their actions, and that what it replied makes sense. To achieve this in a horizontal domain, one needs to leverage linguistic information to a full degree to be able to exchange messages in a meaningful manner.

CASP inputs a seed (a posting written by a human) and outputs a message it forms from a content mined on the web and adjusted to be relevant to the input posting. This relevance is based on the appropriateness in terms of content and appropriateness in terms RR agreement, or a mental state agreement (for example, it responds by a question to a question, by an answer to a recommendation post seeking more questions, etc.).

FIG. 21-22 illustrate a chat bot commenting on a posting.

We conduct evaluation of how human users lose trust in CASP and his host in case of both content and mental state relevance failures. Instead of evaluating rhetoric relevance, which is an intermediate parameter in terms of system usability, we assess how users lose trust in CASP when they are annoyed by its rhetorically irrelevant and inappropriate postings.

TABLE 3

Evaluation results for trust losing scenarios

| Topic of the seed | Complexity of the seed and posted message | A friend complains of CASP's host | A friend unfriends the CASP host | A friend shares with other friends that the trust in CASP is low | A friend encourages other friends to unfriend a friend with CASP |
|---|---|---|---|---|---|
| Travel and outdoor | 1 sent | 6.2 | 8.5 | 9.4 | 12.8 |
| | 2 sent | 6.0 | 8.9 | 9.9 | 11.4 |
| | 3 sent | 5.9 | 7.4 | 10.0 | 10.8 |
| | 4 sent | 5.2 | 6.8 | 9.4 | 10.8 |
| Shopping | 1 sent | 7.2 | 8.4 | 9.9 | 13.1 |
| | 2 sent | 6.8 | 8.7 | 9.4 | 12.4 |
| | 3 sent | 6.0 | 8.4 | 10.2 | 11.6 |
| | 4 sent | 5.5 | 7.8 | 9.1 | 11.9 |
| Events and entertainment | 1 sent | 7.3 | 9.5 | 10.3 | 13.8 |
| | 2 sent | 8.1 | 10.2 | 10.0 | 13.9 |
| | 3 sent | 8.4 | 9.8 | 10.8 | 13.7 |
| | 4 sent | 8.7 | 10.0 | 11.0 | 13.8 |
| Job-related | 1 sent | 3.6 | 4.2 | 6.1 | 6.0 |
| | 2 sent | 3.5 | 3.9 | 5.8 | 6.2 |
| | 3 sent | 3.7 | 4.0 | 6.0 | 6.4 |
| | 4 sent | 3.2 | 3.9 | 5.8 | 6.2 |
| Personal Life | 1 sent | 7.1 | 7.9 | 8.4 | 9.0 |
| | 2 sent | 6.9 | 7.4 | 9.0 | 9.5 |
| | 3 sent | 5.3 | 7.6 | 9.4 | 9.3 |
| | 4 sent | 5.9 | 6.7 | 7.5 | 8.9 |
| Average | | 6.03 | 7.5 | 8.87 | 10.58 |

In Table 3 we show the results of tolerance of users to the CASP failures. After a certain number of failures, friends lose trust and complain, unfriend, shares negative information about the loss of trust with others and even encourage other friends to unfriend a friend who is enabled with CASP. The values in the cell indicate the average number of postings with failed rhetoric relevance when the respective event of lost trust occurs. These posting of failed relevance occurred within one months of this assessment exercise, and we do not obtain the values for the relative frequency of occurrences of these postings. On average, 100 postings were responded for each user (1-4 per seed posting).

One can see that in various domains the scenarios where users lose trust in CASP are different. For less information-critical domains like travel and shopping, tolerance to failed relevance is relatively high.

Conversely, in the domains taken more seriously, like job related, and with personal flavor, like personal life, users are more sensitive to CASP failures and the loss of trust in its various forms occur faster.

For all domains, tolerance slowly decreases when the complexity of posting increases. Users' perception is worse for longer texts, irrelevant in terms of content or their expectations, than for shorter, single sentence or phrase postings by CASP.

A Domain of Natural Language Description of Algorithms

The ability to map natural language to a formal query or command language is critical to developing more user-friendly interfaces to many computing systems such as databases. However, relatively little research has addressed the problem of learning such semantic parsers from corpora of sentences paired with their formal-language equivalents. Kate, Rohit., Y. W. Wong, and R. Mooney. Learning to transform natural to formal languages. In AAAI, 2005. Furthermore, to the best of our knowledge no such research was conducted at discourse level. By learning to transform natural language (NL) to a complete formal language, NL interfaces to complex computing and AI systems can be more easily developed.

More than 40 years ago, Dijkstra, a Dutch computer scientist who invented the concept of "structured programming", wrote: "I suspect that machines to be programmed in our native tongues—be it Dutch, English, American, French, German, or Swahili—are as damned difficult to make as they would be to use". The visionary was definitely right—the specialization and the high accuracy of programming languages are what made possible the tremendous progress in the computing and computers as well. Dijkstra compares the invention of programming languages with invention of mathematical symbolism. In his words "Instead of regarding the obligation to use formal symbols as a burden, we should regard the convenience of using them as a privilege: thanks to them, school children can learn to do what in earlier days only genius could achieve". But four decades years later we keep hitting a wall with the amount of code sitting in a typical industry applications—tens and hundreds of millions lines of code—a nightmare to support and develop. The idiom "The code itself is the best description" became kind of a bad joke.

Natural language descriptions of programs is an area where text rhetoric is peculiar and agreement between statements is essential. We will look at the common rhetoric representation and also domain-specific representation which maps algorithm description into software code.

Figure 23:
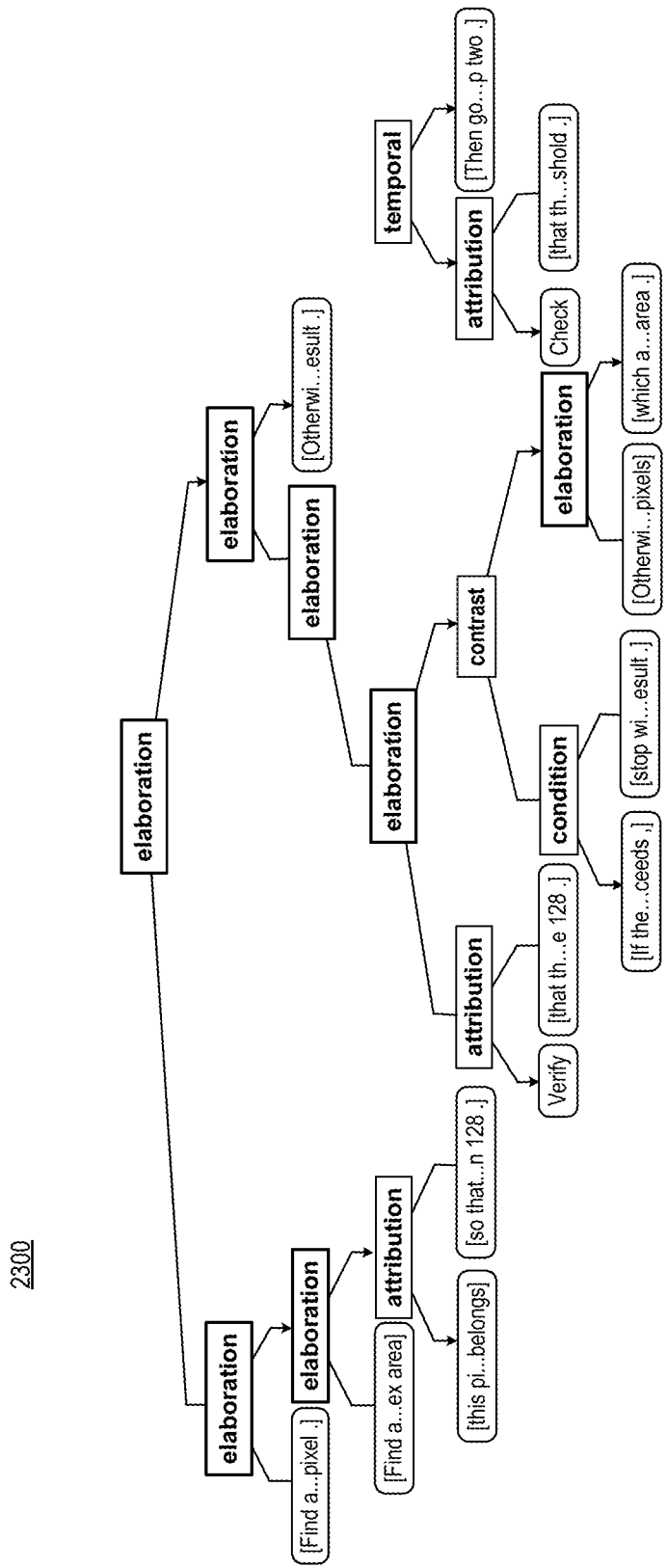
FIG. 23 illustrates a discourse tree for algorithm text in accordance with an aspect.

FIG. 23 illustrates a discourse tree for algorithm text in accordance with an aspect. We have the following text and its DT (FIG. 23):

1) Find a random pixel p1.
2) Find a convex area a_off this pixel p1 belongs so that all pixels are less than 128.
3) Verify that the border of the selected area has all pixels above 128.
4) If the above verification succeeds, stop with positive result. Otherwise, add all pixels which are below 128 to the a_off.
5) Check that the size of a_off is below the threshold. Then go to 2. Otherwise, stop with negative result.

We now show how to convert a particular sentence into logic form and then to software code representation. Certain rhetoric relations help to combine statements obtained as a result of translation of individual sentences.

Verify that the border of the selected area has all pixels above 128.

FIG. 24 illustrates annotated sentences in accordance with an aspect. See FIG. 24 for annotated deconstructions of the pseudocode, 1-1 through 1-3.

Converting all constants into variables, we attempt to minimize the number of free variables, and not over-constrain the expression at the same time. Coupled (linked by the edge) arrows show that the same constant values (pixel) are mapped into equal variables (Pixel), following the conventions of logic programming. To achieve this, we add (unary) predicates which need to constrain free variables.

1-4) Adding predicates which constrain free variables
epistemic_action(verify) & border(Area) & border(Pixel) & above(Pixel, 128) & area(Area)

Now we need to build an explicit expression for quantification all. In this particular case it will not be in use, since we use a loop structure anyway FIG. 25 illustrates annotated sentences in accordance with an aspect. See FIG. 25 for annotated deconstructions of the pseudocode, 1-5 through 2-3. Finally, we have 2-3) Resultant Code Fragment

```
while (!(Pixel.next( )==null)) {
  if !(border.belong(Pixel) && Pixel.above(128)){
    bOn=false;
    break;
  }
}
Return bOn;
```

Related Work

Although discourse analysis has a limited number of applications in question answering and summarization and generation of text, we have not found applications of automatically constructed discourse trees. We enumerate research related to applications of discourse analysis to two areas: dialogue management and dialogue games. These areas have potential of being applied to the same problems the current proposal is intended for. Both of these proposals have a series of logic-based approaches as well as analytical and machine learning based ones.

Managing Dialogues and Question Answering

If a question and answer are logically connected, their rhetoric structure agreement becomes less important.

De Boni proposed a method of determining the appropriateness of an answer to a question through a proof of logical relevance rather than a logical proof of truth. See De Boni, Marco, Using logical relevance for question answering, Journal of Applied Logic, Volume 5, Issue 1, March 2007, Pages 92-103. We define logical relevance as the idea that answers should not be considered as absolutely true or false in relation to a question, but should be considered true more flexibly in a sliding scale of aptness. Then it becomes possible to reason rigorously about the appropriateness of an answer even in cases where the sources of answers are incomplete or inconsistent or contain errors. The authors show how logical relevance can be implemented through the use of measured simplification, a form of constraint relaxation, in order to seek a logical proof than an answer is in fact an answer to a particular question.

Our model of CDT attempts to combine general rhetoric and speech act information in a single structure. While speech acts provide a useful characterization of one kind of pragmatic force, more recent work, especially in building dialogue systems, has significantly expanded this core notion, modeling more kinds of conversational functions that an utterance can play. The resulting enriched acts are called dialogue acts. See Jurafsky, Daniel, & Martin, James H. 2000. Speech and Language Processing: An Introduction to Natural Language Processing, Computational Linguistics, and Speech Recognition. Upper Saddle River, N.J.: Prentice Hall. In their multi-level approach to conversation acts Traum and Hinkelman distinguish four levels of dialogue acts necessary to assure both coherence and content of conversation. See Traum, David R. and James F. Allen. 1994. Discourse obligations in dialogue processing. In Proceedings of the 32nd annual meeting on Association for Computational Linguistics (ACL '94). Association for Computational Linguistics, Stroudsburg, Pa., USA, 1-8. The four levels of conversation acts are: turn-taking acts, grounding acts, core speech acts, and argumentation acts.

Research on the logical and philosophical foundations of Q/A has been conducted over a few decades, having focused on limited domains and systems of rather small size and been found to be of limited use in industrial environments. The ideas of logical proof of "being an answer to" developed in linguistics and mathematical logic have been shown to have a limited applicability in actual systems. Most current applied research, which aims to produce working general-purpose ("open-domain") systems, is based on a relatively simple architecture, combining Information Extraction and Retrieval, as was demonstrated by the systems presented at the standard evaluation framework given by the Text Retrieval Conference (TREC) Q/A track.

(Sperber and Wilson 1986) judged answer relevance depending on the amount of effort needed to "prove" that a particular answer is relevant to a question. This rule can be formulated via rhetoric terms as Relevance Measure: the less hypothetical rhetoric relations are required to prove an answer matches the question, the more relevant that answer is. The effort required could be measured in terms of amount of prior knowledge needed, inferences from the text or assumptions. In order to provide a more manageable measure we propose to simplify the problem by focusing on ways in which constraints, or rhetoric relations, may be removed from how the question is formulated. In other words, we measure how the question may be simplified in order to prove an answer. Resultant rule is formulated as follows: The relevance of an answer is determined by how many rhetoric constraints must be removed from the question for the answer to be proven; the less rhetoric constraints must be removed, the more relevant the answer is.

There is a very limited corpus of research on how discovering rhetoric relations might help in Q/A. Kontos introduced the system which allowed an exploitation of rhetoric relations between a "basic" text that proposes a model of a biomedical system and parts of the abstracts of papers that present experimental findings supporting this model. See Kontos, John, Ioanna Malagardi, John Peros (2016) Question Answering and Rhetoric Analysis of Biomedical Texts in the AROMA System. Unpublished Manuscript.

Adjacency pairs are defined as pairs of utterances that are adjacent, produced by different speakers, ordered as first part and second part, and typed—a particular type of first part requires a particular type of second part. Some of these constraints could be dropped to cover more cases of dependencies between utterances. See Popescu-Belis, Andrei. Dialogue Acts: One or More Dimensions? Tech Report ISSCO Working paper n. 62. 2005.

Adjacency pairs are relational by nature, but they could be reduced to labels ('first part', 'second part', 'none'), possibly augmented with a pointer towards the other member of the pair. Frequently encountered observed kinds of adjacency pairs include the following ones: request/offer/invite→accept/refuse; assess→agree/disagree; blame→denial/admission; question→answer; apology→downplay; thank→welcome; greeting→greeting. See Levinson, Stephen C. 2000. Presumptive Meanings: The Theory of Generalized Conversational Implicature. Cambridge, Mass.: The MIT Press.

Rhetoric relations, similarly to adjacency pairs, are a relational concept, concerning relations between utterances, not utterances in isolation. It is however possible, given that an utterance is a satellite with respect to a nucleus in only one relation, to assign to the utterance the label of the relation. This poses strong demand for a deep analysis of dialogue structure. The number of rhetoric relations in RST ranges from the 'dominates' and 'satisfaction-precedes' classes used by (Grosz and Sidner 1986) to more than a hundred types. Coherence relations are an alternative way to express rhetoric structure in text. See Scholman, Merel, Jacqueline Evers-Vermeul, Ted Sanders. Categories of coherence relations in discourse annotation. Dialogue & Discourse, Vol 7, No 2 (2016)

There are many classes of NLP applications that are expected to leverage informational structure of text. DT can be very useful is text summarization. Knowledge of salience of text segments, based on nucleus-satellite relations proposed by Sparck-Jones 1995 and the structure of relation between segments should be taken into account to form exact and coherent summaries. See Sparck Jones, K. Summarising: analytic framework, key component, experimental method', in Summarising Text for Intelligent Communication, (Ed. B. Endres-Niggemeyer, J. Hobbs and K. Sparck Jones), Dagstuhl Seminar Report 79 (1995). One can generate the most informative summary by combining the most important segments of elaboration relations starting at the root node. DTs have been used for multi-document summaries. See Radev, Dragomir R., Hongyan Jing, and Malgorzata Budzikowska. 2000. Centroid-based summarization of multiple documents: sentence extraction, utility-based evaluation, and user studies. In Proceedings of the 2000 NAACL-ANLP Workshop on Automatic summarization—Volume 4

In the natural language generation problem, whose main difficulty is coherence, informational structure of text can be relied upon to organize the extracted fragments of text in a coherent way. A way to measure text coherence can be used in automated evaluation of essays. Since a DT can capture text coherence, then yielding discourse structures of essays can be used to assess the writing style and quality of essays. Burstein described a semi-automatic way for essay assessment that evaluated text coherence. See Burstein, Jill C., Lisa Braden-Harder, Martin S. Chodorow, Bruce A. Kaplan, Karen Kukich, Chi Lu, Donald A. Rock and Susanne Wolff. (2002).

The neural network language model proposed in (engio 2003 uses the concatenation of several preceding word vectors to form the input of a neural network, and tries to predict the next word. See Bengio, Yoshua, Réjean Ducharme, Pascal Vincent, and Christian Janvin. 2003. A neural probabilistic language model. J. Mach. Learn. Res. 3 (March 2003), 1137-1155. The outcome is that after the model is trained, the word vectors are mapped into a vector space such that Distributed Representations of Sentences and Documents semantically similar words have similar vector representations. This kind of model can potentially operate on discourse relations, but it is hard to supply as rich linguistic information as we do for tree kernel learning.

There is a corpus of research that extends word2vec models to go beyond word level to achieve phrase-level or sentence-level representations. For instance, a simple approach is using a weighted average of all the words in the document, (weighted averaging of word vectors), losing the word order similar to how bag-of-words approaches do. A more sophisticated approach is combining the word vectors in an order given by a parse tree of a sentence, using matrix-vector operations. See R. Socher, C. D. Manning, and A. Y. Ng. 2010. Learning continuous phrase representations and syntactic parsing with recursive neural networks. In Proceedings of the NIPS-2010 Deep Learning and Unsupervised Feature Learning Workshop. Using a parse tree to combine word vectors, has been shown to work for only sentences because it relies on parsing.

Many early approaches to policy learning for dialogue systems used small state spaces and action sets, and concentrated on only limited policy learning experiments (for example, type of confirmation, or type of initiative). The Communicator dataset (Walker et al 2001) is the largest available corpus of human-machine dialogues, and has been further annotated with dialogue contexts. This corpus has been extensively used for training and testing dialogue managers, however it is restricted to information requesting dialogues in the air travel domain for a limited number of attributes such as destination city. At the same time, in the current work we relied on the extensive corpus of request-response pairs of various natures.

Reichman 1985 gives a formal description and an ATN (Augmented Transition Network) model of conversational moves, with reference to conventional methods for recognizing the speech act of an utterance. The author uses the analysis of linguistic markers similar to what is now used for rhetoric parsing such as pre-verbal 'please', modal auxiliaries, prosody, reference, clue phrases (such as 'Yes, but . . . ' (sub-argument concession and counter argument), 'Yes, and . . . ' (argument agreement and further support), 'No' and 'Yes' (disagreement/agreement), 'Because . . . ' (support), etc.) and other illocutionary indicators. See Reichman, R. 1985. Getting computers to talk like you and me: discourse context, focus and semantics (an ATN model). Cambridge, Mass. London: MIT Press.

Given a DT for a text as a candidate answer to a compound query, proposed a rule system for valid and invalid occurrence of the query keywords in this DT. See Galisky 2015. To be a valid answer to a query, its keywords need to occur in a chain of elementary discourse units of this answer so that these units are fully ordered and connected by nucleus—satellite relations. An answer might be invalid if the queries' keywords occur in the answer's satellite discourse units only.

Dialog Games

In an arbitrary conversation, a question is typically followed by an answer, or some explicit statement of an inability or refusal to answer. There is the following model of the intentional space of a conversation. From the yielding of a question by Agent B, Agent A recognizes Agent B's goal to find out the answer, and it adopts a goal to tell B the answer in order to be co-operative. A then plans to achieve the goal, thereby generating the answer. This provides an elegant account in the simple case, but requires a strong assumption of co-operativeness. Agent A must adopt agent B's goals as her own. As a result, it does not explain why A says anything when she does not know the answer or when she is not ready to accept B's goals.

Litman and Allen introduced an intentional analysis at the discourse level in addition to the domain level, and assumed a set of conventional multi-agent actions at the discourse level. See Litman, D. L. and Allen, J. F. 1987. A plan recognition model for subdialogues in conversation, Cognitive Science, 11: 163-2. Others have tried to account for this kind of behavior using social intentional constructs such as Joint intentions. See Cohen P. R. & Levesque, H. J. 1990. Intention is choice with commitment, Artificial Intelligence, 42: 213-261. See also Grosz, Barbara J., & Sidner, Candace L. 1986. Attentions, Intentions and the Structure of Discourse. Computational Linguistics, 12(3), 175-204. While these accounts do help explain some discourse phenomena more satisfactorily, they still require a strong degree of cooperativity to account for dialogue coherence, and do not provide easy explanations of why an agent might act in cases that do not support high-level mutual goals.

Let us imagine a stranger approaching a person and asking, "Do you have spare coins?" It is unlikely that there is a joint intention or shared plan, as they have never met before. From a purely strategic point of view, the agent may have no interest in whether the stranger's goals are met. Yet, typically agents will still respond in such situations. Hence an account of Q/A must go beyond recognition of speaker intentions. Questions do more than just provide evidence of a speaker's goals, and something more than adoption of the goals of an interlocutor is involved in formulating a response to a question.

Mann proposed a library of discourse level actions, sometimes called dialogue games, which encode common communicative interactions. See Mann, William and Sandra Thompson. 1988. Rhetorical structure theory: Towards a functional theory of text organization. Text-Interdisciplinary Journal for the Study of Discourse, 8(3):243-281. To be co-operative, an agent must always be participating in one of these games. So if a question is asked, only a fixed number of activities, namely those introduced by a question, are co-operative responses. Games provide a better explanation of coherence, but still require the agents to recognize each other's intentions to perform the dialogue game. As a result, this work can be viewed as a special case of the intentional view. Because of this separation, they do not have to assume co-operation on the tasks each agent is performing, but still require recognition of intention and co-operation at the conversational level. It is left unexplained what goals motivate conversational co-operation.

Coulthard and Brazil suggested that responses can play a dual role of both response and new initiation: Initiation^(Re-Initiation)^Response^(Follow-up). See Coulthard, R. M. and Brazil D. 1979. Exchange structure: Discourse analysis monographs no. 5. Birmingham: The University of Birmingham, English Language Research. Exchanges can consist of two to four utterances. Also, follow-up itself could be followed up. Opening moves indicate the start of the exchange sometimes, which do not restrict the type of the next move. Finally, closing moves sometimes occur which are not necessarily a follow-up. When these observations are added to their formula one ends up with:

(Open)^Initiation^(Re-Initiation)^Response^(Feedback)^(Follow-up)^(Close)

This now can deal with anything from two to seven more exchanges.

Figure 26:
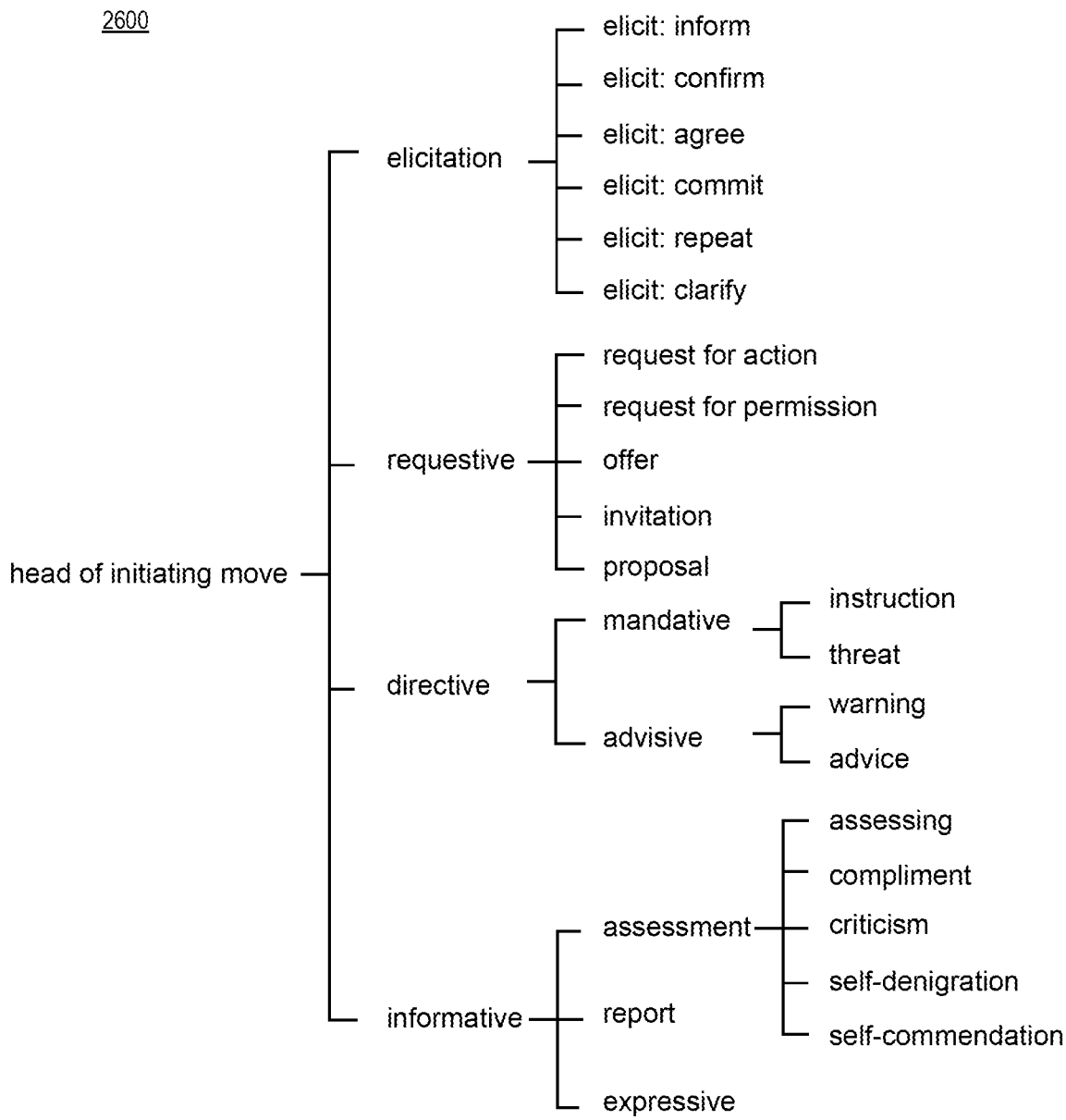
FIG. 26 illustrates discourse acts of a dialogue in accordance with an aspect.

FIG. 26 illustrates discourse acts of a dialogue in accordance with an aspect. Tsui (1994) characterizes the discourse acts according to a three-part transaction. Her systems of choice for Initiating, Responding and Follow-up are shown in FIG. 26 on the top, middle and bottom correspondingly.

Figure 27:
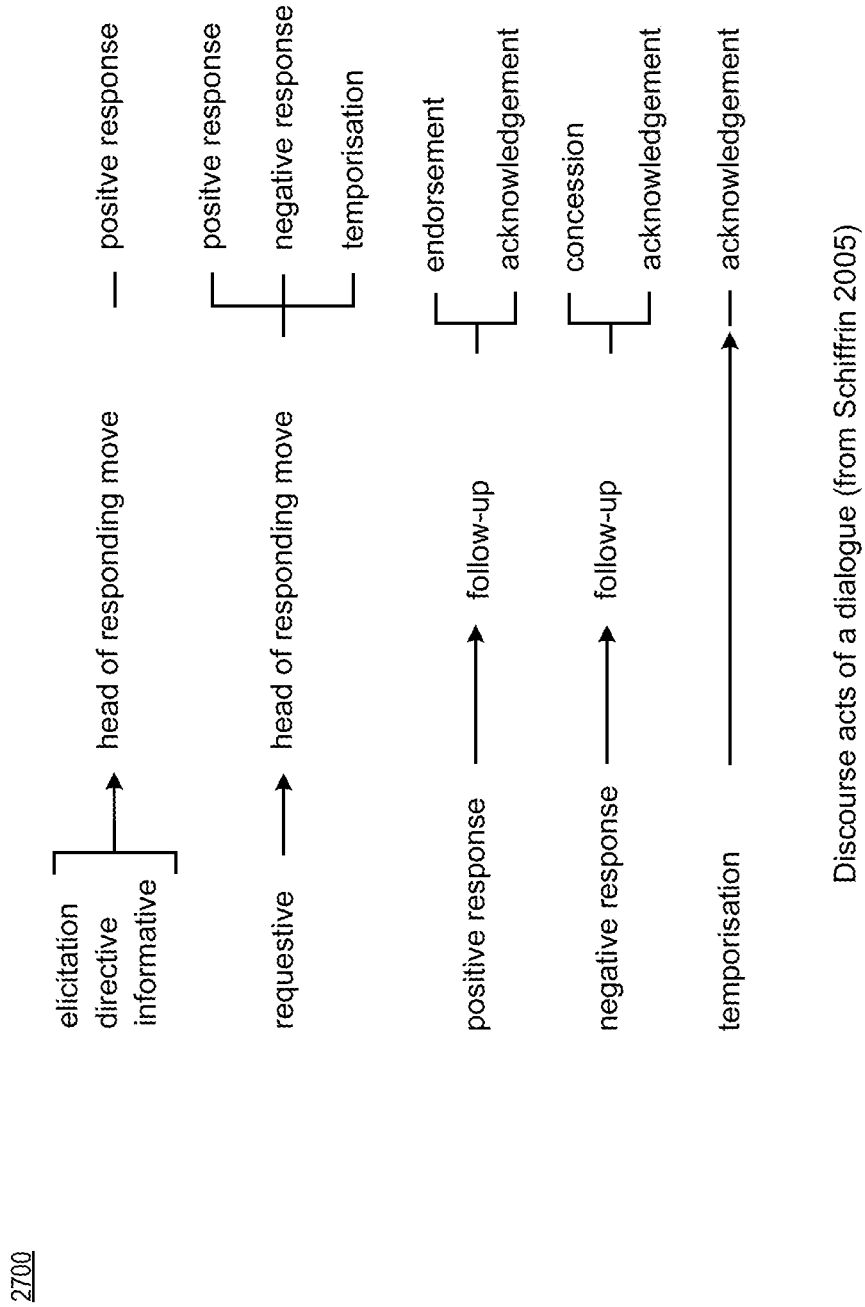
FIG. 27 illustrates discourse acts of a dialogue in accordance with an aspect.

FIG. 27 illustrates discourse acts of a dialogue in accordance with an aspect.

The classification problem of valid vs invalid RR pairs is also applicable to the task of complete dialogue generation beyond question answering and automated dialogue support. Popescu presented a logic-based rhetorical structuring component of a natural language generator for human-computer dialogue. See Popescu, Vladimir, Jean Caelen, Corneliu Burileanu. Logic-Based Rhetorical Structuring for Natural Language Generation in Human-Computer Dialogue. Lecture Notes in Computer Science Volume 4629, pp 309-317, 2007. The pragmatic and contextual aspects are taken into account communicating with a task controller providing domain and application-dependent information, structured in fully formalized task ontology. In order to achieve the goal of computational feasibility and generality, discourse ontology has been built and a number of axioms introducing constraints for rhetoric relations have been proposed.

For example, the axiom specifying the semantics of topic ($\alpha$) is given below:
topic($\alpha$)::=ExhaustiveDecomposition(i, j; vi, $\omega$j) & memberOf(vi, K ($\alpha$)) & memberOf($\omega$j,$\Omega$)($\exists$: equals(vk,$\omega$j) & memberOf(vk,K($\alpha$))).
where K($\alpha$) the clause logically expressing the semantics of the utterance a.

The notion of topic of an utterance is defined here in terms of sets of objects in the domain ontology, referred to in a determined manner in the utterance. Hence, the topic relations between utterances are computed using the task/domain ontology, handled by the task controller.

As an instance of such rule one can consider topic($\beta$)::=ExhaustiveDecomposition(book, read, good time('14h'), good time('monday'), t+); –good time($\theta$)::=$\exists\gamma,\pi$: ¬Disjoint (topic($\gamma$), topic($\pi$)) & smaller(t$\alpha$,t$\pi$) & ((SubclassOf($\theta$, $\Delta t\alpha$)$\square$ equals($\theta$,$\Delta t\alpha$)) & $\pi$: equals($\Delta t\pi,\theta$);
where t+ is "future and 'new'".

Rhetoric Relations and Argumentation

Frequently, the main means of linking questions and answers is logical argumentation. There is an obvious connection between RST and argumentation relations which tried to learn in this study. There are four types of relations: the directed relations support, attack, detail, and the undirected sequence relation. The support and attack relations are argumentative relations, which are known from related work. See Peldszus, A. and Stede, M. 2013. From Argument Diagrams to Argumentation Mining in Texts: A Survey. Int. J of Cognitive Informatics and Natural Intelligence 7(1), 1-31). The latter two correspond to discourse relations used in RST. The argumentation sequence relation corresponds to "Sequence" in RST, the argumentation detail relation roughly corresponds to "Background" and "Elaboration".

Argumentation detail relation is important because many cases in scientific publications, where some background information (for example the definition of a term) is important for understanding the overall argumentation. A support relation between an argument component Resp and another argument component Req indicates that Resp supports (reasons, proves) Req. Similarly, an attack relation between Resp and Req is annotated if Resp attacks (restricts, contradicts) Req. The detail relation is used, if Resp is a detail of Req and gives more information or defines something stated in Req without argumentative reasoning. Finally, we link two argument components (within Req or Resp) with the sequence relation, if the components belong together and only make sense in combination, i.e., they form a multi-sentence argument component.

We observed that using SVM TK one can differentiate between a broad range of text styles (Galitsky 2015), including ones without argumentation and ones with various forms of argumentation. Each text style and genre has its inherent rhetoric structure which is leveraged and automatically learned. Since the correlation between text style and text vocabulary is rather low, traditional classification approaches which only take into account keyword statistics information could lack the accuracy in the complex cases. We also performed text classification into rather abstract classes such as the belonging to language-object and meta-language in literature domain and style-based document classification into proprietary design documents. See Galitsky, B, Ilvovsky, D. and Kuznetsov SO. Rhetoric Map of an Answer to Compound Queries Knowledge Trail Inc. ACL 2015, 681-686. Evaluation of text integrity in the domain of valid vs invalid customer complains (those with argumentation flow, non-cohesive, indicating a bad mood of a complainant) shows the stronger contribution of rhetoric structure information in comparison with the sentiment profile information. Discourse structures obtained by RST parser are sufficient to conduct the text integrity assessment, whereas sentiment profile-based approach shows much weaker results and also does not complement strongly the rhetoric structure ones.

An extensive corpus of studies has been devoted to RST parsers, but the research on how to leverage RST parsing results for practical NLP problems is limited to content generation, summarization and search (Jansen et al 2014). DTs obtained by these parsers cannot be used directly in a rule-based manner to filter or construct texts. Therefore, learning is required to leverage implicit properties of DTs. This study is a pioneering one, to the best of our knowledge, that employs discourse trees and their extensions for general and open-domain question answering, chatbots, dialogue management and text construction.

Dialogue chatbot systems need to be capable of understanding and matching user communicative intentions, reason with these intentions, build their own respective communication intentions and populate these intentions with actual language to be communicated to the user. Discourse trees on their own do not provide representation for these communicative intents. In this study we introduced the communicative discourse trees, built upon the traditional discourse trees, which can be massively produced nowadays on one hand and constitute a descriptive utterance-level model of a dialogue on the other hand. Handling dialogues via machine learning of communicative discourse trees allowed us to model a wide array of dialogue types of collaboration modes and interaction types (planning, execution, and interleaved planning and execution).

Statistical computational learning approaches offer several key potential advantages over the manual rule-based hand-coding approach to dialogue systems development:
 data-driven development cycle;
 provably optimal action policies;
 a more accurate model for the selection of responses;
 possibilities for generalization to unseen states;
 reduced development and deployment costs for industry.

Comparing inductive learning results with the kernel-based statistical learning, relying on the same information allowed us to perform more concise feature engineering than either approach would do.

An extensive corpus of literature on RST parsers does not address the issue of how the resultant DT will be employed in practical NLP systems. RST parsers are mostly evaluated with respect to agreement with the test set annotated by humans rather than its expressiveness of the features of interest. In this work we focus on interpretation of DT and explored ways to represent them in a form indicative of an agreement or disagreement rather than neutral enumeration of facts.

To provide a measure of agreement for how a given message in a dialogue is followed by a next message, we used CDTs, which now include labels for communicative actions in the form of substituted VerbNet frames. We investigated the discourse features that are indicative of correct vs incorrect request-response and question-answer pairs. We used two learning frameworks to recognize correct pairs: deterministic, nearest-neighbor learning of CDTs as graphs, and a tree kernel learning of CDTs, where a feature space of all CDT sub-trees is subject to SVM learning.

The positive training set was constructed from the correct pairs obtained from Yahoo Answers, social network, corporate conversations including Enron emails, customer complaints and interviews by journalists. The corresponding negative training set was created by attaching responses for different, random requests and questions that included relevant keywords so that relevance similarity between requests and responses are high. The evaluation showed that it is possible to recognize valid pairs in 68-79% of cases in the domains of weak request-response agreement and 80-82% of cases in the domains of strong agreement. These accuracies are essential to support automated conversations. These accuracies are comparable with the benchmark task of classification of discourse trees themselves as valid or invalid, and also with factoid question-answering systems.

We believe this study is the first one that leverages automatically built discourse trees for question answering support. Previous studies used specific, customer discourse models and features which are hard to systematically collect, learn with explainability, reverse engineer and compare with each other. We conclude that learning rhetoric structures in the form of CDTs are key source of data to support answering complex questions, chatbots and dialogue management.

Figure 28:
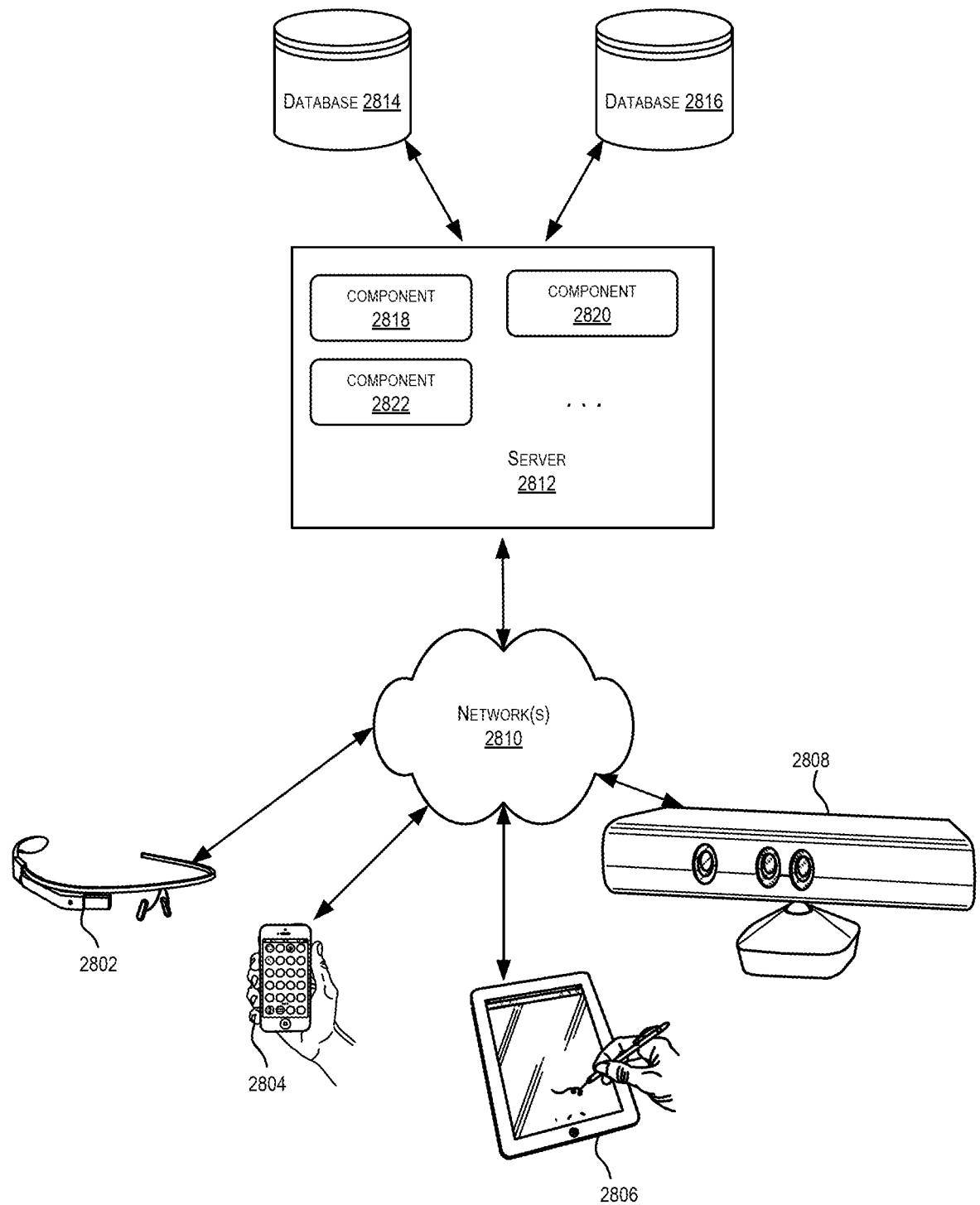
FIG. 28 depicts a simplified diagram of a distributed system for implementing one of the aspects.

FIG. 28 depicts a simplified diagram of a distributed system 2800 for implementing one of the aspects. In the illustrated aspect, distributed system 2800 includes one or more client computing devices 2802, 2804, 2806, and 2808, which are configured to execute and operate a client application such as a web browser, proprietary client (e.g., Oracle Forms), or the like over one or more network(s) 2810. Server 2812 may be communicatively coupled with remote client computing devices 2802, 2804, 2806, and 2808 via network 2810.

In various aspects, server 812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2802, 2804, 2806, and/or 2808. Users operating client computing devices 2802, 2804, 2806, and/or 2808 may in turn utilize one or more client applications to interact with server 2812 to utilize the services provided by these components.

In the configuration depicted in the figure, the software components 2818, 2820 and 2822 of system 2800 are shown as being implemented on server 812. In other aspects, one or more of the components of system 2800 and/or the services provided by these components may also be implemented by one or more of the client computing devices 2802, 2804, 2806, and/or 2808. Users operating the client computing devices may then utilize one or more client applications to use the services provided by these components. These components may be implemented in hardware, firmware, software, or combinations thereof. It should be appreciated that various different system configurations are possible, which may be different from distributed system 2800. The aspect shown in the figure is thus one example of a distributed system for implementing an aspect system and is not intended to be limiting.

Client computing devices 2802, 2804, 2806, and/or 2808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2802, 2804, 2806, and 2808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2810.

Although exemplary distributed system 2800 is shown with four client computing devices, any number of client computing devices may be supported. Other devices, such as devices with sensors, etc., may interact with server 2812.

Network(s) 2810 in distributed system 2800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2810 can be a local area network (LAN), such as one based on Ethernet, Token-Ring and/or the like. Network(s) 2810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.28 suite of protocols, Bluetooth®, and/or any other wireless protocol); and/or any combination of these and/or other networks.

Server 2812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2812 can include one or more virtual machines running virtual operating systems, or other computing architectures involving virtualization. One or more flexible pools of logical storage devices can be virtualized to maintain virtual storage devices for the server. Virtual networks can be controlled by server 2812 using software defined networking. In various aspects, server 2812 may be adapted to run one or more services or software applications described in the foregoing disclosure. For example, server 2812 may correspond to a server for performing processing described above according to an aspect of the present disclosure.

Server 2812 may run an operating system including any of those discussed above, as well as any commercially available server operating system. Server 2812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2812 may also include one or more applications to display the data feeds and/or real-time events via one or more display devices of client computing devices 2802, 2804, 2806, and 2808.

Distributed system 2800 may also include one or more databases 2814 and 2816. Databases 2814 and 2816 may reside in a variety of locations. By way of example, one or more of databases 2814 and 2816 may reside on a non-transitory storage medium local to (and/or resident in) server 2812. Alternatively, databases 2814 and 2816 may be remote from server 2812 and in communication with server 2812 via a network-based or dedicated connection. In one set of aspects, databases 2814 and 2816 may reside in a storage-area network (SAN). Similarly, any necessary files for performing the functions attributed to server 2812 may be stored locally on server 2812 and/or remotely, as appropriate. In one set of aspects, databases 2814 and 2816 may include relational databases, such as databases provided by Oracle, that are adapted to store, update, and retrieve data in response to SQL-formatted commands.

Figure 29:
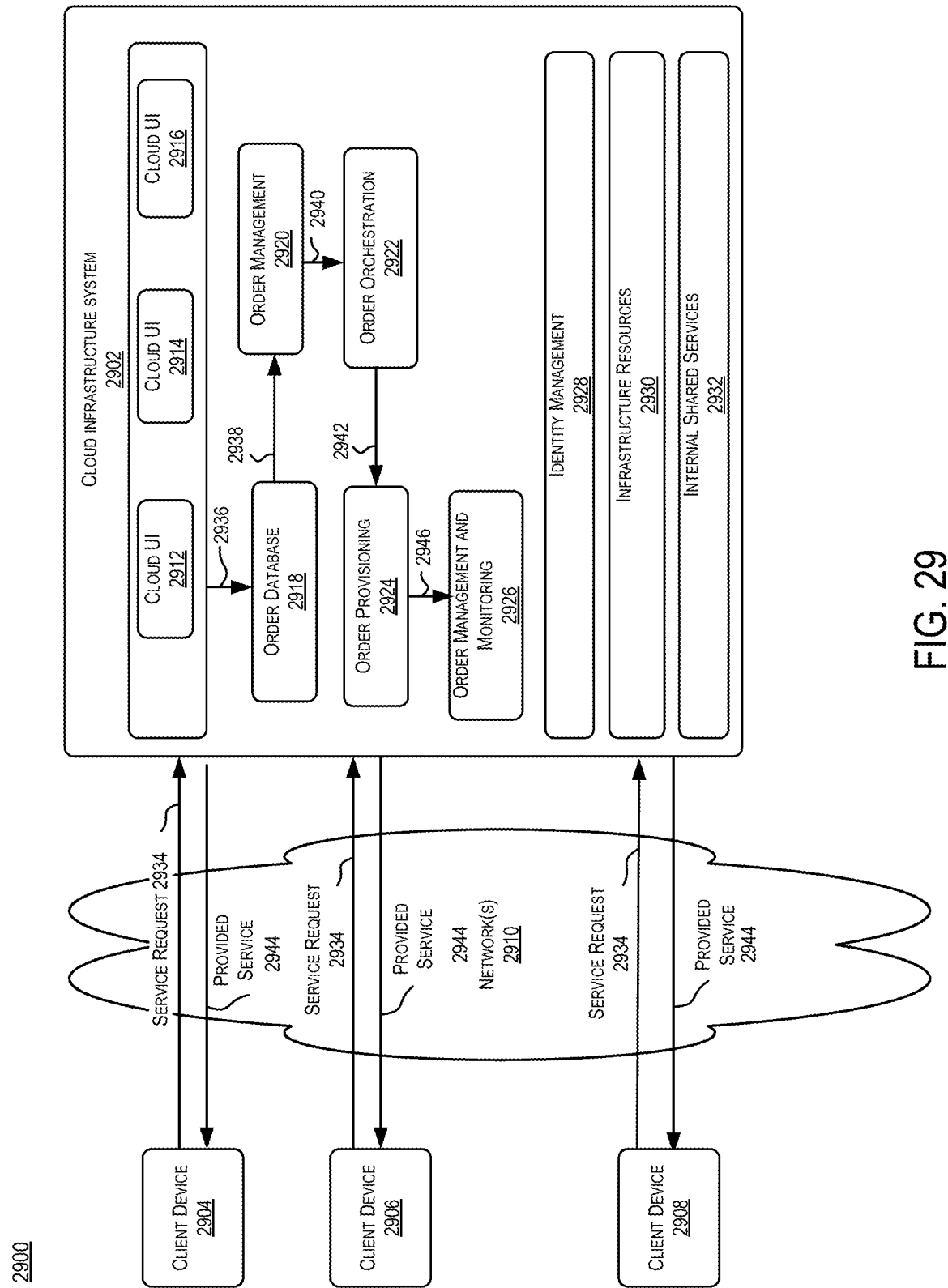
FIG. 29 is a simplified block diagram of components of a system environment by which services provided by the components of an aspect system may be offered as cloud services in accordance with an aspect.

FIG. 29 is a simplified block diagram of one or more components of a system environment 2900 by which services provided by one or more components of an aspect system may be offered as cloud services, in accordance with an aspect of the present disclosure. In the illustrated aspect, system environment 2900 includes one or more client computing devices 2904, 2906, and 2908 that may be used by users to interact with a cloud infrastructure system 2902 that provides cloud services. The client computing devices may be configured to operate a client application such as a web browser, a proprietary client application (e.g., Oracle Forms), or some other application, which may be used by a user of the client computing device to interact with cloud infrastructure system 2902 to use services provided by cloud infrastructure system 2902.

It should be appreciated that cloud infrastructure system 2902 depicted in the figure may have other components than those depicted. Further, the aspect shown in the figure is only one example of a cloud infrastructure system that may incorporate an aspect of the invention. In some other aspects, cloud infrastructure system 2902 may have more or fewer components than shown in the figure, may combine two or more components, or may have a different configuration or arrangement of components.

Client computing devices 2904, 2906, and 2908 may be devices similar to those described above for 2802, 2804, 2806, and 2808.

Although exemplary system environment 2900 is shown with three client computing devices, any number of client computing devices may be supported. Other devices such as devices with sensors, etc. may interact with cloud infrastructure system 2902.

Network(s) 2910 may facilitate communications and exchange of data between clients 2904, 2906, and 2908 and cloud infrastructure system 2902. Each network may be any type of network familiar to those skilled in the art that can support data communications using any of a variety of commercially-available protocols, including those described above for network(s) 2810.

Cloud infrastructure system 2902 may comprise one or more computers and/or servers that may include those described above for server 2829.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2902 may be adapted to automatically provision, manage and track a customer's subscription to services offered by cloud infrastructure system 2902. Cloud infrastructure system 2902 may provide the cloud services via different deployment models. For example, services may be provided under a public cloud model in which cloud infrastructure system 2902 is owned by an organization selling cloud services (e.g., owned by Oracle) and the services are made available to the general public or different industry enterprises. As another example, services may be provided under a private cloud model in which cloud infrastructure system 2902 is operated solely for a single organization and may provide services for one or more entities within the organization. The cloud services may also be provided under a community cloud model in which cloud infrastructure system 2902 and the services provided by cloud infrastructure system 2902 are shared by several organizations in a related community. The cloud services may also be provided under a hybrid cloud model, which is a combination of two or more different models.

In some aspects, the services provided by cloud infrastructure system 2902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2902. Cloud infrastructure system 2902 then performs processing to provide the services in the customer's subscription order.

In some aspects, the services provided by cloud infrastructure system 2902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2902 may also include infrastructure resources 2930 for providing the resources used to provide various services to customers of the cloud infrastructure system. In one aspect, infrastructure resources 2930 may include pre-integrated and optimized combinations of hardware, such as servers, storage, and networking resources to execute the services provided by the PaaS platform and the SaaS platform.

In some aspects, resources in cloud infrastructure system 2902 may be shared by multiple users and dynamically re-allocated per demand. Additionally, resources may be allocated to users in different time zones. For example, cloud infrastructure system 2930 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2932 may be provided that are shared by different components or modules of cloud infrastructure system 2902 and by the services provided by cloud infrastructure system 2902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2902 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2902, and the like.

In one aspect, as depicted in the figure, cloud management functionality may be provided by one or more modules, such as an order management module 2920, an order orchestration module 2922, an order provisioning module 2924, an order management and monitoring module 2926, and an identity management module 2928. These modules may include or be provided using one or more computers and/or servers, which may be general purpose computers, specialized server computers, server farms, server clusters, or any other appropriate arrangement and/or combination.

In exemplary operation 2934, a customer using a client device, such as client device 2904, 2906 or 2908, may interact with cloud infrastructure system 2902 by requesting one or more services provided by cloud infrastructure system 2902 and placing an order for a subscription for one or more services offered by cloud infrastructure system 2902. In certain aspects, the customer may access a cloud User Interface (UI), cloud UI 2929, cloud UI 2914 and/or cloud UI 2916 and place a subscription order via these UIs. The order information received by cloud infrastructure system 2902 in response to the customer placing an order may include information identifying the customer and one or more services offered by the cloud infrastructure system 2902 that the customer intends to subscribe to.

After an order has been placed by the customer, the order information is received via the cloud UIs, 2929, 2914 and/or 2916.

At operation 2936, the order is stored in order database 2918. Order database 2918 can be one of several databases operated by cloud infrastructure system 2918 and operated in conjunction with other system elements.

At operation 2938, the order information is forwarded to an order management module 2920. In some instances, order management module 2920 may be configured to perform billing and accounting functions related to the order, such as verifying the order, and upon verification, booking the order.

At operation 2940, information regarding the order is communicated to an order orchestration module 2922. Order orchestration module 2922 may utilize the order information to orchestrate the provisioning of services and resources for the order placed by the customer. In some instances, order orchestration module 2922 may orchestrate the provisioning of resources to support the subscribed services using the services of order provisioning module 2924.

In certain aspects, order orchestration module 2922 enables the management of business processes associated with each order and applies business logic to determine whether an order should proceed to provisioning. At operation 2942, upon receiving an order for a new subscription, order orchestration module 2922 sends a request to order provisioning module 2924 to allocate resources and configure those resources needed to fulfill the subscription order. Order provisioning module 2924 enables the allocation of resources for the services ordered by the customer. Order provisioning module 2924 provides a level of abstraction between the cloud services provided by cloud infrastructure system 2900 and the physical implementation layer that is used to provision the resources for providing the requested services. Order orchestration module 2922 may thus be isolated from implementation details, such as whether or not services and resources are actually provisioned on the fly or pre-provisioned and only allocated/assigned upon request.

At operation 2944, once the services and resources are provisioned, a notification of the provided service may be sent to customers on client devices 2904, 2906 and/or 2908 by order provisioning module 2924 of cloud infrastructure system 2902.

At operation 2946, the customer's subscription order may be managed and tracked by an order management and monitoring module 2926. In some instances, order management and monitoring module 2926 may be configured to collect usage statistics for the services in the subscription order, such as the amount of storage used, the amount data transferred, the number of users, and the amount of system up time and system down time.

In certain aspects, cloud infrastructure system 2900 may include an identity management module 2928. Identity management module 2928 may be configured to provide identity services, such as access management and authorization services in cloud infrastructure system 2900. In some aspects, identity management module 2928 may control information about customers who wish to utilize the services provided by cloud infrastructure system 2902. Such information can include information that authenticates the identities of such customers and information that describes which actions those customers are authorized to perform relative to various system resources (e.g., files, directories, applications, communication ports, memory segments, etc.) Identity management module 2928 may also include the management of descriptive information about each customer and about how and by whom that descriptive information can be accessed and modified.

Figure 30:
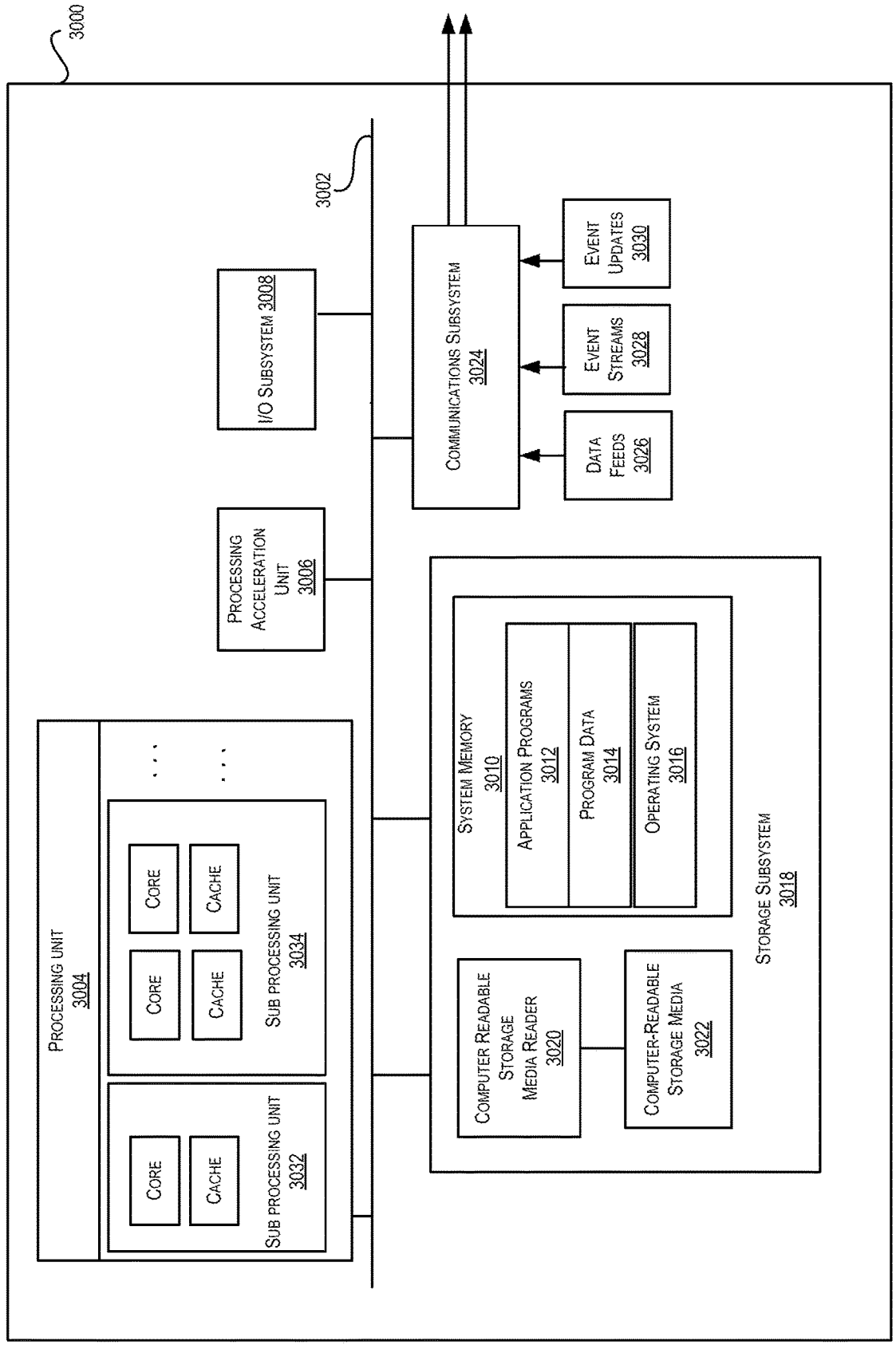
FIG. 30 illustrates an exemplary computer system, in which various aspects of the present invention may be implemented.

FIG. 30 illustrates an exemplary computer system 3000, in which various aspects of the present invention may be implemented. The system 3000 may be used to implement any of the computer systems described above. As shown in the figure, computer system 3000 includes a processing unit 3004 that communicates with a number of peripheral subsystems via a bus subsystem 3002. These peripheral subsystems may include a processing acceleration unit 3006, an I/O subsystem 3008, a storage subsystem 3018 and a communications subsystem 3024. Storage subsystem 3018 includes tangible computer-readable storage media 3022 and a system memory 3010.

Bus subsystem 3002 provides a mechanism for letting the various components and subsystems of computer system 3000 communicate with each other as intended. Although bus subsystem 3002 is shown schematically as a single bus, alternative aspects of the bus subsystem may utilize multiple buses. Bus subsystem 3002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P3086.1 standard.

Processing unit 3004, which can be implemented as one or more integrated circuits (e.g., a conventional microprocessor or microcontroller), controls the operation of computer system 3000. One or more processors may be included in processing unit 3004. These processors may include single core or multicore processors. In certain aspects, processing unit 3004 may be implemented as one or more independent processing units 3032 and/or 3034 with single or multicore processors included in each processing unit. In other aspects, processing unit 3004 may also be implemented as a quad-core processing unit formed by integrating two dual-core processors into a single chip.

In various aspects, processing unit 3004 can execute a variety of programs in response to program code and can maintain multiple concurrently executing programs or processes. At any given time, some or all of the program code to be executed can be resident in processor(s) 3004 and/or in storage subsystem 3018. Through suitable programming, processor(s) 3004 can provide various functionalities described above. Computer system 3000 may additionally include a processing acceleration unit 3006, which can include a digital signal processor (DSP), a special-purpose processor, and/or the like.

I/O subsystem 3008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3000 may comprise a storage subsystem 3018 that comprises software elements, shown as being currently located within a system memory 3010. System memory 3010 may store program instructions that are loadable and executable on processing unit 3004, as well as data generated during the execution of these programs.

Depending on the configuration and type of computer system 3000, system memory 3010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3004. In some implementations, system memory 3010 may include multiple different types of memory, such as static random access memory (SRAM) or dynamic random access memory (DRAM). In some implementations, a basic input/output system (BIOS), containing the basic routines that help to transfer information between elements within computer system 3000, such as during start-up, may typically be stored in the ROM. By way of example, and not limitation, system memory 3010 also illustrates application programs 3012, which may include client applications, Web browsers, mid-tier applications, relational database management systems (RDBMS), etc., program data 3014, and an operating system 3016. By way of example, operating system 3016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3018 may also provide a tangible computer-readable storage medium for storing the basic programming and data constructs that provide the functionality of some aspects. Software (programs, code modules, instructions) that when executed by a processor provide the functionality described above may be stored in storage subsystem 3018. These software modules or instructions may be executed by processing unit 3004. Storage subsystem 3018 may also provide a repository for storing data used in accordance with the present invention.

Storage subsystem 3000 may also include a computer-readable storage media reader 3020 that can further be connected to computer-readable storage media 3022. Together and, optionally, in combination with system memory 3010, computer-readable storage media 3022 may comprehensively represent remote, local, fixed, and/or removable storage devices plus storage media for temporarily and/or more permanently containing, storing, transmitting, and retrieving computer-readable information.

Computer-readable storage media 3022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 3000.

By way of example, computer-readable storage media 3022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 3022 may include, but is not limited to, Zip® drives, flash memory cards, universal serial bus (USB) flash drives, secure digital (SD) cards, DVD disks, digital video tape, and the like. Computer-readable storage media 3022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3000.

Communications subsystem 3024 provides an interface to other computer systems and networks. Communications subsystem 3024 serves as an interface for receiving data from and transmitting data to other systems from computer system 3000. For example, communications subsystem 3024 may enable computer system 3000 to connect to one or more devices via the Internet. In some aspects, communications subsystem 3024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 3024 can provide wired network connectivity (e.g., Ethernet) in addition to or instead of a wireless interface.

In some aspects, communications subsystem 3024 may also receive input communication in the form of structured and/or unstructured data feeds 3026, event streams 3028, event updates 3030, and the like on behalf of one or more users who may use computer system 3000.

By way of example, communications subsystem 3024 may be configured to receive unstructured data feeds 3026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 3024 may also be configured to receive data in the form of continuous data streams, which may include event streams 3028 of real-time events and/or event updates 3030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3024 may also be configured to output the structured and/or unstructured data feeds 3026, event streams 3028, event updates 3030, and the like to one or more databases that may be in communication with one or more streaming data source computers coupled to computer system 3000.

Computer system 3000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for determining a complementarity of a pair of two sentences by analyzing communicative discourse trees, the method comprising:
    determining, for a question sentence, a question communicative discourse tree comprising a question root node;
    determining, for an answer sentence, an answer communicative discourse tree, wherein the answer communicative discourse tree comprises an answer root node, wherein determining a communicative discourse tree from a discourse tree comprises matching, in the discourse tree, each elementary discourse unit that has a verb to a verb signature,
    wherein each verb signature comprises the verb and a respective thematic role that describes a relationship between the verb and other words;
    responsive to identifying that the question root node and the answer root node are identical, merging the communicative discourse trees;
    creating a syntactic parse tree from the question sentence and the answer sentence;
    merging the syntactic parse tree and the merged communicative discourse tree into a parse thicket;
    computing a level of complementarity between the question communicative discourse tree and the answer communicative discourse tree by applying a predictive model to the parse thicket; and
    responsive to determining that the level of complementarity is above a threshold, identifying the question sentence and the answer sentence as complementary and sending text associated with either the question sentence or the answer sentence to an external device.

2. The method of claim 1, further comprising associating the question communicative discourse tree and the answer communicative discourse tree by creating an additional communicative discourse tree.

3. The method of claim 1, wherein the predictive model is trained with a thicket learning machine learning algorithm to determine a level of complementarity of sub-trees of two communicative discourse trees, wherein the thicket machine learning algorithm involves training with one or more parse thickets.

4. The method of claim 1, further comprising:
    aligning an elementary discourse unit of the merged communicative discourse tree with the syntactic parse tree; and
    merging the elementary discourse unit of the merged communicative discourse tree and the syntactic parse tree.

5. The method of claim 1, wherein the predictive model is a machine learning algorithm that is trained to determine an additional level of complementarity between two communicative discourse trees identified as matching or not matching.

6. The method of claim 1, wherein the merged communicative discourse tree is a first communicative discourse tree, further comprising:
    identifying a best match between the first communicative discourse tree and a second communicative discourse tree from a plurality of communicative discourse trees; and
    sending text associated with the second communicative discourse tree to a device.

7. The method of claim 1, further comprising:
    sending, to a device, (i) the question sentence or (ii) the answer sentence as a search result.

8. A non-transitory computer-readable medium storing computer-executable program instructions that when executed, configure a processing device to perform operations comprising:
    determining, for a question sentence, a question communicative discourse tree comprising a question root node;
    determining, for an answer sentence, an answer communicative discourse tree, wherein the answer communicative discourse tree comprises an answer root node, wherein determining a communicative discourse tree from a discourse tree comprises matching, in the discourse tree, each elementary discourse unit that has a verb to a verb signature, wherein each verb signature comprises the verb and a respective thematic role that describes a relationship between the verb and other words;

responsive to identifying that the question root node and the answer root node are identical, merging the communicative discourse trees;

creating a syntactic parse tree from the question sentence and the answer sentence;

merging the syntactic parse tree and the merged communicative discourse tree into a parse thicket;

computing a level of complementarity between the question communicative discourse tree and the answer communicative discourse tree by applying a predictive model to the parse thicket; and responsive to determining that the level of complementarity is above a threshold, identifying the question sentence and the answer sentence as complementary and sending text associated with either the question sentence or the answer sentence to an external device.

9. The non-transitory computer-readable medium of claim 8, wherein when executed, the computer-executable program instructions configure a processing device to perform operations comprising:

accessing a set of training data comprising a set of training pairs, wherein each training pair comprises a question communicative discourse tree that represents a question and an answer communicative discourse tree that represents an answer and an expected level of complementarity; and training the predictive model by iteratively:
providing one of the training pairs to the predictive model,
receiving, from the predictive model, a determined level of complementarity;
adjusting internal parameters of the predictive model to reduce an error, wherein the error is a difference between the determined level of complementarity and the respective expected level of complementarity;
using the predictive model to identify a correspondence between a first sentence and a second sentence; and
providing either the first sentence or the second sentence to a device.

10. The non-transitory computer-readable medium of claim 9, wherein the set of training data comprises a question answer pair that comprises (i) a question and (ii) an answer that is relevant but is rhetorically incorrect when compared to the question.

11. The non-transitory computer-readable medium of claim 9, wherein when executed, the computer-executable program instructions configure a processing device to perform operations comprising:

creating a merged communicative discourse tree from a question communicative discourse tree representing a question and an answer communicative discourse tree representing an answer; and computing an additional level of complementarity between the question communicative discourse tree and the answer communicative discourse tree by applying the predictive model to the merged communicative discourse tree.

12. The non-transitory computer-readable medium of claim 9, wherein when executed, the computer-executable program instructions configure a processing device to perform operations comprising associating the question communicative discourse tree and the answer communicative discourse tree by creating an additional communicative discourse tree.

13. The non-transitory computer-readable medium of claim 9, wherein the predictive model is trained with a thicket learning machine learning algorithm to determine a level of complementarity of sub-trees of two communicative discourse trees, wherein the thicket machine learning algorithm involves training with one or more parse thickets.

14. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:

determining, for a question sentence, a question communicative discourse tree comprising a question root node;

determining, for an answer sentence, an answer communicative discourse tree, wherein the answer communicative discourse tree comprises an answer root node, wherein determining a communicative discourse tree from a discourse tree comprises matching, in the discourse tree, each elementary discourse unit that has a verb to a verb signature,
wherein each verb signature comprises the verb and a respective thematic role that describes a relationship between the verb and other words;

responsive to identifying that the question root node and the answer root node are identical, merging the communicative discourse trees;

creating a syntactic parse tree from the question sentence and the answer sentence;

merging the syntactic parse tree and the merged communicative discourse tree into a parse thicket;

computing a level of complementarity between the question communicative discourse tree and the answer communicative discourse tree by applying a predictive model to the parse thicket; and responsive to determining that the level of complementarity is above a threshold, identifying the question sentence and the answer sentence as complementary and sending text associated with either the question sentence or the answer sentence to an external device.

15. The system of claim 14, wherein executing the computer-executable program instructions configures the processing device to perform operations comprising:

aligning an elementary discourse unit of the merged communicative discourse tree with a corresponding syntactic parse tree; and merging the elementary discourse unit of the merged communicative discourse tree and the corresponding syntactic parse tree.

16. The system of claim 14, wherein the predictive model is a machine learning algorithm that is trained to determine an additional level of complementarity between two communicative discourse trees identified as matching or not matching.

17. The system of claim 14, wherein executing the computer-executable program instructions configures the processing device to perform operations comprising:

sending, to a device, one or both of (i) the question sentence or (ii) the answer sentence as a search result.

18. The system of claim 14, wherein executing the computer-executable program instructions configures the processing device to perform operations comprising:
  accessing a set of training data comprising a set of training pairs, wherein each training pair comprises a question communicative discourse tree that represents a question and an answer communicative discourse tree that represents an answer and an expected level of complementarity; and
  training the predictive model by iteratively:
    providing one of the training pairs to the predictive model,
    receiving, from the predictive model, a determined level of complementarity; and
    adjusting internal parameters of the predictive model to reduce an error, wherein the error is a difference between the determined level of complementarity and the respective expected level of complementarity.

19. The system of claim 18, wherein the set of training data comprises a question answer pair that comprises a question and an answer that is relevant but is rhetorically incorrect when compared to the question.

20. The system of claim 14, wherein executing the computer-executable program instructions configures the processing device to perform operations comprising:
  creating a merged communicative discourse tree from a question communicative discourse tree representing a question and an answer communicative discourse tree representing an answer; and
  computing an additional level of complementarity between the question communicative discourse tree and the answer communicative discourse tree by applying the predictive model to the merged communicative discourse tree.

* * * * *

UNITED STATES PATENT AND TRADEMARK OFFICE
CERTIFICATE OF CORRECTION

PATENT NO. : 11,775,771 B2
APPLICATION NO. : 17/071608
DATED : October 3, 2023
INVENTOR(S) : Galitsky Page 1 of 4

It is certified that error appears in the above-identified patent and that said Letters Patent is hereby corrected as shown below:

On the Title Page

On page 4, Column 1, Item (56) under Other Publications, Line 21, delete "Chapters," and insert -- Chapter 5, --, therefor.

On page 4, Column 1, Item (56) under Other Publications, Line 44, delete "lnformation" and insert -- Information --, therefor.

On page 4, Column 1, Item (56) under Other Publications, Line 60, delete "ofthe" and insert -- of the --, therefor.

On page 5, Column 2, Item (56) under Other Publications, Line 59, delete "forText" and insert -- for Text --, therefor.

On page 6, Column 1, Item (56) under Other Publications, Line 63, delete "Ra Yana" and insert -- RaYana --, therefor.

In the Drawings

On sheet 1 of 30, in FIG. 1, on the title page, the illustrative print figure, under Reference Numeral 120, Line 3, delete "Clasifier" and insert -- Classifier --, therefor.

On sheet 12 of 30, in FIG. 12, above the Block labelled 'Elaboration' insert -- 1200 --.

On sheet 19 of 30, in FIG. 19, Line 5, delete "investgation" and insert -- investigation --, therefor.

On sheet 21 of 30, in FIG. 21, under Reference Numeral 2104, Line 1, delete "evn" and insert -- even --, therefor.

On sheet 21 of 30, in FIG. 21, under Reference Numeral 2105, Line 6, delete "Noone" and insert Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,775,771 B2

-- No one --, therefor.

On sheet 27 of 30, in FIG. 27, Line 2, delete "positve" and insert -- positive --, therefor.

On sheet 27 of 30, in FIG. 27, Line 4, delete "positve" and insert -- positive --, therefor.

In the Specification

In Column 11, Line 8, delete "Slack,®" and insert -- Slack®, --, therefor.

In Column 15, Line 33, delete "a1," and insert -- a2, --, therefor.

In Column 17, Line 25, delete "2008." and insert -- 2008, --, therefor.

In Column 18, Lines 50-51, delete "amuse (Stimulus," and insert -- amuse(Stimulus, --, therefor.

In Column 18, Line 51, delete "cause (Stimulus," and insert -- cause(Stimulus, --, therefor.

In Column 18, Lines 51-52, delete "emotional state" and insert -- emotional_state --, therefor.

In Column 18, Line 59, delete "emotional state" and insert -- emotional_state --, therefor.

In Column 18, Line 61, delete "NP. cause" and insert -- NP.cause --, therefor.

In Column 19, Line 29, delete "sustain." and insert -- sustain). --, therefor.

In Column 20, Line 20, delete "a an" and insert -- an --, therefor.

In Column 21, Line 17, delete "$c_i$," and insert -- $c_j$ --, therefor.

In Column 22, Line 6, delete "(rst1 ^rst2)" and insert -- (rst1^rst2) --, therefor.

In Column 22, Line 14, delete "R1) sentence(N2," and insert -- R1)^sentence(N2, --, therefor.

In Column 22, Line 19, delete "background^ rst" and insert -- background^rst --, therefor.

In Column 23, Line 44, delete "topic. [0189]" and insert -- topic. --, therefor.

In Column 23, Line 44-50, delete "At block 1504, process 1500 involves determining, for each verb signature of the verb signatures, a number of thematic roles of the respective signature that match a role of a word in the fragment. For the first fragment, rhetorical classification application 102 determines that the verb "deny" has only three roles, "agent", "verb" and "theme."" and insert the same on Column 23, Line 45, as a new paragraph, therefor.

In Column 24, Line 40, delete "cheating (husband," and insert -- cheating(husband, --, therefor.

CERTIFICATE OF CORRECTION (continued)
U.S. Pat. No. 11,775,771 B2

In Column 24, Line 40, delete "avoid (husband," and insert -- avoid(husband, --, therefor.

In Column 24, Line 41, delete "contact (husband," and insert -- contact(husband, --, therefor.

In Column 25, Line 11, delete "ones)" and insert -- ones). --, therefor.

In Column 25, Line 39, delete "F" and insert -- $\Gamma$ --, therefor.

In Column 25, Line 40, delete "l)," and insert -- l), --, therefor.

In Column 25, Line 41, delete "1: V→Λζ" and insert -- 1: V→Λζ --, therefor.

In Column 25, Line 49, delete "∈$E_2$ ⇒(φ(v))," and insert -- ∈$E_2$⇒(φ(v), --, --, therefor.

In Column 26, Line 58, delete "A" and insert -- $\Delta$ --, therefor.

In Column 26, Line 59-61, delete "Otherwise, if both n1 and n2 are POS tags (are pre-terminal nodes) then $\Delta$ (n1, n2)=1×λ; and insert the same on Column 26, Line 60, as a new paragraph, therefor.

In Column 26, Line 61-62, delete "Otherwise, $\Delta$ (n1, n2)=$\lambda\Pi_{j=1}^{nc(n1)}$(1+$\Delta$ (ch(n1, j), ch(n2, j)))" and insert the same on Column 26, Line 61, as a new paragraph, therefor.

In Column 29, Line 16, delete "around." and insert -- around). --, therefor.

In Columns 31-32, Line 2, (TABLE 1), below "results" delete "Source/Evaluation Setting", therefor.

In Columns 31-32, Line 3, (TABLE 1), before "Yahoo!" insert -- Source/Evaluation Setting --, therefor.

In Columns 31-32, Line 8, (TABLE 1), delete "reltations" and insert -- relations --, therefor.

In Columns 31-32, Line 14, delete "fo" and insert -- for --, therefor.

In Column 35, Line 19, delete "FIG." and insert -- FIGS. --, therefor.

In Column 37, Line 20, delete "anyway" and insert -- anyway. --, therefor.

In Column 37, Lines 23-24, delete "Finally, we have 2-3) Resultant Code Fragment" and insert the same on Column 37, Line 25, as a new paragraph, therefor.

In Column 39, Line 22, delete "(2016)" and insert -- (2016). --, therefor.

In Column 39, Line 42, delete "4" and insert -- 4. --, therefor.

In Column 39, Line 55, delete "(engio" and insert -- Bengio --, therefor.

CERTIFICATE OF CORRECTION (continued)
U.S. Pat. No. 11,775,771 B2

In Column 40, Line 46, delete "Galisky" and insert -- Galitsky --, therefor.

In Column 42, Line 23, delete "(∃:" and insert -- (∃k: --, therefor.

In Column 42, Line 25, delete "where" and insert -- Where --, therefor.

In Column 42, Line 26, delete "a." and insert -- α. --, therefor.

In Column 45, Line 48, delete "Internet" and insert -- Internetwork --, therefor.

In Column 45, Line 56, delete "infra-red" and insert -- infrared --, therefor.

In Column 54, Line 56, delete "evolution)," and insert -- evolution)), --, therefor.

In the Claims

In Column 57, Line 30, in Claim 9, after "complementarity;" delete "and".

In Column 57, Line 36, in Claim 9, after "complementarity;" insert -- and --, therefor.